(12) United States Patent
Takenaka et al.

(10) Patent No.: US 9,132,880 B2
(45) Date of Patent: Sep. 15, 2015

(54) MOBILE VEHICLE

(71) Applicant: HONDA MOTOR CO., LTD., Tokyo (JP)

(72) Inventors: Toru Takenaka, Wako (JP); Kazushi Akimoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 147 days.

(21) Appl. No.: 14/135,729

(22) Filed: Dec. 20, 2013

(65) Prior Publication Data
US 2014/0188341 A1     Jul. 3, 2014

(30) Foreign Application Priority Data
Dec. 27, 2012   (JP) ................................. 2012-286372

(51) Int. Cl.
*B62D 6/00* (2006.01)
*B62K 21/10* (2006.01)

(52) U.S. Cl.
CPC ................. *B62K 21/10* (2013.01); *B62D 6/003* (2013.01)

(58) Field of Classification Search
CPC .............................. B62K 21/10; B62D 6/003
See application file for complete search history.

(56) References Cited

U.S. PATENT DOCUMENTS

| 8,364,345 | B2* | 1/2013 | Oida et al. | 701/37 |
| 8,565,979 | B2* | 10/2013 | Linker et al. | 701/42 |
| 8,606,464 | B2* | 12/2013 | Suzuki | 701/42 |
| 8,997,911 | B2* | 4/2015 | Hayashi | 180/210 |
| 2006/0085111 | A1* | 4/2006 | Kojima | 701/38 |
| 2007/0010919 | A1* | 1/2007 | Ammon | 701/1 |
| 2014/0188342 | A1* | 7/2014 | Takenaka et al. | 701/41 |

FOREIGN PATENT DOCUMENTS

| JP | 04-224488 | 8/1992 |
| JP | 2007-125917 | 5/2007 |
| JP | 2012-076511 | 4/2012 |

OTHER PUBLICATIONS

Japanese Office Action dated Jun. 23, 2015, 3 pages.

* cited by examiner

*Primary Examiner* — John Q Nguyen
*Assistant Examiner* — Alan D Hutchinson
(74) *Attorney, Agent, or Firm* — Rankin, Hill & Clark LLP

(57) ABSTRACT

In a mobile vehicle 1A having a front wheel 3f and a rear wheel 3r, the steered wheel 3f can be steered by an actuator 8. A control device 15 controls the actuator 8 so as to stabilize the inclination angle φb in the roll direction of the vehicle body 2 and the steering angle δf of the steered wheel 3f. The control device 15 causes a ratio between the sensitivity of the steering of the steered wheel 3f to the change in observed value of the inclination angle φb and the sensitivity of the steering of the steered wheel 3f to the change in observed value of the steering angle δf to be changed in accordance with the traveling speed of the mobile vehicle 1A.

5 Claims, 21 Drawing Sheets

ESTIMATED TRAVELING
SPEED CALCULATING
SECTION 33

FIG.9 DESIRED HANDLEBAR ANGLE DETERMINING SECTION 38

<br>

MOBILE VEHICLE

BACKGROUND OF THE INVENTION

1. Field of the Invention

The present invention relates to a mobile vehicle (mobile object) such as a two-wheeled vehicle having a front wheel and a rear wheel.

2. Description of the Related Art

In a mobile vehicle, for example a motorcycle, having a front wheel and a rear wheel arranged spaced apart from each other in the longitudinal direction of the vehicle body, the front wheel usually serves as a steered wheel. In order to enhance the straight traveling property of the motorcycle, the steering axis of the front wheel (rotational axis of steering of the front wheel) is tilted backward (with a positive caster angle). Further, the axle of the front wheel is arranged on, or slightly behind, the steering axis.

As a result, a motorcycle of this type usually has a large positive trail. It should be noted that having a positive trail means that the point of intersection of the steering axis and the ground surface with which the wheels come into contact lies in front of the ground contact point of the steered wheel.

Further, as a motorcycle of this type, a motorcycle which is configured such that the rear wheel is passively steered by a reaction force that the rear wheel receives from the road surface when the motorcycle makes a turn is also known, as seen, for example, in Japanese Patent Application Laid-Open No. 04-224488.

SUMMARY OF THE INVENTION

For two-wheeled vehicles such as motorcycles, it is desired to enhance the stability of the posture of the vehicle body particularly when the vehicle is stopped or traveling at a low speed.

On the other hand, during a high-speed traveling of the two-wheeled vehicle, the stability of the posture of the vehicle body is higher as compared to when the vehicle is stopped or traveling at a low speed. It is therefore desirable that the rider can readily control the posture of the vehicle body by, for example, banking the vehicle body in the roll direction during turning of the two-wheeled vehicle.

In view of the foregoing, it is an object of the present invention to provide a mobile vehicle which can enhance the stability of the posture of the vehicle body by steering of a front wheel or a rear wheel when the vehicle is stopped or traveling at a low speed, and which can facilitate a rider's control of the posture of the vehicle body when the vehicle is traveling at a high speed.

To achieve the object, the present invention provides a mobile vehicle having a vehicle body and a front wheel and a rear wheel arranged spaced apart from each other in a longitudinal direction of the vehicle body, one of the front wheel and the rear wheel being a steered wheel which can be steered about a steering axis tilted backward, the mobile vehicle including:

a steering actuator which generates a steering force for steering the steered wheel; and a control device which controls the steering actuator, wherein the control device is configured to control the steering actuator so as to stabilize controlled state quantities including a first motional state quantity and a second motional state quantity, the first motional state quantity being a motional state quantity of an inclination angle in a roll direction of the vehicle body and including at least a value of the inclination angle, the second motional state quantity being a motional state quantity of a steering angle of the steered wheel and including at least a value of the steering angle, and, when a steering angular acceleration of the steered wheel steered by the steering actuator or a torque about the steering axis applied to the steered wheel from the steering actuator is defined as a reference quantity, the control device is configured to control the steering actuator such that a magnitude of a ratio $Ra1/Rb1$ between sensitivity $Ra1$ of a change in value of the reference quantity to a change in observed value of the inclination angle in the roll direction of the vehicle body and sensitivity $Rb1$ of a change in value of the reference quantity to a change in observed value of the steering angle of the steered wheel becomes smaller as a magnitude of an observed value of a traveling speed of the mobile vehicle becomes larger (a first aspect of the invention).

It should be noted that the "first motional state quantity" (motional state quantity of the inclination angle in the roll direction of the vehicle body) in the present invention may include a value of the inclination angle alone. Alternatively, it may include, besides the value of the inclination angle, a temporal change rate of the inclination angle (inclination angular velocity), for example.

Further, the "second motional state quantity" (motional state quantity of the steering angle of the steered wheel) may include a value of the steering angle alone. Alternatively, it may include, besides the value of the steering angle, a temporal change rate of the steering angle (steering angular velocity), for example.

In the mobile vehicle of the first aspect of the invention having the steered wheel, it has been confirmed, through various experiments and studies conducted by the present inventors, that steering of the steered wheel can cause a moment in the roll direction to act on the vehicle body. Accordingly, the posture state in the roll direction of the vehicle body can be controlled by the steering of the steered wheel.

Therefore, in the first aspect of the invention, the control device uses the first motional state quantity, including at least a value of the inclination angle in the roll direction (hereinafter, also simply referred to as "roll angle") of the vehicle body, and the second motional state quantity, including at least a value of the steering angle of the steered wheel, as the controlled state quantities, to control the steering actuator so as to stabilize the controlled state quantities.

Here, "to stabilize the controlled state quantities" means to make actual values of the controlled motional state quantities converge to prescribed desired values, or to generate a moment (in the roll direction) that acts on the mobile vehicle in the direction of making the actual values of the controlled motional state quantities approach the prescribed desired values, if not sufficient to make them converge.

In this case, the above-described desired value means a value of a controlled state quantity that is predetermined in correspondence with a desired posture state of the mobile vehicle. Typically adopted for this desired value is a value of the controlled state quantity in the straight-ahead posture state of the mobile vehicle (specifically, the state where the front wheel and the rear wheel are both standing in the upright posture on the ground surface and the axle centerlines (centers of rotational axes) of the front wheel and the rear wheel extend in parallel with each other in the direction orthogonal to the longitudinal direction of the vehicle body).

The desired value of a controlled state quantity, however, may be a value in a posture state other than the straight-ahead posture state of the mobile vehicle. For example, in the case where the mobile vehicle is provided with an operation apparatus for allowing a rider of the mobile vehicle to steer the steered wheel, or in the case where the wheel different from the steered wheel steerable by the aforesaid steering actuator is a steered wheel not equipped with an actuator for steering, the value may be a desired value (reflecting the requirement of the rider) which is determined in accordance with the force applied to the operation apparatus by the rider's manipulation or the manipulated variable of the operation apparatus, or in accordance with the steering angle of the steered wheel not equipped with the actuator.

In the first aspect of the invention, controlling the steering actuator so as to stabilize the controlled state quantities as described above can basically make the roll angle of the vehicle body and the steering angle of the steered wheel both converge to, or approach, their desired values.

In the first aspect of the invention, however, the control device controls the steering actuator such that the magnitude of the ratio Ra1/Rb1 between the sensitivity Ra1 of the change in value of the reference quantity to the change in observed value of the roll angle of the vehicle body and the sensitivity Rb1 of the change in value of the reference quantity to the change in observed value of the steering angle of the steered wheel becomes smaller as the magnitude of the observed value of the traveling speed of the mobile vehicle becomes larger.

Therefore, as the magnitude of the observed value of the traveling speed of the mobile vehicle becomes larger (i.e. as the traveling speed becomes higher), the sensitivity Ra1 of the change in value of the reference quantity to the change in observed value of the roll angle of the vehicle body becomes relatively small compared to the sensitivity Rb1 of the change in value of the reference quantity to the change in observed value of the steering angle of the steered wheel.

Consequently, in the case where the traveling speed of the mobile vehicle is in a high-speed range, even if the roll angle of the vehicle body deviates from the desired value, generation of the driving force of the steering actuator for eliminating the divergence is restricted as compared to when the traveling speed of the mobile vehicle is in a low-speed range.

Accordingly, when a rider is driving the mobile vehicle at a speed in a high-speed range, he/she can readily bank the vehicle body of the mobile vehicle for turning.

On the other hand, when the mobile vehicle is stopped or traveling at a low speed, the sensitivity Ra1 of the change in value of the reference quantity to the change in observed value of the roll angle of the vehicle body becomes relatively large compared to the sensitivity Rb1 of the change in value of the reference quantity to the change in observed value of the steering angle of the steered wheel.

Therefore, when the mobile vehicle is stopped or traveling at a low speed, if the roll angle of the vehicle body deviates from the desired value, the generation of the driving force of the steering actuator is performed for eliminating the divergence actively, as compared to when the mobile vehicle is traveling at a speed in a high-speed range. This allows the stability of the posture of the vehicle body to be maintained autonomously, without the need of skillful control by the rider.

Therefore, according to the mobile vehicle of the first aspect of the invention, it is possible to enhance the stability of the posture of the vehicle body by the steering of a front wheel or a rear wheel when the vehicle is stopped or traveling at a low speed, and also facilitate the rider's control of the posture of the vehicle body when the vehicle is traveling at a high speed.

It should be noted that in the first aspect of the invention, the case where the magnitude of the aforesaid ratio Ra1/Rb1 becomes smaller as the magnitude of the observed value of the traveling speed of the mobile vehicle becomes larger may be any of the following: the case where the sensitivity Ra1 becomes smaller as the magnitude of the observed value of the traveling speed of the mobile vehicle becomes larger; the case where the sensitivity Rb1 becomes larger as the magnitude of the observed value of the traveling speed of the mobile vehicle becomes larger; the case where the sensitivities Ra1 and Rb1 both become larger as the magnitude of the observed value of the traveling speed of the mobile vehicle becomes larger; and the case where the sensitivities Ra1 and Rb1 both become smaller as the magnitude of the observed value of the traveling speed of the mobile vehicle becomes larger.

In the first aspect of the invention, it is preferable that the first motional state quantity included in the controlled state quantities is made up of a value of the inclination angle in the roll direction of the vehicle body and a temporal change rate of the inclination angle, that the second motional state quantity included in the controlled state quantities is made up of a value of the steering angle of the steered wheel and a temporal change rate of the steering angle, and that the control device is configured to control the steering actuator such that the magnitude of the ratio Ra1/Rb1 becomes smaller as the magnitude of the observed value of the traveling speed of the mobile vehicle becomes larger, and also such that the magnitude of a ratio Ra2/Rb2 between sensitivity Ra2 of the change in value of the reference quantity to the change in observed value of the temporal change rate of the inclination angle in the roll direction of the vehicle body and sensitivity Rb2 of the change in value of the reference quantity to the change in observed value of the temporal change rate of the steering angle of the steered wheel becomes smaller as the magnitude of the observed value of the traveling speed of the mobile vehicle becomes larger (a second aspect of the invention).

According to the second aspect of the invention, as the magnitude of the observed value of the traveling speed of the mobile vehicle becomes larger (i.e. as the traveling speed becomes higher), the sensitivity Ra1 of the change in value of the reference quantity to the change in observed value of the roll angle of the vehicle body becomes relatively small compared to the sensitivity Rb1 of the change in value of the reference quantity to the change in observed value of the steering angle of the steered wheel, and additionally, the sensitivity Ra2 of the change in value of the reference quantity to the change in observed value of the temporal change rate (angular velocity) of the roll angle of the vehicle body becomes relatively small compared to the sensitivity Rb2 of the change in value of the reference quantity to the change in observed value of the temporal change rate (angular velocity) of the steering angle of the steered wheel.

Therefore, in the case where the traveling speed of the mobile vehicle is in a high-speed range, even if the roll angle of the vehicle body and the temporal change rate thereof deviate from their desired values, the generation of the driving force of the steering actuator for eliminating the divergences is restricted as compared to when the traveling speed of the mobile vehicle is in a low-speed range.

Further, when the mobile vehicle is stopped or traveling at a low speed, if the roll angle of the vehicle body and the temporal change rate thereof deviate from their desired values, the generation of the driving force of the steering actuator is performed for eliminating the divergences actively, as compared to when the traveling speed of the mobile vehicle is in a high-speed range.

Therefore, in the case where a rider is driving the mobile vehicle at a speed in a high-speed range, he/she can more readily bank the vehicle body of the mobile vehicle for turning. On the other hand, while the mobile vehicle is stopped or traveling at a low speed, the stability of the posture of the vehicle body can be maintained autonomously, without the need of skillful control by the rider.

It should be noted that in the second aspect of the invention, the case where the magnitude of the aforesaid ratio Ra2/Rb2 becomes smaller as the magnitude of the observed value of the traveling speed of the mobile vehicle becomes larger may be any of the following: the case where the sensitivity Ra2 becomes smaller as the magnitude of the observed value of the traveling speed of the mobile vehicle becomes larger; the case where the sensitivity Rb2 becomes larger as the magnitude of the observed value of the traveling speed of the mobile vehicle becomes larger; the case where the sensitivities Ra2 and Rb2 both become larger as the magnitude of the observed value of the traveling speed of the mobile vehicle becomes larger; and the case where the sensitivities Ra2 and Rb2 both become smaller as the magnitude of the observed value of the traveling speed of the mobile vehicle becomes larger.

In the first aspect of the invention, it is preferable that the control device is further configured to control the steering actuator such that the magnitude of the sensitivity Ra1 of the change in value of the reference quantity to the change in observed value of the inclination angle in the roll direction of the vehicle body becomes smaller as the magnitude of the observed value of the steering angle of the steered wheel from a non-steered state thereof becomes larger (a third aspect of the invention).

Similarly, in the second aspect of the invention, it is preferable that the control device is further configured to control the steering actuator such that the magnitude of the sensitivity Ra1 of the change in value of the reference quantity to the change in observed value of the inclination angle in the roll direction of the vehicle body and the magnitude of the sensitivity Ra2 of the change in value of the reference quantity to the change in observed value of the temporal change rate of the inclination angle each become smaller as the magnitude of the observed value of the steering angle of the steered wheel from a non-steered state thereof becomes larger (a fourth aspect of the invention).

Specifically, in the case where the magnitude of the actual steering angle of the steered wheel is large, compared to the case where it is small, the radius of curvature of the ground contact part of the steered wheel as seen in a cross section including the ground contact point of the steered wheel and having a normal direction corresponding to the longitudinal direction of the vehicle body generally becomes larger.

Therefore, in the case where the magnitude of the actual steering angle of the steered wheel is large, compared to the case where it is small, the change in movement amount of the ground contact point of the steered wheel according to the change in the steering angle becomes larger. Because of this, the sensitivity of the change in moment in the roll direction acting on the vehicle body to the change in actual steering angle of the steered wheel varies in accordance with the actual steering angle of the steered wheel. Accordingly, if it is configured such that the aforesaid sensitivity Ra1, or the sensitivities Ra1 and Ra2, is/are independent of the actual steering angle, oscillation is likely to occur in the posture control of the vehicle body (control of the roll angle) when the steering angle is relatively large.

In view of the foregoing, in the third aspect of the invention, it has been configured such that the magnitude of the sensitivity Ra1 changes in accordance with the observed value of the steering angle of the steered wheel, as described above. Similarly, in the fourth aspect of the invention, it has been configured such that the magnitudes of the sensitivities Ra1 and Ra2 both change in accordance with the observed value of the steering angle of the steered wheel, as described above. This can prevent the above-described oscillation even in the case where the actual steering angle of the steered wheel is large. Consequently, it is possible to secure high robustness in the posture control of the vehicle body of the mobile vehicle over a wide steering range of the steered wheel.

Further, in the first through fourth aspects of the invention, it is preferable that the mobile vehicle further includes an operation apparatus for a rider riding on the mobile vehicle to hold for performing steering of the steered wheel, the operation apparatus being arranged to be rotatively driven by a handlebar actuator for rotatively driving the operation apparatus in conjunction with the change of the steering angle of the steered wheel from a non-steered state thereof during the steering of the steered wheel by the steering actuator, and that the control device is further configured to control the handlebar actuator such that a rotational amount of the operation apparatus has saturation characteristics with respect to the steering angle of the steered wheel from the non-steered state thereof (a fifth aspect of the invention).

Here, the above-described saturation characteristics refer to the characteristics that the sensitivity of the change in rotational amount of the operation apparatus to the change in magnitude of the steering angle of the steered wheel becomes relatively small when the magnitude of the steering angle of the steered wheel is large as compared to when it is small.

According to the fifth aspect of the invention, even if the steering angle of the steered wheel by the steering actuator becomes relatively large, the rotational amount of the operation apparatus is prevented from becoming excessively large. This can prevent the rider from having a sense of discomfort about the movement of the operation apparatus.

It should be noted that in the first through fifth aspects of the invention described above, the aforesaid control device may adopt, by way of example, the following configuration. The control device includes, for example, an actuator operational target determining section which successively receives observed values of the actual values of the aforesaid controlled state quantities and determines an operational target of the aforesaid steering actuator, in accordance with deviations of the received observed values from desired values of the corresponding controlled state quantities for stabilizing the controlled state quantities, so as to make the deviations approach zero, by a feedback control law. The control device is configured to control the steering actuator in accordance with the determined operational target.

In this case, for the operational target, a desired value of the aforesaid reference quantity, for example, may be adopted.

Supplementally, in the present specification, the "observed value" of a given state quantity related to the mobile vehicle (such as the roll angle of the vehicle body) means a detected value or an estimate of the actual value of the state quantity. In this case, the "detected value" means an actual value of the state quantity which is detected by an appropriate sensor. The "estimate" means a value which is estimated from a detected value of at least one state quantity having correlation with the state quantity, on the basis of the correlation, or it means a pseudo estimate which can be considered to coincide with, or almost coincide with, the actual value of the state quantity.

For the "pseudo estimate", for example in the case where it is expected that the actual value of the state quantity can adequately track a desired value of the state quantity, the desired value may be adopted as the pseudo estimate of the actual value of the state quantity.

DESCRIPTION OF THE PREFERRED EMBODIMENTS

First Embodiment

A first embodiment of the present invention will be described below with reference to FIGS. 1 to 13.

Figure 1:
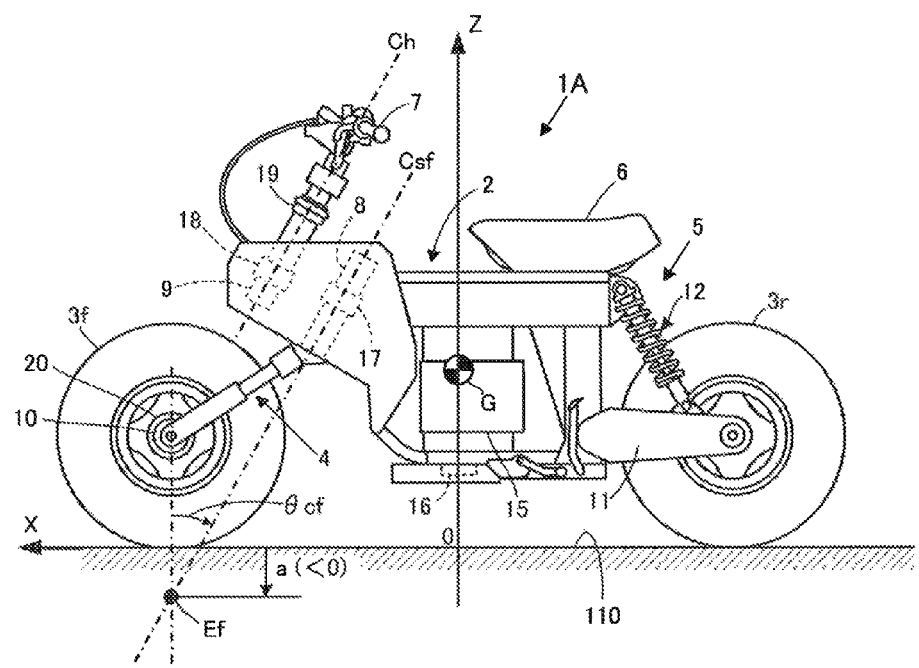
FIG. 1 is a side view of a mobile vehicle (two-wheeled vehicle) according to a first embodiment of the present invention.

Referring to FIG. 1, a mobile vehicle 1A according to the present embodiment is a two-wheeled vehicle which includes a vehicle body 2, and a front wheel 3$f$ and a rear wheel 3$r$ arranged spaced apart from each other in the longitudinal direction of the vehicle body 2. Hereinafter, the mobile vehicle 1A will be referred to as "two-wheeled vehicle 1A".

On the upper surface of the vehicle body 2, a seat 6 is provided for a rider to sit astride.

At the front portion of the vehicle body 2, a front-wheel support mechanism 4 for axially supporting the front wheel 3$f$, an operation apparatus 7 for a rider who has sat on the seat 6 to hold, and actuators 8 and 9 are mounted. The actuator 8 generates a steering force for steering the front wheel 3$f$. The actuator 9 generates a steering force for moving the operation apparatus 7 in conjunction with the steering of the front wheel 3$f$.

The front-wheel support mechanism 4 is made up of a front fork which includes a suspension mechanism such as a damper, for example. The mechanical structure of the front-wheel support mechanism is similar to that of a conventional motorcycle, for example. At one end of this front-wheel support mechanism 4 (at its end on the front side of the vehicle body 2), the front wheel 3$f$ is axially supported, via bearings or the like, such that it can rotate about the axle centerline (rotational axis of the front wheel 3$f$) that extends in the direction orthogonal to the diameter direction of the front wheel 3$f$ (in the direction perpendicular to the paper plane of FIG. 1).

In the present embodiment, an actuator 10 for rotatively driving the front wheel 3$f$ about its axle centerline is attached to the axle of the front wheel 3$f$. The actuator 10 serves as a power engine which generates a thrust force for the two-wheeled vehicle 1A. In the present embodiment, this actuator 10 (hereinafter, also referred to as "front-wheel driving actuator 10") is made up of an electric motor (with a speed reducer).

It should be noted that the actuator 10 may be made up of a hydraulic actuator, for example, instead of the electric motor. Alternatively, the actuator 10 may be made up of an internal combustion engine. Furthermore, the actuator 10 may be attached to the vehicle body 2 at a position apart from the axle of the front wheel 3$f$, and the actuator 10 and the axle of the front wheel 3$f$ may be connected by an appropriate power transmission device.

The two-wheeled vehicle 1A may be equipped, not with the actuator 10 for rotatively driving the front wheel 3$f$ about its axle centerline, but with an actuator for rotatively driving the rear wheel 3$r$ about its axle centerline. Alternatively, the two-wheeled vehicle 1A may be equipped with an actuator for rotatively driving the front wheel 3$f$ and the rear wheel 3$r$ about their respective axle centerlines.

The front-wheel support mechanism 4 is mounted to the front portion of the vehicle body 2 such that the mechanism can rotate about a steering axis Csf which is tilted backward. This configuration makes the front wheel 3f serve as a steered wheel which can be rotated, or, steered about the steering axis Csf together with the front-wheel support mechanism 4. As the steering axis Csf is tilted backward, the front wheel 3f has a positive caster angle θcf.

It should be noted that the steering axis Csf being tilted backward means that the steering axis Csf extends obliquely with respect to the longitudinal direction and up-and-down direction of the vehicle body 2 such that the steering axis Csf has its upper portion located rearward relative to its lower portion in the front-rear (longitudinal) direction of the vehicle body 2.

Supplementally, in the two-wheeled vehicle 1A of the present embodiment, the relative arrangement of the steering axis Csf and the front wheel 3f in the state where the two-wheeled vehicle 1A is stationary in the straight-ahead posture (this state will be hereinafter referred to as "basic posture state") is set, as shown in FIG. 1, such that an intersection point Ef of the steering axis Csf and a straight line connecting the center of the axle of the front wheel 3f and the ground contact point thereof is located below the ground surface 110 (or, such that a height a of the intersection point Ef from the ground surface 110 is lower (a<0) than the ground surface 110) in the basic posture state.

In other words, the relative arrangement of the steering axis Csf and the front wheel 3f in the above-described basic posture state is set such that the point of intersection of the steering axis Csf and the ground surface 110 is located behind the ground contact point of the front wheel 3f (such that the front wheel 3f has a negative trail) in the basic posture state.

It should be noted that the basic posture state of the two-wheeled vehicle 1A more specifically refers to the state where the front wheel 3f and the rear wheel 3r are both stationary in the upright posture in contact with the ground surface 110 and the axle centerlines (centers of the rotational axes) of the front wheel 3f and the rear wheel 3r extend in parallel with each other in the direction orthogonal to the longitudinal direction of the vehicle body 2.

In the two-wheeled vehicle 1A according to the present embodiment, the relative arrangement of the steering axis Csf and the front wheel 3f in the basic posture state is set, as stated above, such that the height a of the intersection point Ef from the ground surface 110 is lower than the ground surface 110, for the following reason.

According to various experiments and studies conducted by the present inventors, in order to cause a moment (in the roll direction) effective in stably controlling the posture of the vehicle body 2 to act on the vehicle body 2 by the steering of the front wheel 3f of the two-wheeled vehicle 1A, it is preferable that the height a of the aforesaid intersection point Ef from the ground surface 110 is lower than a certain level (including the case where it is lower than the ground surface 110).

In view of the foregoing, in the present embodiment, the relative arrangement of the steering axis Csf and the front wheel 3f in the basic posture state has been set as described above, by way of example, such that the front wheel 3f of the two-wheeled vehicle 1A has a negative trail. The trail of the front wheel 3f, however, does not necessarily have to be negative; the relative arrangement of the steering axis Csf and the front wheel 3f may be set such that the front wheel 3f has a positive trail. Basically, what is required is only that the steering of the front wheel 3f can cause a moment in the roll direction to act on the vehicle body 2.

The aforesaid actuator 8 generates, as a steering force for performing the steering of the front wheel 3f, a rotative driving force to cause the front wheel 3f to rotate about the steering axis Csf. In the present embodiment, this actuator 8 is made up of an electric motor (with a speed reducer). The actuator 8 (hereinafter, also referred to as "front-wheel steering actuator 8") is connected to the front-wheel support mechanism 4 so as to apply the rotative driving force about the steering axis Csf to the front-wheel support mechanism 4.

Accordingly, as the rotative driving force is applied from the front-wheel steering actuator 8 to the front-wheel support mechanism 4, the front-wheel support mechanism 4 is rotatively driven about the steering axis Csf together with the front wheel 3f. As a result, the front wheel 3f is steered by the rotative driving force from the front-wheel steering actuator 8.

It should be noted that the actuator 8 is not limited to the electric motor; it may be made up, for example, of a hydraulic actuator.

The operation apparatus 7 is mounted to the front portion of the vehicle body 2 such that the operation apparatus 7 can rotate about a handlebar axis Ch which is parallel to the steering axis Csf of the front wheel 3f. Although not shown in detail in the figure, this operation apparatus 7 is equipped with an accelerator grip, brake lever, turn signal switch, and so on, as with the handlebar of a conventional motorcycle.

The aforesaid actuator 9 generates, as a steering force for moving the operation apparatus 7, a rotative driving force for causing the operation apparatus 7 to rotate about the handlebar axis Ch. In the present embodiment, this actuator 9 is made up of an electric motor (with a speed reducer). The actuator 9 (hereinafter, also referred to as "handlebar driving actuator 9") is connected to the operation apparatus 7 so as to apply the rotative driving force about the handlebar axis Ch to the operation apparatus 7.

In the two-wheeled vehicle 1A of the present embodiment, as shown in FIG. 1, the handlebar axis Ch of the operation apparatus 7 is offset from the steering axis Csf of the front wheel 3f. Alternatively, the handlebar axis Ch may be arranged concentrically with the steering axis Csf. Still alternatively, the handlebar axis Ch may be tilted with respect to the steering axis Csf.

Further, the actuator 9 may be made up of a hydraulic actuator, for example, instead of the electric motor.

At the rear portion of the vehicle body 2, a rear-wheel support mechanism 5 for axially supporting the rear wheel 3r in a rotatable manner is mounted. The rear-wheel support mechanism 5 includes a swing arm 11, and a suspension mechanism 12 made up of a coil spring, damper, and so on. These mechanical structures are similar to those in the rear-wheel support mechanism in a conventional motorcycle, for example.

At one end of the swing arm 11 (at its end on the rear side of the vehicle body 2), the rear wheel 3r is axially supported, via bearings or the like, such that it can rotate about the axle centerline (center of the rotational axis of the rear wheel 3r) that extends in the direction orthogonal to the diameter direction of the rear wheel 3r (in the direction perpendicular to the paper plane of FIG. 1). It should be noted that the rear wheel 3r is a non-steered wheel.

Figure 2:
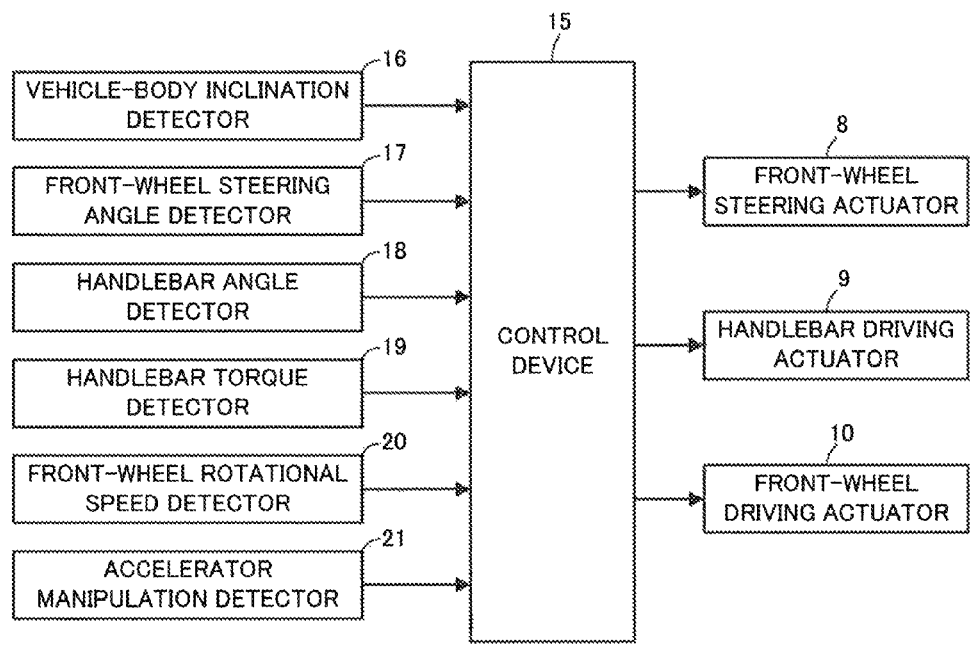
FIG. 2 is a block diagram showing the configuration related to the control of the mobile vehicle according to the first embodiment.

Besides the above-described mechanical configuration, the two-wheeled vehicle 1A includes, as shown in FIG. 2, a control device 15 which carries out control processing for controlling the operations of the aforesaid front-wheel steering actuator 8, handlebar driving actuator 9, and front-wheel driving actuator 10 (and, hence, controlling the posture of the vehicle body 2 and so on).

The two-wheeled vehicle 1A further includes, as sensors for detecting various kinds of state quantities necessary for the control processing in the control device 15, a vehicle-body inclination detector 16 for detecting an inclination angle φb in the roll direction of the vehicle body 2, a front-wheel steering angle detector 17 for detecting a steering angle δf (angle of rotation about the steering axis Csf) of the front wheel 3f, a handlebar angle detector 18 for detecting a handlebar angle δh which is the rotational angle (angle of rotation about the handlebar axis Ch) of the operation apparatus 7, a handlebar torque detector 19 for detecting a handlebar torque Th which is the torque acting on the operation apparatus 7 about the handlebar axis Ch, a front-wheel rotational speed detector 20 for detecting a rotational speed (angular velocity) of the front wheel 3f, and an accelerator manipulation detector 21 which outputs a detection signal corresponding to the accelerator manipulated variable which is the manipulated variable (rotational amount) of the accelerator grip of the operation apparatus 7.

It should be noted that the steering angle δf of the front wheel 3f more specifically means the rotational angle of the front wheel 3f from the steering angle (neutral steering angle) in its non-steered state (the state in which the direction of the axle centerline of the front wheel 3f is orthogonal to the longitudinal direction of the vehicle body 2). Therefore, the steering angle δf of the front wheel 3f in the non-steered state is "0". The positive rotational direction of the steering angle δf of the front wheel 3f corresponds to the direction of rotation that makes the front end of the front wheel 3f turn left with respect to the vehicle body 2 (in other words, the direction in which the front wheel 3f turns counterclockwise about the steering axis Csf as the two-wheeled vehicle 1A is seen from above).

Further, the handlebar angle δh of the operation apparatus 7 means the rotational angle of the operation apparatus 7 from its posture state corresponding to the non-steered state of the front wheel 3f. The positive rotational direction of the handlebar angle δh corresponds to the direction in which the operation apparatus 7 turns counterclockwise about the handlebar axis Ch as the two-wheeled vehicle 1A is seen from above.

The control device 15, which is an electronic circuit unit made up of a CPU, RAM, ROM, interface circuit and so on, is mounted on the vehicle body 2. This control device 15 is configured to receive outputs (detection signals) from the respective detectors 16 to 21 described above.

The control device 15 may include a plurality of CPUs or processors. Further, the control device 15 may be made up of a plurality of mutually communicable electronic circuit units.

The vehicle-body inclination detector 16, which is made up of an acceleration sensor and a gyro sensor (angular velocity sensor), for example, is mounted on the vehicle body 2. In this case, the control device 15 carries out arithmetic processing on the basis of the outputs of the acceleration sensor and the gyro sensor, to measure the inclination angle in the roll direction (more specifically, the inclination angle in the roll direction with respect to the vertical direction (direction of gravitational force)) of the vehicle body 2. For this measurement, the technique proposed by the present applicant in Japanese Patent No. 4181113, for example, may be adopted.

The front-wheel steering angle detector 17 is made up, for example, of a rotary encoder attached to the front-wheel steering actuator 8 (electric motor) on the aforesaid steering axis Csf.

The handlebar angle detector 18 is made up, for example, of a rotary encoder attached to the handlebar driving actuator 9 (electric motor) on the aforesaid handlebar axis Ch.

The handlebar torque detector 19 is made up, for example, of a force sensor interposed between the operation apparatus 7 and the handlebar driving actuator 9.

The front-wheel rotational speed detector 20 is made up, for example, of a rotary encoder attached to the axle of the front wheel 3f.

The accelerator manipulation detector 21 is made up, for example, of a rotary encoder or a potentiometer built in the operation apparatus 7.

The functions of the above-described control device 15 will be described further with reference to FIG. 3. The XYZ coordinate system used in the following description is, as shown in FIG. 1, a coordinate system in which, in the basic posture state of the two-wheeled vehicle 1A, the vertical direction (up-and-down direction) is defined as the Z-axis direction, the longitudinal direction of the vehicle body 2 as the X-axis direction, the lateral direction of the vehicle body 2 as the Y-axis direction (Y-axis not shown in the figure), and a point on the ground surface 110 immediately beneath the overall center of gravity G of the two-wheeled vehicle 1A as the origin.

Further, in the following description, the suffix "_act" is added to the reference characters of a state quantity as a sign indicating an actual value or its observed value (detected value or estimate). For a desired value, the suffix "_cmd" is added.

Figure 3:
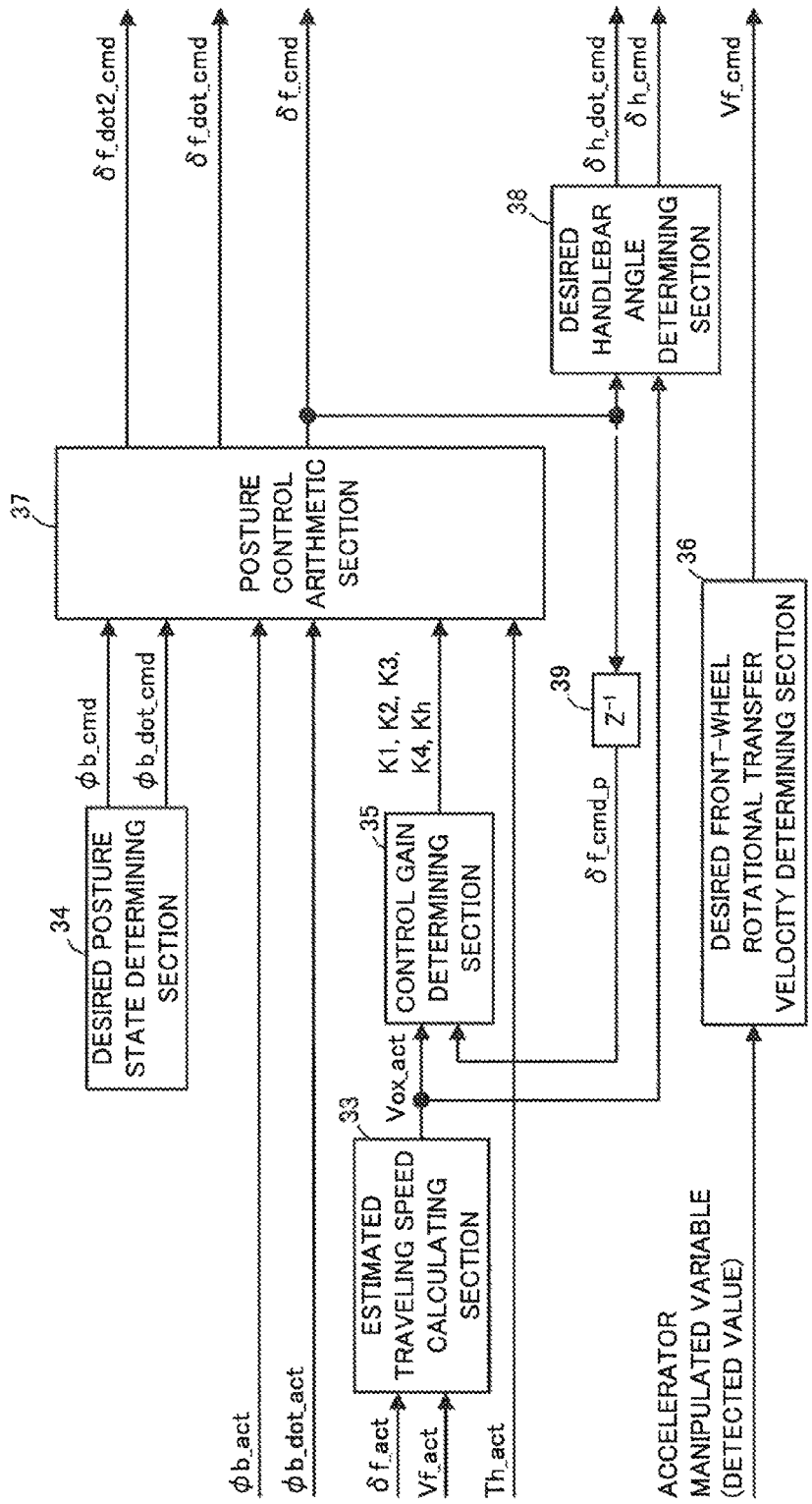
FIG. 3 is a block diagram showing the major functions of the control device shown in FIG. 2.

The control device 15 includes, as functions implemented when the CPU executes installed programs (functions implemented by software) or as functions implemented by hardware, as shown in FIG. 3: an estimated traveling speed calculating section 33 which calculates an estimate of the actual value Vox_act (hereinafter, referred to as "estimated traveling speed Vox_act") of the traveling speed Vox of the two-wheeled vehicle 1A, a desired posture state determining section 34 which determines a desired value φb_cmd (hereinafter, referred to as "desired roll angle φb_cmd") of the roll angle (inclination angle in the direction about the X axis (roll direction)) φb of the vehicle body 2 and a desired value φb_dot_cmd (hereinafter, referred to as "desired roll angular velocity φb_dot_cmd") of the roll angular velocity φb_dot which is a temporal change rate of the roll angle φb, a control gain determining section 35 which determines values of a plurality of gains K1, K2, K3, K4, and Kh for posture control of the vehicle body 2, and a desired front-wheel rotational transfer velocity determining section 36 which determines a desired value Vf_cmd (hereinafter, referred to as "desired front-wheel rotational transfer velocity Vf_cmd") of the rotational transfer velocity Vf of the front wheel 3f (translational velocity of the front wheel 3f as the front wheel 3f rolls on the ground surface 110).

The control device 15 further includes: a posture control arithmetic section 37 which carries out arithmetic processing for the posture control of the vehicle body 2 to thereby determine a desired value δf_cmd (hereinafter, referred to as "desired front-wheel steering angle δf_cmd") of the steering angle δf of the front wheel 3f, a desired value δf_dot_cmd (hereinafter, referred to as "desired front-wheel steering angular velocity δf_dot_cmd") of the steering angular velocity δf_dot which is a temporal change rate of the steering angle δf, and a desired value δf_dot2_cmd (hereinafter, referred to as "desired front-wheel steering angular acceleration δf_dot2_cmd") of the steering angular acceleration δf_dot2 which is a temporal change rate of the steering angular velocity δf_dot, and a desired handlebar angle determining section 38 which determines a desired value δh_cmd (hereinafter, referred to as "desired handlebar angle δh_cmd") of the handlebar angle δh of the operation apparatus 7, and a desired value δh_dot_cmd (hereinafter, referred to as "desired handlebar angular velocity δh_dot_cmd") of the handlebar angular velocity δh_dot which is a temporal change rate of the handlebar angle δh.

The control device 15 carries out the processing in the above-described functional sections successively at prescribed control processing cycles. The control device 15 then controls the front-wheel steering actuator 8 in accordance with the desired front-wheel steering angle δf_cmd, the desired front-wheel steering angular velocity δf_dot_cmd, and the desired front-wheel steering angular acceleration δf_dot2_cmd determined by the posture control arithmetic section 37.

Further, the control device 15 controls the front-wheel driving actuator 10 in accordance with the desired front-wheel rotational transfer velocity Vf_cmd determined by the desired front-wheel rotational transfer velocity determining section 36.

Further, the control device 15 controls the handlebar driving actuator 9 in accordance with the desired handlebar angle δh_cmd and the desired handlebar angular velocity δh_dot_cmd determined by the desired handlebar angle determining section 38.

The control processing performed by the control device 15 will be described below in detail.

At each control processing cycle, the control device 15 first carries out the processing in the estimated traveling speed calculating section 33.

As shown in FIG. 3, the estimated traveling speed calculating section 33 receives an estimate of the actual value Vf_act (hereinafter, referred to as "estimated front-wheel rotational transfer velocity Vf_act") of the rotational transfer velocity Vf of the front wheel 3f (translational velocity of the front wheel 3f as the front wheel 3f rolls on the ground surface 110), and a detected value of the actual value δf_act (hereinafter, referred to as "detected front-wheel steering angle δf_act") of the steering angle δf of the front wheel 3f, which is indicated by an output from the front-wheel steering angle detector 17.

It should be noted that the estimated front-wheel rotational transfer velocity Vf_act is a velocity which is calculated by multiplying a detected value (observed value) of the rotational angular velocity of the front wheel 3f, indicated by an output from the aforesaid front-wheel rotational speed detector 20, by a predetermined effective rolling radius of the front wheel 3f.

Figure 4:
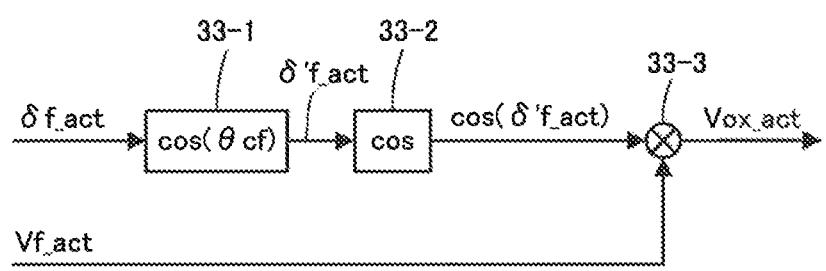
FIG. 4 is a block diagram showing the processing performed by the estimated traveling speed calculating section shown in FIG. 3.

The estimated traveling speed calculating section 33 carries out the processing shown in the block diagram in FIG. 4 to calculate an estimated traveling speed Vox_act.

In FIG. 4, a processing section 33-1 is a processing section which multiplies a detected front-wheel steering angle δf_act at the current time by a cosine value cos(θcf) of the caster angle θcf of the front wheel 3f, to thereby calculate an estimate of the actual value δ'f_act (hereinafter, referred to as "estimated front-wheel effective steering angle δ'f_act") of a front-wheel effective steering angle δ'f which corresponds to the rotational angle in the yaw direction of the front wheel 3f.

Here, the front-wheel effective steering angle δ'f is an angle of the line of intersection of the ground surface 110 and the rotational plane of the front wheel 3f being steered (plane passing through the center of the axle of the front wheel 3f and orthogonal to the axle centerline of the front wheel 3f) with respect to the longitudinal direction (X-axis direction) of the vehicle body 2.

In the case where the roll angle φb of the vehicle body 2 is relatively small, the estimated front-wheel effective steering angle δ'f_act can be calculated approximately by the following expression (1). The processing in the above-described processing section 33-1 is the processing of approximately calculating δ'f_act by the expression (1).

$$\delta'f\_act = \cos(\theta cf) * \delta f\_act \tag{1}$$

To further improve the accuracy of δ'f_act, δ'f_act may be obtained by a mapping from δf_act. Alternatively, to still further improve the accuracy of δ'f_act, δf_act may be obtained by a mapping (two-dimensional mapping) or the like from the detected front-wheel steering angle δf_act and a detected value of the actual roll angle φb_act of the vehicle body 2, which is indicated by an output from the vehicle-body inclination detector 16.

In FIG. 4, a processing section 33-2 represents a processing section which obtains a cosine value cos(δ'f_act) of the estimated front-wheel effective steering angle δ'f_act calculated in the processing section 33-1, and a processing section 33-3 represents a processing section which multiplies an estimated front-wheel rotational transfer velocity Vf_act at the current time by the above-described cosine value cos(δ'f_act) to thereby calculate an estimated traveling speed Vox_act.

Accordingly, the estimated traveling speed calculating section 33 is configured to calculate Vox_act by multiplying Vf_act by the cosine value cos(δ'f_act) of δ'f_act. That is, Vox_act is calculated by the following expression (2).

$$\begin{aligned}\text{Vox\_act} &= \text{Vf\_act} * \cos(\delta'f\_act) \\ &= \text{Vf\_act} * \cos(\delta f\_act * \cos(\theta cf))\end{aligned} \tag{2}$$

The estimated traveling speed Vox_act calculated in this manner corresponds to a component in the X-axis direction of the estimated front-wheel rotational transfer velocity Vf_act.

It should be noted that in the processing in the estimated traveling speed calculating section 33, instead of the detected front-wheel steering angle δf_act and the estimated front-wheel rotational transfer velocity Vf_act at the current time, a value (last time's value) δf_cmd_p of the desired front-wheel steering angle δf_cmd, calculated by the posture control arithmetic section 37 (described later) in the last time's control processing cycle, and a value (last time's value) Vf_cmd_p of the desired front-wheel rotational transfer velocity Vf_cmd, calculated by the desired front-wheel rotational transfer velocity determining section 36 (described later) in the last time's control processing cycle, respectively, may be used. More specifically, δf_cmd_p and Vf_cmd_p may be used to perform computation similar to that in the right side of the above expression (2), and the resultant value (=Vf_cmd_p*cos(δf_cmd_p*cos(θcf))) may be obtained as a pseudo estimate (alternative observed value) as an alternative to the estimated traveling speed Vox_act.

Alternatively, in obtaining the pseudo estimate (alternative observed value) as an alternative to the estimated traveling speed Vox_act, δf_cmd_p may be used instead of the detected front-wheel steering angle δf_act at the current time, and the estimated front-wheel rotational transfer velocity Vf_act may be used as it is. Conversely, Vf_cmd_p may be used instead of the estimated front-wheel rotational transfer velocity Vf_act at the current time, and the detected front-wheel steering angle δf_act may be used as it is.

Still alternatively, an observed value of the actual rotational angular velocity of the rear wheel 3r (detected by an appropriate detector such as a rotary encoder) may be multiplied by a predetermined effective rolling radius of the rear wheel 3r to estimate an actual rotational transfer velocity of the rear wheel 3r, and the resultant estimate may be obtained as the estimated traveling speed Vox_act.

Next, the control device 15 carries out the processing in the desired front-wheel rotational transfer velocity determining section 36.

As shown in FIG. 3, the desired front-wheel rotational transfer velocity determining section 36 receives a detected value of the actual value of the accelerator manipulated variable, which is indicated by an output from the aforesaid accelerator manipulation detector 21.

Figure 6:
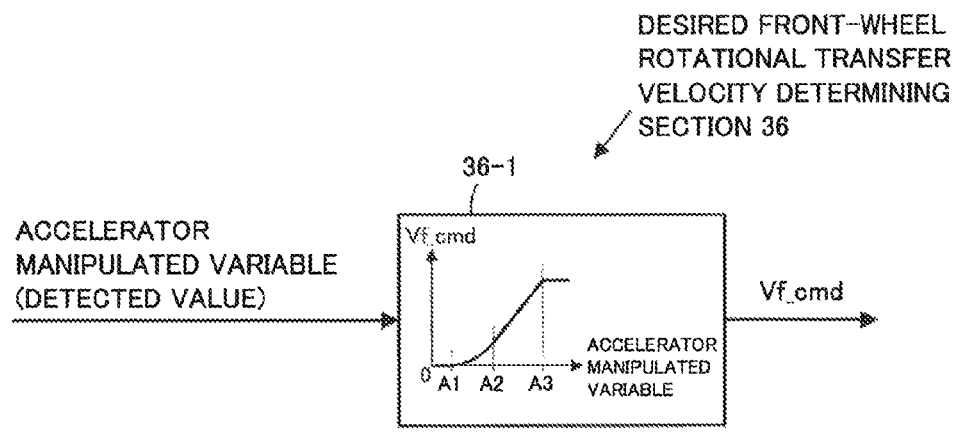
FIG. 6 is a block diagram showing the processing performed by the desired front-wheel rotational transfer velocity determining section shown in FIG. 3.

The desired front-wheel rotational transfer velocity determining section 36 determines a desired front-wheel rotational transfer velocity Vf_cmd by the processing shown in the block diagram in FIG. 6, i.e. the processing in a processing section 36-1.

The processing section 36-1 determines the desired front-wheel rotational transfer velocity Vf_cmd from a detected value of the accelerator manipulated variable at the current time, by a preset conversion function.

The conversion function is a function which is defined, for example, by a mapping or an arithmetic expression. This conversion function is basically set such that Vf_cmd determined by the conversion function increases monotonically as the accelerator manipulated variable increases.

The conversion function is set, for example, with the trend as illustrated by the graph in FIG. 6. In this case, the processing section 36-1 determines Vf_cmd to be zero when the detected value of the accelerator manipulated variable falls within the dead band range (range near zero) from zero to a prescribed first accelerator manipulated variable A1.

Further, when the detected value of the accelerator manipulated variable falls within the range from the first accelerator manipulated variable A1 to a prescribed second accelerator manipulated variable A2 (>A1), the processing section 36-1 determines Vf_cmd such that Vf_cmd increases monotonically as the accelerator manipulated variable increases and that the rate of increase of Vf_cmd (increase of Vf_cmd per unit increase of the accelerator manipulated variable) increases smoothly.

When the detected value of the accelerator manipulated variable falls within the range from the second accelerator manipulated variable A2 to a prescribed third accelerator manipulated variable A3 (>A2), the processing section 36-1 determines Vf_cmd such that Vf_cmd increases monotonically, at a constant rate of increase, as the accelerator manipulated variable increases.

Further, when the detected value of the accelerator manipulated variable exceeds the third accelerator manipulated variable A3, the processing section 36-1 determines Vf_cmd such that it remains at a constant value (at the value corresponding to A3).

Next, the control device 15 carries out the processing in the control gain determining section 35. As shown in FIG. 3, the control gain determining section 35 receives, via a delay element 39, a last time's desired front-wheel steering angle δf_cmd_p, which is a value (last time's value) of the desired front-wheel steering angle δf_cmd determined by the posture control arithmetic section 37 in the last time's control processing cycle of the control device 15. The control gain determining section 35 also receives an estimated traveling speed Vox_act calculated by the estimated traveling speed calculating section 33 in the current time's control processing cycle.

Figure 5:
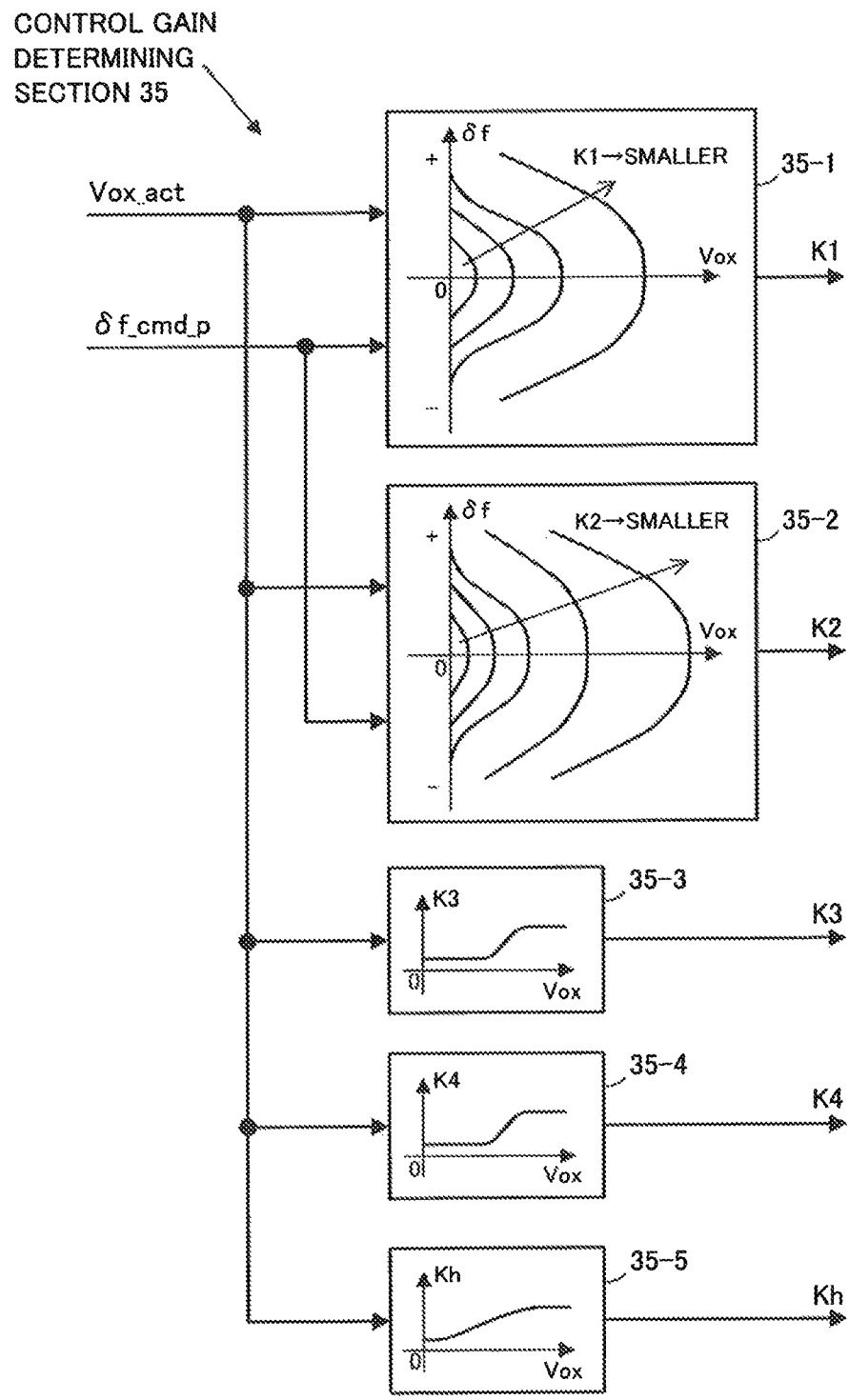
FIG. 5 is a block diagram showing the processing performed by the control gain determining section shown in FIG. 3.

The control gain determining section 35 carries out the processing shown in the block diagram in FIG. 5, for example, to determine values of a plurality of gains K1, K2, K3, K4, and Kh for the posture control of the vehicle body 2.

The values of the gains K1, K2, K3, K4, and Kh are each determined variably in accordance with δf_cmd_p and Vox_act, or in accordance with Vox_act, as will be described in detail later.

Next, the control device 15 carries out the processing in the desired posture state determining section 34. The desired posture state determining section 34 determines a desired roll angle φb_cmd and a desired roll angular velocity φb_dot_cmd of the vehicle body 2. In the present embodiment, the desired posture state determining section 34 sets both of the desired roll angle φb_cmd and the desired roll angular velocity φb_dot_cmd to zero, by way of example.

Next, the control device 15 carries out the processing in the posture control arithmetic section 37. As shown in FIG. 3, the posture control arithmetic section 37 receives the desired roll angle φb_cmd and the desired roll angular velocity φb_dot_cmd determined by the desired posture state determining section 34, a detected value φb_act (hereinafter, referred to as "detected roll angle φb_act") of the actual roll angle and a detected value φb_dot_act (hereinafter, referred to as "detected roll angular velocity φb_dot_act") of the actual roll angular velocity, indicated by an output from the vehicle-body inclination detector 16, the gains K1, K2, K3, K4, and Kh determined by the control gain determining section 35, and a detected value Th_act (hereinafter, referred to as "detected handlebar torque Th_act") of the actual value of the handlebar torque Th, indicated by an output from the aforesaid handlebar torque detector 19.

Figure 7:
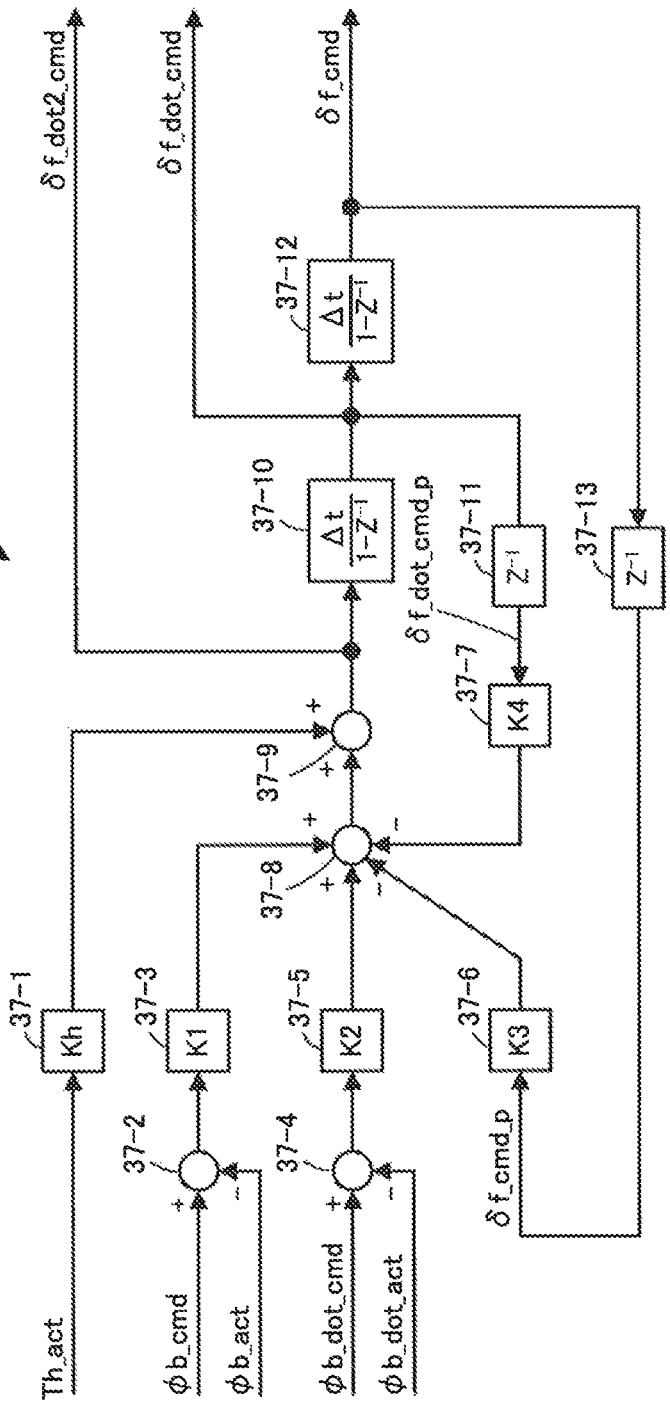
FIG. 7 is a block diagram showing a first example of the processing performed by the posture control arithmetic section shown in FIG. 3.

The posture control arithmetic section 37 uses the above-described input values to carry out the processing shown in the block diagram in FIG. 7, to thereby determine a desired front-wheel steering angle δf_cmd, a desired front-wheel steering angular velocity δf_dot_cmd, and a desired front-wheel steering angular acceleration δf_dot2_cmd.

In FIG. 7, a processing section 37-1 represents a processing section which multiplies Th_act by the gain Kh to convert Th_act into a required value of the angular acceleration of the steering angle of the front wheel 3f, a processing section 37-2 represents a processing section which obtains a deviation of a detected roll angle φb_act from a desired roll angle φb_cmd, a processing section 37-3 represents a processing section which multiplies the output of the processing section 37-2 by the gain K1, a processing section 37-4 represents a processing section which obtains a deviation of a detected roll angular velocity φb_dot_act from a desired roll angular velocity φb_dot_cmd, a processing section 37-5 represents a processing section which multiplies the output of the processing section 37-4 by the gain K2, a processing section 37-6 represents a processing section which multiplies a last time's desired front-wheel steering angle δf_cmd_p by the gain K3, a processing section 37-7 represents a processing section which multiplies a last time's desired front-wheel steering angular velocity δf_dot_cmd_p, which is a value of the desired front-wheel steering angular velocity δf_dot_cmd determined by the posture control arithmetic section 37 in the last time's control processing cycle, by the gain K4, a processing section 37-8 represents a processing section which calculates a sum of the outputs from the processing sections 37-3 and 37-5 and the values, each multiplied by −1, of the outputs from the processing sections 37-6 and 37-7, and a processing section 37-9 represents a processing section which sums up the outputs from the processing sections 37-8 and 37-1 to thereby calculate a desired front-wheel steering angular acceleration δf_dot2_cmd.

Further, a processing section 37-10 represents a processing section which integrates the output of the processing section 37-9 to obtain a desired front-wheel steering angular velocity δf_dot_cmd, a processing section 37-11 represents a delay element which outputs the output from the processing section 37-10 in the last time's control processing cycle (i.e. last time's desired front-wheel steering angular velocity δf_dot_cmd_p) to the processing section 37-7, a processing section 37-12 represents a processing section which integrates the output of the processing section 37-10 to obtain a desired front-wheel steering angle δf_cmd, and a processing section 37-13 represents a delay element which outputs the output from the processing section 37-12 in the last time's control processing cycle (i.e. last time's desired front-wheel steering angle δf_cmd_p) to the processing section 37-6.

Accordingly, the posture control arithmetic section 37 calculates the desired front-wheel steering angular acceleration δf_dot2_cmd by the following expression (3).

$$\delta f\_dot2\_cmd = \\ (K1*(\phi b\_cmd - \phi b\_act) + K2*(\phi b\_dot\_cmd - \phi b\_dot\_act) - \\ K3*\delta f\_cmd\_p - K4*\delta f\_dot\_cmd\_p) + Kh*Th\_act \quad (3)$$

In the above expression (3), $K1*(\phi b\_cmd - \phi b\_act)$ is a feedback manipulated variable having the function of making the deviation ($\phi b\_cmd - \phi b\_act$) approach "0", $K2*(\phi b\_dot\_cmd - \phi b\_dot\_act)$ is a feedback manipulated variable having the function of making the deviation ($\phi b\_dot\_cmd - \phi b\_dot\_act$) approach "0", $-K3*\delta f\_cmd\_p$ is a feedback manipulated variable having the function of making δf_cmd approach "0", and $-K4*\delta f\_dot\_cmd\_p$ is a feedback manipulated variable having the function of making δf_dot_cmd approach "0".

Further, Kh*Th_act is a feedforward manipulated variable corresponding to the actual handlebar torque (detected handlebar torque Th_act) applied to the operation apparatus 7 by the rider.

The posture control arithmetic section 37 integrates δf_dot2_cmd determined by the above expression (3) to determine a desired front-wheel steering angular velocity δf_dot_cmd. Further, the posture control arithmetic section 37 integrates this δf_dot_cmd to determine a desired front-wheel steering angle δf_cmd.

It should be noted that δf_cmd_p and δf_dot_cmd_p used in the computation of the expression (3) have the meanings as pseudo estimates (alternative observed values) of the actual steering angle and steering angular velocity, respectively, of the front wheel 3f at the current time. Therefore, instead of δf_cmd_p, a detected front-wheel steering angle δf_act at the current time may be used. Further, instead of δf_dot_cmd_p, a detected front-wheel steering angular velocity δf_dot_act (detected value of the actual steering angular velocity of the front wheel 3f) based on an output from the aforesaid front-wheel steering angle detector 17 may be used.

The above has described the processing in the posture control arithmetic section 37.

In accordance with the processing in the posture control arithmetic section 37, the desired front-wheel steering angular acceleration δf_dot2_cmd is basically determined, in the case where no handlebar torque Th is applied to the operation apparatus 7, such that any divergence of the actual roll angle (detected roll angle φb_act) of the vehicle body 2 of the two-wheeled vehicle 1A from a desired roll angle φb_cmd, or any divergence of the actual roll angular velocity (detected roll angular velocity φb_dot_act) of the vehicle body 2 of the two-wheeled vehicle 1A from a desired roll angular velocity φb_dot_cmd, is eliminated through manipulation of the steering angle δf of the front wheel 3f (and, hence, that the actual roll angle or roll angular velocity of the vehicle body 2 of the two-wheeled vehicle 1A is restored to the desired roll angle or desired roll angular velocity).

Further, in the present embodiment, the desired front-wheel steering angle δf_cmd and the desired front-wheel steering angular velocity δf_dot_cmd are both "0". Therefore, in the state where the actual roll angle of the vehicle body 2 of the two-wheeled vehicle 1A is held at a value which coincides, or almost coincides, with the desired roll angle φb_cmd, the desired front-wheel steering angular acceleration δf_dot2_cmd is determined so as to keep the actual steering angle of the front wheel 3f at "0" or almost "0".

Furthermore, in the case where a handlebar torque Th is applied to the operation apparatus 7, a feedforward manipulated variable corresponding to the detected handlebar torque Th_act is added to the desired front-wheel steering angular acceleration δf_dot2_cmd.

It should be noted that, instead of adding the feedforward manipulated variable corresponding to the detected handlebar torque Th_act to δf_dot2_cmd as described above, it may be configured to add the feedforward manipulated variable corresponding to the detected handlebar torque Th_act (value obtained by multiplying Th_act by a gain) to the desired front-wheel steering angular velocity δf_dot_cmd or to the desired front-wheel steering angle δf_cmd.

Figure 8:
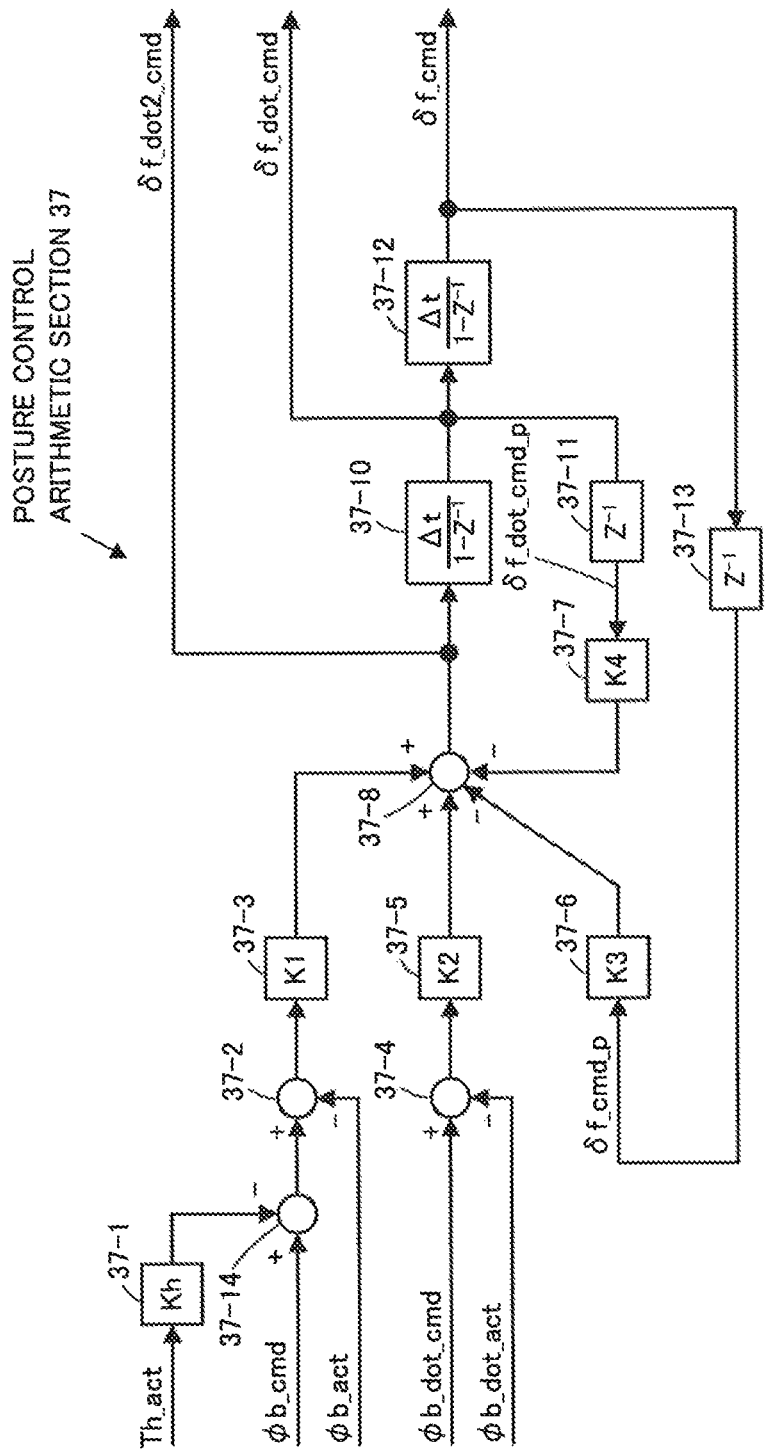
FIG. 8 is a block diagram showing a second example of the processing performed by the posture control arithmetic section shown in FIG. 3.

Alternatively, instead of adding the feedforward manipulated variable corresponding to the detected handlebar torque Th_act to δf_dot2_cmd, it may be configured to correct the desired roll angle φb_cmd in accordance with Th_act and to use the corrected desired roll angle instead of φb_cmd, as shown, for example, in the block diagram in FIG. 8.

In the processing in the posture control arithmetic section 37 shown in the block diagram in FIG. 8, a processing section 37-14 is provided instead of the processing section 37-9 shown in FIG. 7. The processing section 37-14 subtracts the output (=Kh*Th_act) of the processing section 37-1 from the desired roll angle φb_cmd to correct φb_cmd. It should be noted that the value of the gain Kh by which Th_act is multiplied in this case is usually different from the value of the gain Kh used in the processing section 37-1 in the block diagram in FIG. 7.

The processing section 37-14 then supplies the corrected desired roll angle (=φb_cmd−Kh*Th_act) to the processing section 37-2, instead of φb_cmd.

Further, in the processing in the block diagram in FIG. 8, the output from the processing section 37-8, as it is, is determined to be a desired front-wheel steering angular acceleration δf_dot2_cmd, and is supplied to the processing section 37-10.

In other respects, the processing shown in the block diagram in FIG. 8 is identical to that shown in FIG. 7.

Accordingly, in the processing in the posture control arithmetic section 37 shown in FIG. 8, the desired front-wheel steering angular acceleration δf_dot2_cmd is calculated by the following expression (4).

$$\delta f\_dot2\_cmd = K1*((\phi b\_cmd - Kh*Th\_act) - \phi b\_act) + \\ K2*(\phi b\_dot\_cmd - \phi b\_dot\_act) - \\ K3*\delta f\_cmd\_p - K4*\delta f\_dot\_cmd\_p \quad (4)$$

When the value of the gain Kh used in the processing section 37-1 in the block diagram in FIG. 7 is divided by the gain K1 and the obtained value is multiplied by −1, and when the resultant value is used as the gain Kh in the processing section 37-1 in the block diagram in FIG. 8, then the block diagram in FIG. 8 becomes equivalent to the block diagram in FIG. 7.

In the block diagram in FIG. 7 or the block diagram in FIG. 8, a value obtained by multiplying the detected handlebar torque Th_act by a prescribed gain may be added to the output of the processing section 37-10.

Alternatively, in the block diagram in FIG. 7 or the block diagram in FIG. 8, a value obtained by multiplying the detected handlebar torque Th_act by a prescribed gain may be added to the output of the processing section 37-12.

Still alternatively, instead of the detected handlebar torque Th_act as it is, the detected handlebar torque Th_act which has been passed through a filter for adjusting frequency characteristics may be used. Adding the processes as described above can make the control system's response characteristics to the handlebar torque further suit the taste of the rider of the two-wheeled vehicle 1A.

Here, the gains K1 to K4 (feedback gains related to the respective feedback manipulated variables in the right side of the aforesaid expression (3)) and the gain Kh, which are used for calculating δf_dot2_cmd by the computation of the expression (3), are determined in the aforesaid control gain determining section 35. The processing in the control gain determining section 35 will now be described in detail.

The control gain determining section 35 determines the values of the gains K1 to K4 and Kh from the received estimated traveling speed Vox_act and last time's desired front-wheel steering angle δf_cmd_p, by the processing shown in the block diagram in FIG. 5.

In FIG. 5, a processing section 35-1 is a processing section which determines the gain K1 in accordance with Vox_act and δf_cmd_p, and a processing section 35-2 is a processing section which determines the gain K2 in accordance with Vox_act and δf_cmd_p.

In the present embodiment, the processing section 35-1 determines the gain K1 from Vox_act and δf_cmd_p, in accordance with a preset two-dimensional mapping (conversion function of two variables). Similarly, the processing section 35-2 determines the gain K2 from Vox_act and δf_cmd_p, in accordance with a preset two-dimensional mapping (conversion function of two variables).

In these two-dimensional mappings, the trend of the change in value of the gain K1 with respect to Vox_act and δf_cmd_p and the trend of the change in value of the gain K2 with respect to Vox_act and δf_cmd_p are set substantially similar to each other.

Specifically, as illustrated by the graphs shown in the processing sections 35-1 and 35-2 in FIG. 5, the two-dimensional mappings in the processing sections 35-1 and 35-2 are each set such that the magnitude of the gain K1, K2 determined by the two-dimensional mapping has the trend of monotonically decreasing with increasing Vox_act when δf_cmd_p is fixed to a given value.

Accordingly, the gains K1 and K2 as the feedback gains related to the feedback manipulated variables having the function of stabilizing the posture in the roll direction of the vehicle body 2 of the two-wheeled vehicle 1A (making the detected roll angle φb_act and the detected roll angular velocity φb_dot_act converge respectively to φb_cmd and φb_dot_cmd) are determined such that the magnitudes of the gains K1 and K2 each become smaller as the actual traveling speed (estimated traveling speed Vox_act) of the two-wheeled vehicle 1A becomes greater.

In other words, the gains K1 and K2 are determined such that the steering force that the front-wheel steering actuator 8 generates, in accordance with a deviation of φb_act from φb_cmd or a deviation of φb_dot_act from φb_dot_cmd, in the direction of eliminating the deviation, is reduced when the actual traveling speed (estimated traveling speed Vox_act) of the two-wheeled vehicle 1A is in a high-speed range, as compared to when it is in a low-speed range.

Further, the two-dimensional mappings in the processing sections 35-1 and 35-2 are each set such that the gain K1, K2 determined by the mapping has the trend of monotonically decreasing with increasing magnitude (absolute value) of δf_cmd_p when Vox_act is fixed to a given value.

Accordingly, the gains K1 and K2 as the gains related to the feedback manipulated variables having the function of stabilizing the posture in the roll direction of the vehicle body 2 of the two-wheeled vehicle 1A are determined such that the magnitudes of the gains K1 and K2 each become smaller as the magnitude of δf_cmd_p, corresponding to the actual steering angle of the front wheel 3f, becomes larger.

In other words, the gains K1 and K2 are determined such that the steering force that the front-wheel steering actuator 8 generates, in accordance with a deviation of φb_act from φb_cmd or a deviation of φb_dot_act from φb_dot_cmd, in the direction of eliminating the deviation, is reduced when the magnitude of the actual steering angle of the front wheel 3f is large, as compared to when it is small.

Here, in the case where the magnitude of the actual steering angle of the front wheel 3f is large, compared to the case where it is small, the radius of curvature of the ground contact part of the steered wheel (front wheel 3f) as seen in a cross section including the ground contact point of the steered wheel (front wheel 3f) and having a normal in the X-axis direction (longitudinal direction of the vehicle body 2) becomes larger. Consequently, in the case where the magnitude of the actual steering angle of the front wheel 3f is large, compared to the case where it is small, the change in movement amount of the ground contact point of the front wheel 3f according to the change in the steering angle becomes larger.

Because of this, if the magnitudes of the gains K1 and K2 are set independently of the actual steering angle, oscillation is likely to occur in the control of the posture in the roll direction of the vehicle body 2 of the two-wheeled vehicle 1A when the actual steering angle is large.

In view of the foregoing, in the present embodiment, it has been configured such that the magnitudes of the gains K1 and K2 are changed in accordance with the magnitude of δf_cmd_p, as described above. This can prevent the above-described oscillation even in the case where the magnitude (absolute value) of the actual steering angle of the front wheel 3f is large.

In the block diagram in FIG. 5, a processing section 35-3 is a processing section which determines the gain K3 in accordance with Vox_act, and a processing section 35-4 is a processing section which determines the gain K4 in accordance with Vox_act.

In the present embodiment, the processing sections 35-3 and 35-4 determine the gains K3 and K4, respectively, from Vox_act, in accordance with conversion functions defined by preset mappings (or arithmetic expressions).

These conversion functions are set, as illustrated by the graphs shown in the processing sections 35-3 and 35-4 in FIG. 5, such that basically the gains K3 and K4 each increase monotonically, between a prescribed upper limit and a prescribed lower limit, as Vox_act increases.

In this case, in the conversion functions in the processing sections 35-3 and 35-4, in the region where Vox_act takes a value near "0", K3 and K4 are each maintained at the lower limit. In the region where Vox_act takes a sufficiently large value, K3 and K4 are each maintained at the upper limit.

As the gains K3 and K4 are determined in the above-described manner, the gains K3 and K4 as the feedback gains related to the feedback manipulated variables having the function of making the steering angle δf of the front wheel 3f approach zero are determined such that the magnitudes of the gains K3 and K4 become relatively large in the case where the actual traveling speed (estimated traveling speed Vox_act) of the two-wheeled vehicle 1A is relatively high (in a high-speed range), compared to the case where the actual traveling speed of the two-wheeled vehicle 1A is relatively low (in a low-speed range (including "0")).

In the present embodiment, as the gains K1 and K3 are set as described above, the ratio between the gain K1, with a fixed steering angle of the front wheel 3f, and the gain K3 (=K1/K3) is set such that the ratio becomes smaller as the traveling speed of the two-wheeled vehicle 1A becomes greater.

Similarly, as the gains K2 and K4 are set as described above, the ratio between the gain K2, with a fixed steering angle of the front wheel 3f, and the gain K4 (=K2/K4) is set such that the ratio becomes smaller as the traveling speed of the two-wheeled vehicle 1A becomes greater.

Therefore, as the traveling speed of the two-wheeled vehicle 1A becomes greater, the gains K1 and K2 as the feedback gains related to the feedback manipulated variables having the function of controlling the posture in the roll direction of the vehicle body 2 each become relatively small compared to the gains K3 and K4 as the feedback gains related to the feedback manipulated variables having the function of making the actual steering angle of the front wheel 3f converge to zero.

Accordingly, in the case where the actual traveling speed (estimated traveling speed Vox_act) of the two-wheeled vehicle 1A is relatively high, i.e. in the state where the stability of the posture in the roll direction of the vehicle body 2 is high, a rider of the two-wheeled vehicle 1A can readily change the posture in the roll direction (roll angle φb) of the vehicle body 2 by shifting the weight of the rider's body and so on, as in the case of a conventional two-wheeled vehicle (which is not provided with the function of controlling the posture in the roll direction of the vehicle body).

It should be noted that the two-dimensional mappings for determining the gains K1 and K2 may each be set such that the value of K1, K2 is determined to be "0" or almost "0" when the estimated traveling speed Vox_act reaches a certain level (i.e. when Vox_act is not lower than a prescribed speed).

With this configuration, the function of controlling the posture in the roll direction of the vehicle body 2 becomes substantially OFF when the actual traveling speed (estimated traveling speed Vox_act) of the two-wheeled vehicle 1A is relatively high. This can make the behavioral characteristics of the two-wheeled vehicle 1A approach the characteristics comparable to those of a conventional two-wheeled vehicle in the case where the actual traveling speed of the two-wheeled vehicle 1A is high.

Further, in FIG. 5, a processing section 35-5 represents a processing section which determines the gain Kh in accordance with Vox_act.

In the present embodiment, the processing section 35-5 determines the gain Kh from Vox_act, in accordance with a conversion function defined by a preset mapping (or arithmetic expression), as with the gains K3 and K4.

This conversion function is set, as illustrated by the graph shown in the processing section 35-5 in FIG. 5, such that basically the magnitude of the gain Kh becomes relatively large when Vox_act is large as compared to when Vox_act is small.

In this case, the conversion function in the processing section 35-5 is set such that the gain Kh increases monotonically, between a prescribed upper limit and a prescribed lower limit, as Vox_act increases. Further, the conversion function is set such that the Kh determined thereby has saturation characteristics with respect to Vox_act. That is, Kh is determined by the conversion function such that the magnitude of the rate of change of the value of Kh with respect to Vox_act (increase of Kh per unit increase of Vox_act) becomes smaller in a low-speed range in which Vox_act takes a value near "0" (including "0") and a high-speed range in which Vox_act takes a sufficiently large value, than in a mid-speed range between the low-speed range and the high-speed range.

Determining the gain Kh in accordance with Vox_act in this manner ensures that the magnitude of the gain Kh relative to the gain K1 becomes large when the actual traveling speed of the two-wheeled vehicle 1A is relatively high.

Accordingly, when a rider applies a torque about the handlebar axis Ch to the operation apparatus 7 in an attempt to move the operation apparatus 7, the desired front-wheel steering angular acceleration δf_dot2_cmd is determined so as to bring the detected handlebar torque Th_act to zero. This leads to improved tracking of the steering of the front wheel 3f to the rider's moving the operation apparatus 7.

As a result, during high-speed traveling of the two-wheeled vehicle 1A, the rider can steer the front wheel 3f by manipulating the operation apparatus 7, similarly as in a conventional two-wheeled vehicle.

The above has described the details of the processing in the control gain determining section 35 according to the present embodiment.

It should be noted that the gain K3 may be set such that, instead of increasing monotonically, it remains constant or decreases monotonically, between a prescribed upper limit and a prescribed lower limit, as Vox_act increases. In this case as well, the ratio between the gain K1, with a fixed steering angle of the front wheel 3f, and the gain K3 (=K1/K3) is set such that the ratio becomes smaller as the traveling speed of the two-wheeled vehicle 1A becomes greater.

Similarly, the gain K4 may be set such that, instead of increasing monotonically, it remains constant or decreases monotonically, between a prescribed upper limit and a prescribed lower limit, as Vox_act increases. In this case as well, the ratio between the gain K2, with a fixed steering angle of the front wheel 3f, and the gain K4 (=K2/K4) is set such that the ratio becomes smaller as the traveling speed of the two-wheeled vehicle 1A becomes greater.

Further, the gains K3 and K4 may be determined in accordance with Vox_act and δf_cmd_p, as with the gains K1 and K2. For example, when a pole placement method or the like is used to obtain rough approximations of appropriate values for the set of gains K1 to K4 such that the ratio between the gain K1, with a fixed steering angle of the front wheel 3f, and the gain K3 (=K1/K3) becomes smaller as the traveling speed of the two-wheeled vehicle 1A becomes greater, the gains K3 and K4 also take values dependent on δf_cmd_p. Therefore, the gains K3 and K4 are also preferably determined in accordance with Vox_act and δf_cmd_p, as with the gains K1 and K2, so that the values approach the approximations of the appropriate values obtained from the pole placement method or the like.

Further, for the conversion functions for determining the gains K1 and K2, conversion functions in other forms may be adopted, as long as they can determine the gains with the above-described trends with respect to Vox_act and δf_cmd_p. The conversion functions may each be set in a form other than the two-dimensional mapping (for example, one-dimensional mapping and arithmetic expression may be combined). The same applies to the case where the gains K3 and K4 are each determined by a conversion function in accordance with Vox_act and δf_cmd_p, or by a conversion function in accordance with Vox_act. Furthermore, for the conversion function for determining the gain Kh, a conversion function in another form may be adopted, as long as it can determine the gain with the above-described trend with respect to Vox_act.

The last time's desired front-wheel steering angle δf_cmd_p has the meaning as a pseudo estimate (alternative observed value) of the actual steering angle of the front wheel 3f at the current time.

Accordingly, for determining the respective gains K1, K2, K3, K4, and Kh, the aforesaid detected front-wheel steering angle δf_act may be used instead of δf_cmd_p.

Further, in the case where the response of the front-wheel driving actuator 10 is sufficiently quick, the value of the traveling speed (=Vf_cmd_p*cos(δf_cmd_p*cos(θcf)), hereinafter referred to as "last time's desired traveling speed Vox_cmd_p") calculated by the computation similar to that in the aforesaid expression (2) from the above-described last time's desired front-wheel steering angle δf_cmd_p and a last time's desired front-wheel rotational transfer velocity Vf_cmd_p (desired front-wheel rotational transfer velocity Vf_cmd determined by the desired front-wheel rotational transfer velocity determining section 36 in the last time's control processing cycle) has the meaning as a pseudo estimate (alternative observed value) of the actual traveling speed of the two-wheeled vehicle 1A at the current time.

Accordingly, for determining the respective gains K1, K2, K3, K4, and Kh, the above-described last time's desired traveling speed Vox_cmd_p may be used instead of Vox_act.

After the control device 15 has determined the desired front-wheel steering angle δf_cmd in the posture control arithmetic section 37 as described above, the control device 15 carries out the processing in the desired handlebar angle determining section 38.

The desired handlebar angle determining section 38 receives, as shown in FIG. 3, the estimated traveling speed Vox_act calculated in the estimated traveling speed calculating section 33 and the desired front-wheel steering angle δf_cmd determined in the posture control arithmetic section 37.

Figure 9:
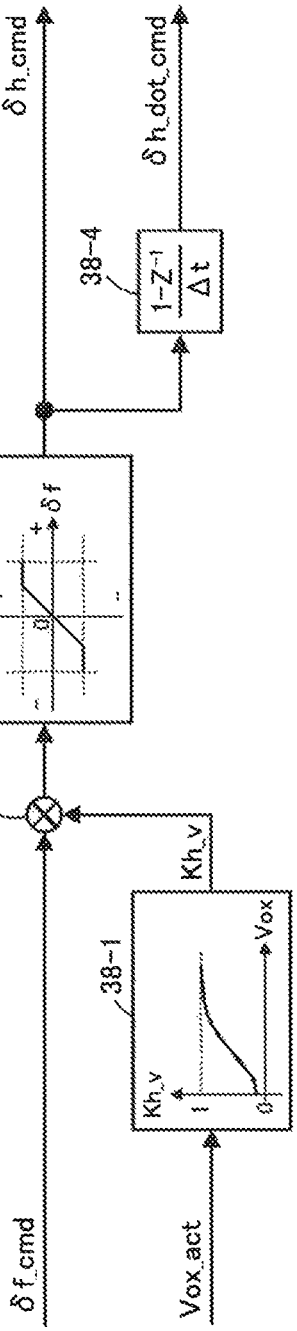
FIG. 9 is a block diagram showing a first example of the processing performed by the desired handlebar angle determining section shown in FIG. 3.

The desired handlebar angle determining section 38 uses these input values to carry out the processing shown in the block diagram in FIG. 9, to thereby determine a desired handlebar angle δh_cmd and a desired handlebar angular velocity δh_dot_cmd.

In FIG. 9, a processing section 38-1 is a processing section which determines a correction factor Kh_v for correcting δf_cmd, in accordance with the estimated traveling speed Vox_act, a processing section 38-2 is a processing section which corrects δf_cmd by multiplying δf_cmd by the output (correction factor Kh_v) from the processing section 38-1, a processing section 38-3 is a processing section which determines a desired handlebar angle δh_cmd from the output (=Kh_v*δf_cmd) from the processing section 38-2, and a processing section 38-4 is a processing section which calculates a temporal change rate (amount of change per unit time) of the output (δh_cmd) from the processing section 38-3, as a desired handlebar angular velocity δh_dot_cmd.

Accordingly, the desired handlebar angle determining section 38 determines a desired handlebar angle δh_cmd in accordance with the corrected value (=Kh_v*δf_cmd, this corrected value will be hereinafter referred to as "corrected desired front-wheel steering angle δf_cmd_c") obtained by correcting δf_cmd in accordance with Vox_act. Further, the desired handlebar angle determining section 38 differentiates this δh_cmd to determine a desired handlebar angular velocity δh_dot_cmd.

In this case, the correction factor Kh_v takes a positive value of 1 or less. The correction factor Kh_v is determined from the estimated traveling speed Vox_act, by a preset conversion function. The conversion function is defined, for example, by a mapping or an arithmetic expression. The conversion function is set to show the trend as illustrated by the graph shown in the processing section 38-1 in FIG. 9.

Here, when the two-wheeled vehicle 1A is stationary or traveling at a very low speed, the posture restoring force in the roll direction of the vehicle body 2 per unit steering angle of the front wheel 3f is weak and, therefore, the front wheel 3f needs to be steered relatively largely for stabilizing the posture.

In such a case, if it is set such that the steering angle δf of the front wheel 3f coincides with the handlebar angle δh as in a conventional two-wheeled vehicle in which the operation apparatus is directly connected to the steering shaft of the front wheel, the large steering of the front wheel 3f will cause the operation apparatus 7 to rotate largely, giving a sense of discomfort to the rider of the two-wheeled vehicle 1A. The operation apparatus 7 may also interfere with a part of the vehicle body 2 close to the operation apparatus 7.

In order to solve the above problems, in the present embodiment, the conversion function in the processing section 38-1 has been set, as illustrated by the graph in the figure, such that the correction factor Kh_v becomes smaller as Vox_act becomes smaller (as the actual traveling speed of the two-wheeled vehicle 1A becomes lower).

This correction factor Kh_v basically has the function of changing the ratio of the amount of change of the handlebar angle δh to the unit amount of change of the steering angle δf of the front wheel 3f, i.e. a so-called steering gear ratio, in accordance with Vox_act. Therefore, it is set such that the above-described ratio becomes smaller as Vox_act becomes smaller.

More specifically, the conversion function in the processing section 38-1 is set such that the above-described ratio (correction factor Kh_v) becomes "1" or almost "1" when Vox_act becomes a prescribed speed or higher and that the ratio becomes less than "1" when Vox_act becomes lower than the prescribed speed.

As a result, when the two-wheeled vehicle 1A is stationary or traveling at a very low speed, even if the steering angle of the front wheel 3f becomes large for the purpose of stabilizing the posture of the vehicle body 2, the handlebar angle δh is restricted to a small angle. This can reduce the sense of discomfort of the rider of the two-wheeled vehicle 1A and also prevent the interference between the operation apparatus 7 and the vehicle body 2.

Furthermore, in the present embodiment, when the processing section 38-3 determines a desired handlebar angle δh_cmd from the corrected desired front-wheel steering angle δf_cmd_c which is δf_cmd corrected with the correction factor Kh_v, it determines δh_cmd in accordance with a conversion function which has been preset to cause δh_cmd to have saturation characteristics with respect to δf_cmd_c. The saturation characteristics means the characteristics that the magnitude of the rate of change of δh_cmd with respect to δf_cmd_c (amount of change of δh_cmd per unit amount of change of δf_cmd_c) becomes smaller when the magnitude of δh_cmd_c is large, as compared to when the magnitude of δh_cmd_c is small.

The conversion function in the processing section 38-3 having such saturation characteristics is defined, for example, by a mapping or an arithmetic expression. The conversion function is set, for example, as illustrated by the graph shown in the processing section 38-3 in FIG. 9.

In this example, δh_cmd is determined such that, when the magnitude (absolute value) of δf_cmd_c is not greater than a prescribed value, δh_cmd changes monotonically up to an upper limit on the positive side or down to a lower limit on the negative side in response to the change of δf_cmd_c (or δf_cmd) to the positive side or the negative side, respectively. In this situation, δh_cmd is determined, for example, to coincide with, or almost coincide with, δf_cmd_c.

When the magnitude (absolute value) of δf_cmd_c exceeds the prescribed value, δh_cmd is maintained constantly at the upper limit on the positive side or the lower limit on the negative side.

Determining δh_cmd so as to have saturation characteristics with respect to δf_cmd_c in the above-described manner can prevent the actual handlebar angle (detected handlebar angle δh_act) from becoming excessively large.

Figure 10:
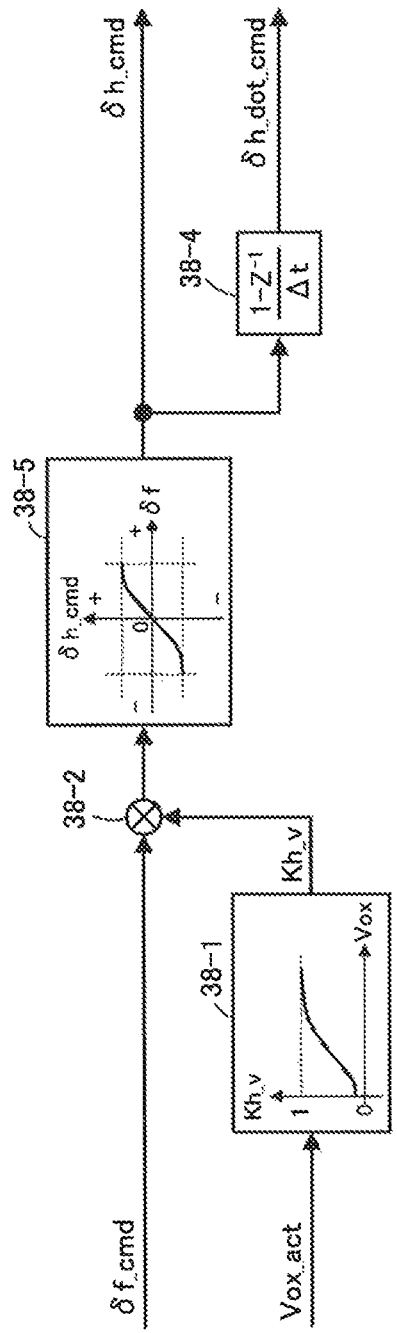
FIG. 10 is a block diagram showing a second example of the processing performed by the desired handlebar angle determining section shown in FIG. 3.

It should be noted that the processing of determining δh_cmd from δf_cmd_c may be carried out by using, for example, a conversion function (having saturation characteristics) as illustrated by the graph shown in a processing section 38-5 in the block diagram in FIG. 10. This conversion function, defined by a mapping or an arithmetic expression, is set such that the magnitude of the rate of change of δh_cmd with respect to δf_cmd_c becomes continuously smaller as the magnitude of δf_cmd_c becomes larger. The minimum value of the magnitude of the above-described rate of change may be greater than zero.

When the conversion function in the processing section 38-5 is set in the above-described manner, the rate of change of δh_cmd with respect to δf_cmd (amount of change of δh_cmd per unit increase of δf_cmd) can be made to change continuously. Consequently, the angular acceleration of the actual handlebar angle can be made to change continuously. This can restrict an abrupt change in rotational angular velocity (angular velocity about the handlebar axis Ch) of the operation apparatus 7, and accordingly, the sense of discomfort of the rider during the manipulation of the operation apparatus 7 can further be reduced. The load of the handlebar driving actuator 9 can be reduced as well.

It should be noted that δh_cmd may be determined from δf_cmd and Vox_act by a two-dimensional mapping. Further, as Vox_act for determining δh_cmd, the value of the actual rotational transfer velocity of the rear wheel 3r, obtained by multiplying an observed value of the actual rotational angular velocity of the rear wheel 3r (value detected by an appropriate detector such as a rotary encoder) by the effective rolling radius of the rear wheel 3r, may be used. Alternatively, the aforesaid last time's desired traveling speed Vox_cmd_p, calculated by the computation similar to that in the right side of the aforesaid expression (2) from the last time's desired front-wheel steering angle δf_cmd_p and the last time's desired front-wheel rotational transfer velocity Vf_cmd_p, may be used instead of Vox_act.

Controls of the aforesaid front-wheel steering actuator 8, handlebar driving actuator 9, and front-wheel driving actuator 10 will now be described.

Figure 11:
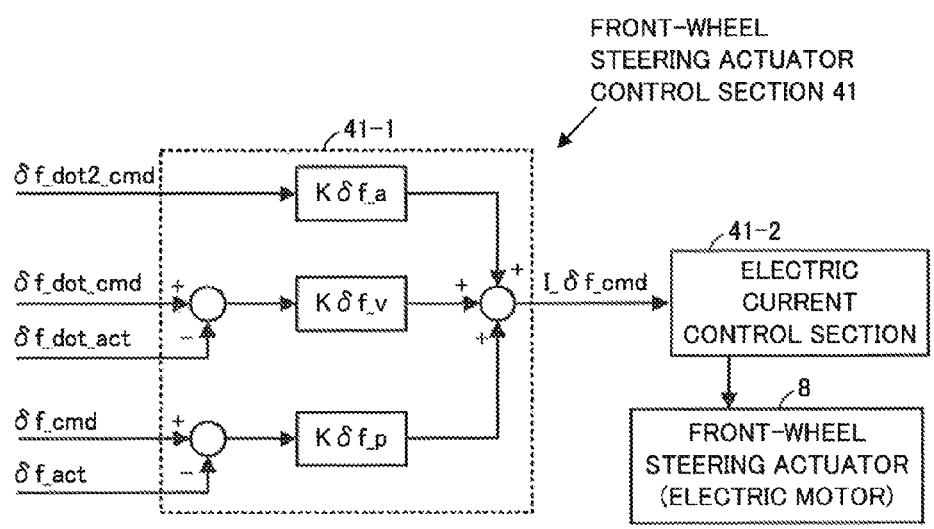
FIG. 11 is a block diagram showing the processing performed by a front-wheel steering actuator control section included in the control device shown in FIG. 2.
Figure 12:
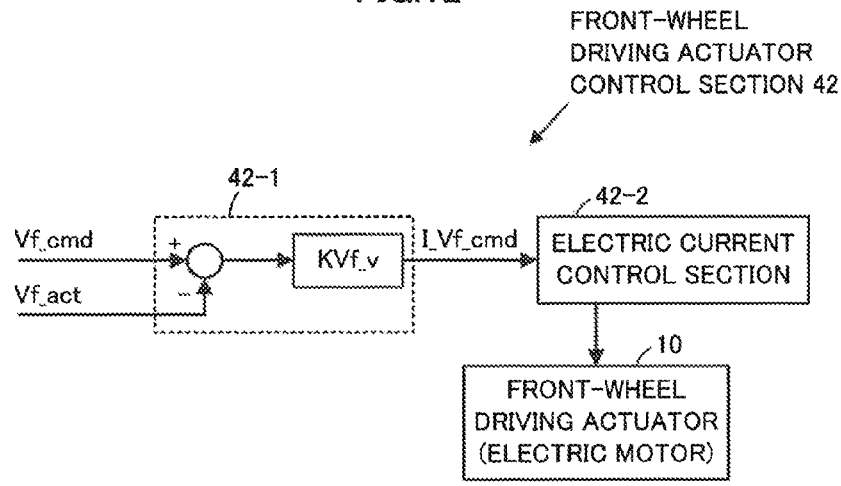
FIG. 12 is a block diagram showing the processing performed by a front-wheel driving actuator control section included in the control device shown in FIG. 2.
Figure 13:
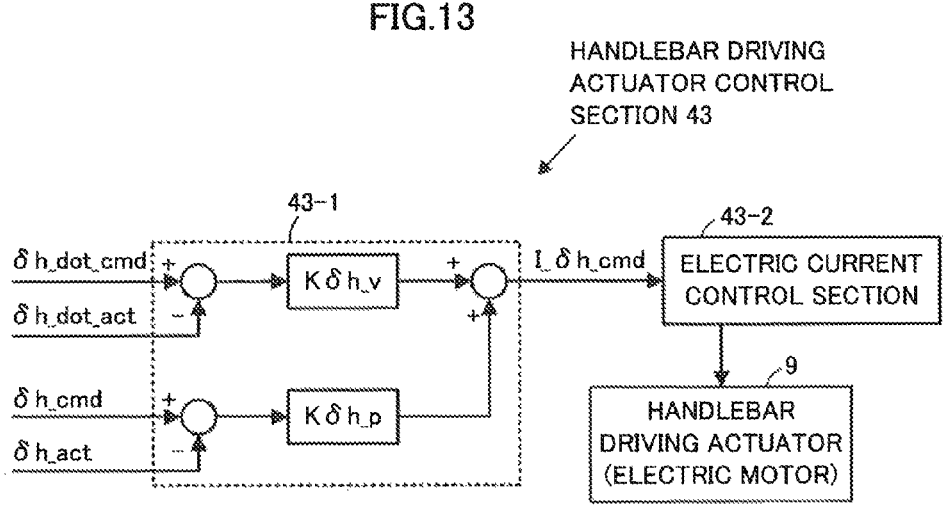
FIG. 13 is a block diagram showing the processing performed by a handlebar driving actuator control section included in the control device shown in FIG. 2.

The control device 15 further includes, as functions other than the functions shown in FIG. 3, a front-wheel steering actuator control section 41 shown in FIG. 11, a front-wheel driving actuator control section 42 shown in FIG. 12, and a handlebar driving actuator control section 43 shown in FIG. 13.

The front-wheel steering actuator control section 41 carries out drive control of the front-wheel steering actuator 8, by the control processing shown in the block diagram in FIG. 11, for example, to cause the actual steering angle (detected front-wheel steering angle δf_act) of the front wheel 3f to track a desired front-wheel steering angle δf_cmd.

In this example, the front-wheel steering actuator control section 41 receives a desired front-wheel steering angle δf_cmd, a desired front-wheel steering angular velocity δf_dot_cmd, and a desired front-wheel steering angular acceleration δf_dot2_cmd determined in the above-described manner in the posture control arithmetic section 37, a detected front-wheel steering angle δf_act, and a detected front-wheel steering angular velocity δf_dot_act which is a detected value of the actual steering angular velocity of the front wheel 3f.

It should be noted that the detected front-wheel steering angular velocity δf_dot_act is a value of the steering angular velocity which is recognized on the basis of an output from the front-wheel steering angle detector 17, or a value obtained by calculating a temporal change rate of the detected front-wheel steering angle δf_act.

The front-wheel steering actuator control section 41 determines, from the above-described input values, an electric current command value I_δf_cmd which is a desired value of the electric current passed through the front-wheel steering actuator 8 (electric motor), by the processing in an electric current command value determining section 41-1.

The electric current command value determining section 41-1 determines the electric current command value I_δf_cmd by summing up a feedback manipulated variable component obtained by multiplying a deviation of δf_act from δf_cmd by a gain Kδf_p of a prescribed value, a feedback manipulated variable component obtained by multiplying a deviation of δf_dot_act from δf_dot_cmd by a gain Kδf_v of a prescribed value, and a feedforward manipulated variable component obtained by multiplying δf_dot2_cmd by a gain Kδf_a of a prescribed value, as shown by the following expression (5).

$$I\_\delta f\_cmd = K\delta f\_p * (\delta f\_cmd - \delta f\_act) + \\ K\delta f\_v * (\delta f\_dot\_cmd - \delta f\_dot\_act) + K\delta f\_a * \delta f\_dot2\_cmd \quad (5)$$

The front-wheel steering actuator control section 41 then controls the actual electric current passed through the front-wheel steering actuator 8 (electric motor) to match the electric current command value I_δf_cmd, by an electric current control section 41-2 which is made up of a motor driver or the like.

In this manner, the control is performed such that the actual steering angle of the front wheel 3f tracks the desired front-wheel steering angle δf_cmd. In this case, the electric current command value I_δf_cmd includes the third term in the right side of the above expression (5), i.e. the feedforward manipulated variable component, ensuring improved tracking in the above-described control.

It should be noted that the technique of controlling the front-wheel steering actuator 8 to cause the actual steering angle of the front wheel 3f to track the desired front-wheel steering angle δf_cmd is not limited to the above-described technique; other techniques may be used as well. For example, various kinds of known servo control techniques related to electric motors (feedback control techniques for causing the actual angle of rotation of the rotor of the electric motor to track a desired value) may be adopted.

The front-wheel driving actuator control section 42 carries out drive control of the front-wheel driving actuator 10, by the control processing shown in the block diagram in FIG. 12, for example, to cause the actual rotational transfer velocity of the front wheel 3f to track a desired front-wheel rotational transfer velocity Vf_cmd (or to cause the actual rotational angular velocity of the front wheel 3f to track a desired rotational angular velocity corresponding to Vf_cmd).

In this example, the front-wheel driving actuator control section 42 receives a desired front-wheel rotational transfer velocity Vf_cmd determined in the above-described manner in the desired front-wheel rotational transfer velocity determining section 36, and an estimated front-wheel rotational transfer velocity Vf_act.

The front-wheel driving actuator control section 42 determines, from the above-described input values, an electric current command value I_Vf_cmd which is a desired value of the electric current passed through the front-wheel driving actuator 10 (electric motor), by the processing in an electric current command value determining section 42-1.

The electric current command value determining section 42-1 determines a feedback manipulated variable component obtained by multiplying a deviation of Vf_act from Vf_cmd by a gain KVf_v of a prescribed value, as the electric current command value I_Vf_cmd, as shown by the following expression (6).

$$I\_Vf\_cmd = KVf\_v * (Vf\_cmd - Vf\_act) \qquad (6)$$

It should be noted that, instead of using the above expression (6), I_Vf_cmd may be determined by, for example, multiplying a deviation of the detected value of the actual rotational angular velocity of the front wheel 3f, which is indicated by an output from the front-wheel rotational speed detector 20, from a value obtained by dividing Vf_cmd by the effective rolling radius of the front wheel 3f (i.e. a desired value of the rotational angular velocity of the front wheel 3f) by a gain of a prescribed value.

The front-wheel driving actuator control section 42 then controls the actual electric current passed through the front-wheel driving actuator 10 (electric motor) to match the electric current command value I_Vf_cmd, by an electric current control section 42-2 which is made up of a motor driver or the like.

In this manner, the control is performed such that the actual rotational transfer velocity of the front wheel 3f tracks the desired front-wheel rotational transfer velocity Vf_cmd (or such that the actual rotational angular velocity tracks the desired value of the rotational angular velocity corresponding to Vf_cmd).

It should be noted that the technique of controlling the front-wheel driving actuator 10 to cause the actual rotational transfer velocity of the front wheel 3f to track the desired front-wheel rotational transfer velocity Vf_cmd is not limited to the above-described technique; other techniques may be used as well. For example, various kinds of known speed control techniques related to electric motors (feedback control techniques for causing the actual rotational angular velocity of the rotor of the electric motor to track a desired value) may be adopted.

The handlebar driving actuator control section 43 carries out drive control of the handlebar driving actuator 9, by the control processing shown in the block diagram in FIG. 13, for example, to cause the actual rotational angle (handlebar angle) of the operation apparatus 7 to track a desired handlebar angle δh_cmd.

In this example, the handlebar driving actuator control section 43 receives a desired handlebar angle δh_cmd and a desired handlebar angular velocity δh_dot_cmd determined in the above-described manner in the desired handlebar angle determining section 38, a detected handlebar angle δh_act which is a detected value of the actual rotational angle of the operation apparatus 7, and a detected handlebar angular velocity δh_dot_act which is a detected value of the actual rotational angular velocity of the operation apparatus 7.

It should be noted that the detected handlebar angle δh_act and the detected handlebar angular velocity δh_dot_act are a value of the handlebar angle which is recognized on the basis of an output from the handlebar angle detector 18 and a value indicating a temporal change rate thereof, respectively.

The handlebar driving actuator control section 43 determines, from the above-described input values, an electric current command value I_δh_cmd which is a desired value of the electric current passed through the handlebar driving actuator 9 (electric motor), by the processing in an electric current command value determining section 43-1.

The electric current command value determining section 43-1 determines the electric current command value I_δh_cmd by summing up a feedback manipulated variable component obtained by multiplying a deviation of δh_act from δh_cmd by a gain Kδh_p of a prescribed value and a feedback manipulated variable component obtained by multiplying a deviation of δh_dot_act from δh_dot_cmd by a gain Kδh_v of a prescribed value, as shown by the following expression (7).

$$I\_\delta h\_cmd = \\ K\delta h\_p * (\delta h\_cmd - \delta h\_act) + K\delta h\_v * (\delta h\_dot\_cmd - \delta h\_dot\_act) \qquad (7)$$

The handlebar driving actuator control section 43 then controls the actual electric current passed through the handlebar driving actuator 9 (electric motor) to match the electric current command value I_δh_cmd, by an electric current control section 43-2 which is made up of a motor driver or the like.

In this manner, the control is performed such that the actual handlebar angle of the operation apparatus 7 tracks the desired handlebar angle δh_cmd.

It should be noted that the technique of controlling the handlebar driving actuator 9 to cause the actual handlebar angle of the operation apparatus 7 to track the desired handlebar angle δh_cmd is not limited to the above-described technique; various kinds of known servo control techniques, for example, may be adopted.

The above has described the details of the control processing in the control device 15 according the present embodiment.

Here, the correspondence between the present embodiment and the present invention will be described. In the present embodiment, the front wheel 3f corresponds to the steered wheel in the present invention, the front-wheel steering actuator 8 (electric motor) corresponds to the steering actuator in the present invention, and the handlebar driving actuator 9 corresponds to the handlebar actuator in the present invention.

Further, in the example of the present embodiment, the first motional state quantity in the present invention (motional state quantity of the inclination angle in the roll direction (roll angle) of the vehicle body 2) is made up of a value of the roll angle φb as it is and a roll angular velocity φb_dot which is a temporal change rate of the roll angle.

Further, in the example of the present embodiment, the second motional state quantity in the present invention (motional state quantity of the steering angle of the steered wheel (front wheel 3f)) is made up of a value of the steering angle δf, as it is, of the front wheel 3f and a steering angular velocity δf_dot which is a temporal change rate of the steering angle.

In the present embodiment, the desired values (φb_cmd, φb_dot_cmd) of the roll angle φb and the roll angular velocity φb_dot constituting the first motional state quantity are each set to zero, and the desired values of the steering angle δf and the steering angular velocity δf_dot constituting the second motional state quantity are each set to zero.

In the processing in the posture control arithmetic section 37, a desired front-wheel steering angular acceleration δf_dot2_cmd as an operational target of the front-wheel steering actuator 8 (steering actuator) is determined, by a feedback control law, so as to cause a deviation of each of the detected roll angle φb_act, the detected roll angular velocity φb_dot_act, the last time's desired front-wheel steering angle δf_cmd_p, representing a pseudo estimate of the steering angle δf, and the last time's desired front-wheel steering angular velocity δf_dot_cmd_p, representing a pseudo estimate of the steering angular velocity δf_dot, from the corresponding desired value to converge to zero.

Further, the steering force of the front-wheel steering actuator 8 is controlled by the aforesaid front-wheel steering actuator control section 41 such that the actual steering angle of the front wheel 3f tracks a desired front-wheel steering angle δf_cmd which has been determined by performing integration twice on the above-described δf_dot2_cmd.

In this manner, the front-wheel steering actuator 8 is controlled so as to stabilize the first motional state quantity (motional state quantity of the inclination angle in the roll direction of the vehicle body 2) and the second motional state quantity (motional state quantity of the steering angle of the steered wheel (front wheel 3f)) and, hence, to stabilize the posture (in the roll direction) of the vehicle body 2.

It should be noted that in the present embodiment, the desired front-wheel steering angular acceleration δf_dot2_cmd of the steered wheel (front wheel 3f) corresponds to the reference quantity in the present invention.

Further, in the present embodiment, the aforesaid gain K1 corresponds to the sensitivity Ra1 of the change in value of the reference quantity (δf_dot2_cmd) to the change in observed value (φb_act) of the inclination angle in the roll direction of the vehicle body 2, and the aforesaid gain K2 corresponds to the sensitivity Ra2 of the change in value of the reference quantity (δf_dot2_cmd) to the change in observed value (φb_dot_act) of the temporal change rate of the inclination angle in the roll direction of the vehicle body 2.

Furthermore, the aforesaid gain K3 corresponds to the sensitivity Rb1 of the change in value of the reference quantity (δf_dot2_cmd) to the change in observed value (δf_act) of the steering angle δf of the steered wheel (front wheel 3f), and the aforesaid gain K4 corresponds to the sensitivity Rb2 of the change in value of the reference quantity (δf_dot2_cmd) to the change in observed value (δf_dot_act) of the temporal change rate of the steering angle δf of the steered wheel (front wheel 3f).

In this case, as the gains K1, K2, K3, and K4 are determined with the above-described trends with respect to the observed value (Vox_act) of the actual traveling speed of the two-wheeled vehicle 1A, the steering force of the front-wheel steering actuator 8 is controlled such that the magnitude of the ratio K1/K3 between the gains K1 and K3, corresponding to the ratio Ra1/Rb1 between the above-described sensitivities Ra1 and Rb1, becomes smaller as the magnitude of the observed value (Vox_act) of the traveling speed of the two-wheeled vehicle 1A becomes larger. Further, the steering force of the front-wheel steering actuator 8 is controlled such that the magnitude of the ratio K2/K4 between the gains K2 and K4, corresponding to the ratio Ra2/Rb2 between the above-described sensitivities Ra2 and Rb2, becomes smaller as the magnitude of the observed value (Vox_act) of the traveling speed of the two-wheeled vehicle 1A becomes larger.

Further, as the gains K1 and K2 are determined with the above-described trends with respect to the observed value (δf_act) of the steering angle of the steered wheel (front wheel 3f), the steering force of the front-wheel steering actuator 8 is controlled such that the magnitudes of the gains K1 and K2 corresponding respectively to the above-described sensitivities Ra1 and Ra2 each become smaller as the magnitude of the observed value (δf_act) of the steering angle of the steered wheel (front wheel 3f) from the non-steered state thereof becomes larger.

Further, as the desired handlebar angle δh_cmd is determined by the processing shown in FIG. 9 or 10 (particularly, the processing in the processing section 38-3 or 38-5), the handlebar driving actuator 9 is controlled such that the handlebar angle δh representing the rotational amount of the operation apparatus 7 has saturation characteristics with respect to the steering angle δf of the steered wheel (front wheel 3f) from the non-steered state thereof.

According to the present embodiment described above, when the two-wheeled vehicle 1A is stopped or traveling at a low speed, in the case where the actual roll angle (detected roll angle φb_act) of the vehicle body 2 deviates from the desired roll angle φb_cmd (in other words, in the case where the actual posture of the vehicle body 2 deviates from a desired posture satisfying φb_act=φb_cmd), the steering of the front wheel 3f by the steering force of the front-wheel steering actuator 8 can cause a moment (in the roll direction) capable of making the actual roll angle of the vehicle body 2 restored to the desired roll angle φb_cmd to act on the vehicle body 2, without the need for the rider to intentionally move the operation apparatus 7.

That is, it is possible to cause the moment in the roll direction for stabilizing the posture of the vehicle body 2 to act on the vehicle body 2. With this moment, the actual roll angle of the vehicle body 2 is restored to the desired roll angle φb_cmd.

Further, through calculation of the desired front-wheel steering angular acceleration δf_dot2_cmd by the aforesaid expression (3) (or expression (4)), the desired front-wheel steering angular acceleration δf_dot2_cmd (operational target of the front-wheel steering actuator 8) is determined such that a deviation (φb_cmd−φb_act) of the detected roll angle φb_act, representing an observed value of the current actual roll angle, from the desired roll angle φb_cmd of the vehicle body 2, a deviation (φb_dot_cmd−φb_dot_act) of the detected roll angular velocity φb_dot_act, representing an observed value of the current actual roll angular velocity, from the desired roll angular velocity φb_dot_cmd of the vehicle body 2, the last time's desired front-wheel steering angle δf_cmd_p, representing a pseudo estimate of the current actual steering angle (from the neutral steering angle) of the front wheel 3f, and the last time's desired front-wheel steering angular velocity δf_dot_cmd_p, representing a pseudo estimate of the angular velocity of the current actual steering angle of the front wheel $3f$, each approach "0" in the state where the rider is not attempting to move the operation apparatus 7.

Therefore, the steering angle of the front wheel $3f$ is controlled so as to cause the actual roll angle and roll angular velocity of the vehicle body 2 to converge to the respective desired values (zero in the present embodiment), while preventing the actual steering angle of the front wheel $3f$ from diverging from the neutral steering angle (while causing the actual steering angle to ultimately converge to the neutral steering angle).

Accordingly, the posture of the vehicle body 2 can be stabilized smoothly, particularly when the two-wheeled vehicle 1A is stopped or traveling at a low speed. Further, the two-wheeled vehicle 1A can be started smoothly with the vehicle body 2 in a stable posture.

In the case where a rider applies a rotative force (about the handlebar axis Ch) to the operation apparatus 7 in an attempt to move the operation apparatus 7, the steering angle of the front wheel $3f$ can be controlled with an angular acceleration corresponding to the magnitude of the rotative force applied to the operation apparatus 7, by the feedforward manipulated variable Th_act*Kh.

Further, the gains K1 and K2, which are the feedback gains related to the posture control in the roll direction of the vehicle body 2, and the gains K3 and K4, which are the feedback gains related to the control of the steering angle of the front wheel $3f$, are variably determined, as described above, in accordance with the estimated traveling speed Vox_act, which is an observed value of the current actual traveling speed (transfer velocity in the X-axis direction) of the two-wheeled vehicle 1A.

Accordingly, when the two-wheeled vehicle 1A is stopped or traveling at a low speed, it is possible to perform the steering of the front wheel $3f$ to cause the actual roll angle of the vehicle body 2 to quickly approach the desired roll angle φb_cmd.

In the state where the two-wheeled vehicle 1A is traveling at a high speed, even if the vehicle body 2 is leaned, the steering control of the front wheel $3f$ for causing the actual roll angle of the vehicle body 2 to approach the desired roll angle φb_cmd is not performed, or such steering control is restricted. Consequently, a rider can readily turn the two-wheeled vehicle 1A by banking the vehicle body 2 by shifting the weight of the rider's body, as with a conventional two-wheeled vehicle.

Furthermore, the gains K1 and K2 are not only determined variably in accordance with the estimated traveling speed Vox_act, but also determined variably in accordance with the last time's desired front-wheel steering angle δf_cmd_p, representing a pseudo estimate of the current actual steering angle of the front wheel $3f$, as described above. Accordingly, good posture control of the vehicle body 2 can be achieved with high robustness over a wide steering range of the front wheel $3f$, without causing oscillation in the posture control of the vehicle body 2.

Second Embodiment

A second embodiment of the present invention will be described below with reference to FIGS. 14 to 22.

Figure 14:
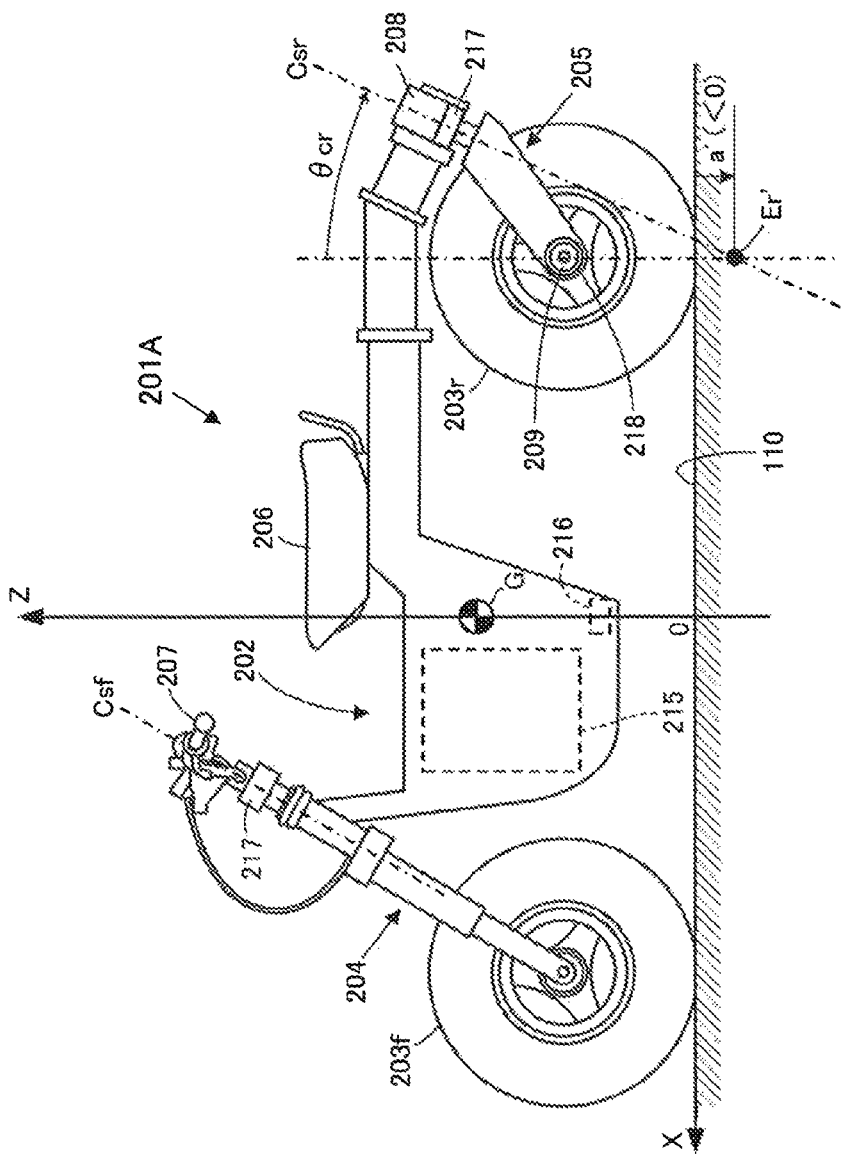
FIG. 14 is a side view of a mobile vehicle (two-wheeled vehicle) according to a second embodiment of the present invention.

Referring to FIG. 14, a mobile vehicle 201A according to the present embodiment is a two-wheeled vehicle which includes a vehicle body 202, and a front wheel $203f$ and a rear wheel $203r$ arranged spaced apart from each other in the longitudinal direction of the vehicle body 202. Hereinafter, the mobile vehicle 201A will be referred to as "two-wheeled vehicle 201A".

On the upper surface of the vehicle body 202, a seat 206 is provided for a rider to sit astride.

At the front portion of the vehicle body 202, a front-wheel support mechanism 204 for axially supporting the front wheel $203f$, and an operation apparatus 207 for a rider who has sat on the seat 206 to hold are mounted.

The front-wheel support mechanism 204 is made up of a front fork which includes a suspension mechanism such as a damper, for example. The mechanical structure of the front-wheel support mechanism is similar to that of a conventional motorcycle, for example. At one end of this front-wheel support mechanism 204 (at its end on the front side of the vehicle body 202), the front wheel $203f$ is axially supported, via bearings or the like, such that it can rotate about the axle centerline (rotational axis of the front wheel $203f$) that extends in the direction orthogonal to the diameter direction of the front wheel $203f$ (in the direction perpendicular to the paper plane of FIG. 14).

The front-wheel support mechanism 204 is mounted to the front portion of the vehicle body 202 such that the mechanism can rotate about a steering axis Csf which is tilted backward. This configuration makes the front wheel $203f$ serve as a steered wheel which can be rotated, or, steered about the steering axis Csf together with the front-wheel support mechanism 204.

The operation apparatus 207 is mounted to the front portion of the vehicle body 202 so as to be able to rotate about the steering axis Csf of the front wheel $203f$ in an integrated manner with the front-wheel support mechanism 204. Although not shown in detail in the figure, this operation apparatus 207 is equipped with an accelerator grip, brake lever, turn signal switch, and so on, as with the handlebar of a conventional motorcycle.

The rear portion of the vehicle body 202 is extended to over the rear wheel $203r$. At the rear end portion of the vehicle body 202, a rear-wheel support mechanism 205 for axially supporting the rear wheel $203r$ in a rotatable manner and an actuator 208 for generating a steering force for steering the rear wheel $203r$ are mounted.

The rear-wheel support mechanism 205 is made up of a suspension mechanism including a damper and a swing arm. The rear-wheel support mechanism 205 is arranged to extend downward from the rear end portion of the vehicle body 202.

At the lower end of the rear-wheel support mechanism 205, the rear wheel $203r$ is axially supported, via bearings or the like, such that it can rotate about the axle centerline (rotational axis of the rear wheel $203r$) that extends in the direction orthogonal to the diameter direction of the rear wheel $203r$ (in the direction perpendicular to the paper plane of FIG. 14).

In the present embodiment, an actuator 209 for rotatively driving the rear wheel $203r$ about its axle centerline is attached to the axle of the rear wheel $203r$. The actuator 209 serves as a power engine which generates a thrust force for the two-wheeled vehicle 201A. In the present embodiment, this actuator 209 (hereinafter, also referred to as "rear-wheel driving actuator 209") is made up of an electric motor (with a speed reducer).

It should be noted that the actuator 209 may be made up of a hydraulic actuator, for example, instead of the electric motor. Alternatively, the actuator 209 may be made up of an internal combustion engine. Furthermore, the actuator 209 may be attached to the vehicle body 202 at a position apart from the axle of the rear wheel $203r$, and the actuator 209 and the axle of the rear wheel 203r may be connected by an appropriate power transmission device.

The two-wheeled vehicle 201A may be equipped, not with the actuator 209 for rotatively driving the rear wheel 203r about its axle centerline, but with an actuator for rotatively driving the front wheel 203f about its axle centerline. Alternatively, the two-wheeled vehicle 201A may be equipped with an actuator for rotatively driving the front wheel 203f and the rear wheel 203r about their respective axle centerlines.

The rear-wheel support mechanism 205 is mounted to the vehicle body 202 such that the mechanism can rotate about a steering axis Csr which is tilted backward. This configuration makes the rear wheel 203r serve as a steered wheel which can be rotated, or, steered about the steering axis Csr together with the rear-wheel support mechanism 205. As the steering axis Csr is tilted backward, the rear wheel 203r has a positive caster angle θcr.

Supplementally, in the two-wheeled vehicle 201A of the present embodiment, the relative arrangement of the steering axis Csr and the rear wheel 203r in the basic posture state in which the two-wheeled vehicle 201A is stationary in the straight-ahead posture is set, as shown in FIG. 14, such that an intersection point Er' of the steering axis Csr and a straight line connecting the center of the axle of the rear wheel 203r and the ground contact point thereof is located below the ground surface 110 (or, such that a height a' of the intersection point Er' from the ground surface 110 is lower (a'<0) than the ground surface 110) in the basic posture state.

In other words, the relative arrangement of the steering axis Csr and the rear wheel 203r in the above-described basic posture state is set such that the point of intersection of the steering axis Csr and the ground surface 110 is located behind the ground contact point of the rear wheel 203r (such that the rear wheel 203r has a negative trail) in the basic posture state.

It should be noted that the basic posture state of the two-wheeled vehicle 201A more specifically refers to the state where the front wheel 203f and the rear wheel 203r are both stationary in the upright posture in contact with the ground surface 110 and the axle centerlines (centers of the rotational axes) of the front wheel 203f and the rear wheel 203r extend in parallel with each other in the direction orthogonal to the longitudinal direction of the vehicle body 202.

In the two-wheeled vehicle 201A according to the present embodiment, the relative arrangement of the steering axis Csr and the rear wheel 203r in the basic posture state is set, as stated above, such that the height a' of the intersection point Er' from the ground surface 110 is lower than the ground surface 110, for the following reason.

According to various experiments and studies conducted by the present inventors, in order to cause a moment (in the roll direction) effective in stably controlling the posture of the vehicle body 202 to act on the vehicle body 202 by the steering of the rear wheel 203r of the two-wheeled vehicle 201A, it is preferable that the height a' of the aforesaid intersection point Er' from the ground surface 110 is lower than a certain level (including the case where it is lower than the ground surface 110).

In view of the foregoing, in the present embodiment, the relative arrangement of the steering axis Csr and the rear wheel 203r in the basic posture state has been set as described above, by way of example, such that the rear wheel 203r of the two-wheeled vehicle 201A has a negative trail. The trail of the rear wheel 203r of the two-wheeled vehicle 201A, however, does not necessarily have to be negative; the relative arrangement of the steering axis Csr and the rear wheel 203r may be set such that the rear wheel 203r has a positive trail. Basically, what is required is only that the steering of the rear wheel 203r can cause a moment in the roll direction to act on the vehicle body 202.

The aforesaid actuator 208 generates, as a steering force for performing the steering of the rear wheel 203r, a rotative driving force to cause the rear wheel 203r to rotate about the steering axis Csr. In the present embodiment, this actuator 208 is made up of an electric motor (with a speed reducer). The actuator 208 (hereinafter, also referred to as "rear-wheel steering actuator 208") is connected to the rear-wheel support mechanism 205 so as to apply the rotative driving force about the steering axis Csr to the rear-wheel support mechanism 205.

Accordingly, as the rotative driving force is applied from the rear-wheel steering actuator 208 to the rear-wheel support mechanism 205, the rear-wheel support mechanism 205 is rotatively driven about the steering axis Csr together with the rear wheel 203r. As a result, the rear wheel 203r is steered by the rotative driving force from the rear-wheel steering actuator 208.

It should be noted that the actuator 208 is not limited to the electric motor; it may be made up, for example, of a hydraulic actuator.

Figure 15:
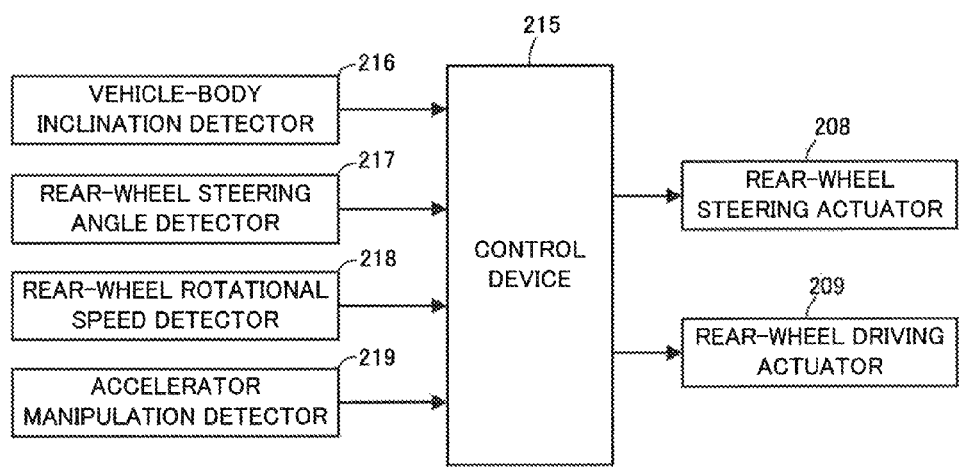
FIG. 15 is a block diagram showing the configuration related to the control of the mobile vehicle according to the second embodiment.

Besides the above-described mechanical configuration, the two-wheeled vehicle 201A includes, as shown in FIG. 15, a control device 215 which carries out control processing for controlling the operations of the rear-wheel steering actuator 208 and rear-wheel driving actuator 209 (and, hence, controlling the posture of the vehicle body 202 and so on).

The two-wheeled vehicle 201A further includes, as sensors for detecting various kinds of state quantities necessary for the control processing in the control device 215, a vehicle-body inclination detector 216 for detecting an inclination angle φb in the roll direction of the vehicle body 202, a rear-wheel steering angle detector 217 for detecting a steering angle δr (angle of rotation about the steering axis Csr) of the rear wheel 203r, a rear-wheel rotational speed detector 218 for detecting a rotational speed (angular velocity) of the rear wheel 203r, and an accelerator manipulation detector 219 which outputs a detection signal corresponding to the manipulated variable (rotational amount) of the accelerator grip of the operation apparatus 207.

It should be noted that the steering angle δr of the rear wheel 203r more specifically means the rotational angle of the rear wheel 203r from the steering angle (neutral steering angle) in its non-steered state (the state in which the direction of the axle centerline of the rear wheel 203r is orthogonal to the longitudinal direction of the vehicle body 202). Therefore, the steering angle δr of the rear wheel 203r in the non-steered state is "0".

The positive rotational direction of the steering angle δr of the rear wheel 203r corresponds to the direction of rotation that makes the front end of the rear wheel 203r turn left with respect to the vehicle body 202 (in other words, the direction in which the rear wheel 203r turns counterclockwise about the steering axis Csr as the two-wheeled vehicle 201A is seen from above).

The control device 215, which is an electronic circuit unit made up of a CPU, RAM, ROM, interface circuit and so on, is mounted on the vehicle body 202. This control device 215 is configured to receive outputs (detection signals) from the respective detectors 216 to 219 described above.

The control device 215 may include a plurality of CPUs or processors. Further, the control device 215 may be made up of a plurality of mutually communicable electronic circuit units.

The vehicle-body inclination detector 216, which is made up of an acceleration sensor and a gyro sensor (angular velocity sensor), for example, is mounted on the vehicle body 202. In this case, the control device 215 carries out arithmetic processing on the basis of the outputs of the acceleration sensor and the gyro sensor to measure the inclination angle in the roll direction (more specifically, the inclination angle in the roll direction with respect to the vertical direction (direction of gravitational force)) of the vehicle body 202. For this measurement, the technique proposed by the present applicant in Japanese Patent No. 4181113, for example, may be adopted.

The rear-wheel steering angle detector 217 is made up, for example, of a rotary encoder attached to the rear-wheel steering actuator 208 on the aforesaid steering axis Csr.

The rear-wheel rotational speed detector 218 is made up, for example, of a rotary encoder attached to the axle of the rear wheel 203r.

The accelerator manipulation detector 219 is made up, for example, of a rotary encoder or a potentiometer built in the operation apparatus 207.

The functions of the above-described control device 215 will be described further with reference to FIG. 16. The XYZ coordinate system used in the following description is, as shown in FIG. 14, a coordinate system in which, in the basic posture state of the two-wheeled vehicle 201A, the vertical direction (up-and-down direction) is defined as the Z-axis direction, the longitudinal direction of the vehicle body 202 as the X-axis direction, the lateral direction of the vehicle body 202 as the Y-axis direction (Y-axis not shown in the figure), and a point on the ground surface 110 immediately beneath the overall center of gravity G of the two-wheeled vehicle 201A as the origin.

Further, in the following description, as in the first embodiment, the suffix "_act" is added to the reference characters of a state quantity as a sign indicating an actual value or its observed value (detected value or estimate). For a desired value, the suffix "_cmd" is added.

Figure 16:
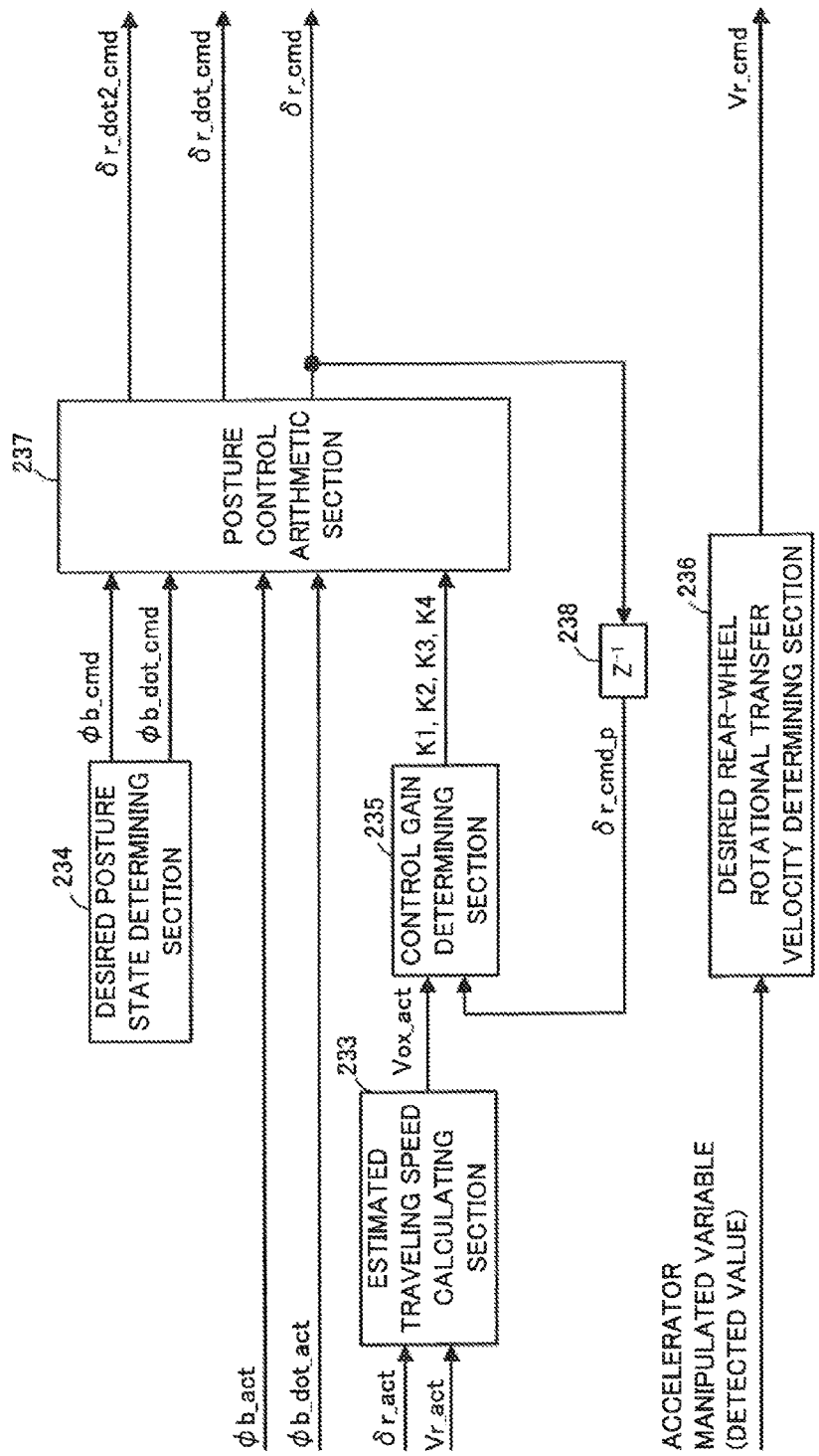
FIG. 16 is a block diagram showing the major functions of the control device shown in FIG. 15.

The control device 215 includes, as functions implemented when the CPU executes installed programs (functions implemented by software) or as functions implemented by hardware, as shown in FIG. 16: an estimated traveling speed calculating section 233 which calculates an estimate of the actual value Vox_act (hereinafter, referred to as "estimated traveling speed Vox_act") of the traveling speed Vox of the two-wheeled vehicle 201A, a desired posture state determining section 234 which determines a desired value φb_cmd (hereinafter, referred to as "desired roll angle φb_cmd") of the roll angle (inclination angle in the direction about the X axis (roll direction)) φb of the vehicle body 202 and a desired value φb_dot_cmd (hereinafter, referred to as "desired roll angular velocity φb_dot_cmd") of the roll angular velocity φb_dot which is a temporal change rate of the roll angle φb, a control gain determining section 235 which determines values of a plurality of gains K1, K2, K3, and K4 for posture control of the vehicle body 202, and a desired rear-wheel rotational transfer velocity determining section 236 which determines a desired value Vr_cmd (hereinafter, referred to as "desired rear-wheel rotational transfer velocity Vr_cmd") of the rotational transfer velocity Vr of the rear wheel 203r (translational velocity of the rear wheel 203r as the rear wheel 203r rolls on the ground surface 110).

The control device 215 further includes a posture control arithmetic section 237 which carries out arithmetic processing for the posture control of the vehicle body 202 to thereby determine a desired value δr_cmd (hereinafter, referred to as "desired rear-wheel steering angle δr_cmd") of the steering angle δr of the rear wheel 203r, a desired value δr_dot_cmd (hereinafter, referred to as "desired rear-wheel steering angular velocity δr_dot_cmd") of the steering angular velocity δr_dot which is a temporal change rate of the steering angle δr, and a desired value δr_dot2_cmd (hereinafter, referred to as "desired rear-wheel steering angular acceleration δr_dot2_cmd") of the steering angular acceleration δr_dot2 which is a temporal change rate of the steering angular velocity δr_dot.

The control device 215 carries out the processing in the above-described functional sections successively at prescribed control processing cycles. The control device 215 then controls the rear-wheel steering actuator 208 in accordance with the desired rear-wheel steering angle δr_cmd, the desired rear-wheel steering angular velocity δr_dot_cmd, and the desired rear-wheel steering angular acceleration δr_dot2_cmd determined by the posture control arithmetic section 237.

Further, the control device 215 controls the rear-wheel driving actuator 209 in accordance with the desired rear-wheel rotational transfer velocity Vr_cmd determined by the desired rear-wheel rotational transfer velocity determining section 236.

The control processing performed by the control device 215 will be described below in detail.

At each control processing cycle, the control device 215 first carries out the processing in the estimated traveling speed calculating section 233.

As shown in FIG. 16, the estimated traveling speed calculating section 233 receives an estimate of the actual value Vr_act (hereinafter, referred to as "estimated rear-wheel rotational transfer velocity Vr_act") of the rotational transfer velocity Vr of the rear wheel 203r (translational velocity of the rear wheel 203r as the rear wheel 203r rolls on the ground surface 110), and a detected value of the actual value δr_act (hereinafter, referred to as "detected rear-wheel steering angle δr_act") of the steering angle δr of the rear wheel 203r, which is indicated by an output from the rear-wheel steering angle detector 217.

It should be noted that the estimated rear-wheel rotational transfer velocity Vr_act is a velocity which is calculated by multiplying a detected value (observed value) of the rotational angular velocity of the rear wheel 203r, indicated by an output from the aforesaid rear-wheel rotational speed detector 218, by a predetermined effective rolling radius of the rear wheel 203r.

Figure 17:
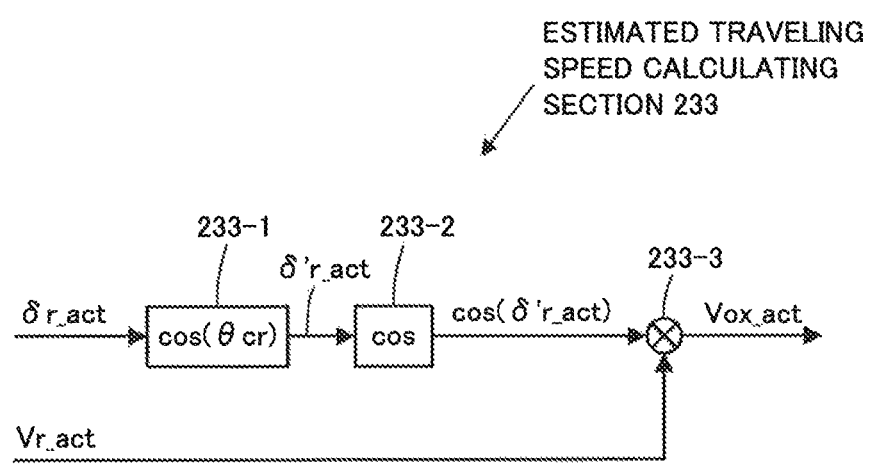
FIG. 17 is a block diagram showing the processing performed by the estimated traveling speed calculating section shown in FIG. 16.

The estimated traveling speed calculating section 233 carries out the processing shown in the block diagram in FIG. 17 to calculate an estimated traveling speed Vox_act.

In FIG. 17, a processing section 233-1 is a processing section which multiplies a detected rear-wheel steering angle δr_act at the current time by a cosine value of the caster angle θcr of the rear wheel 203r, to thereby calculate an estimate of the actual value δ'r_act (hereinafter, referred to as "estimated rear-wheel effective steering angle δ'r_act") of a rear-wheel effective steering angle δ'r which corresponds to the rotational angle in the yaw direction of the rear wheel 203r.

Here, the rear-wheel effective steering angle δ'r is an angle of the line of intersection of the ground surface 110 and the rotational plane of the rear wheel 203r being steered (plane passing through the center of the axle of the rear wheel 203r and orthogonal to the axle centerline of the rear wheel 203r) with respect to the longitudinal direction (X-axis direction) of the vehicle body 202.

In the case where the roll angle φb of the vehicle body 202 is relatively small, the estimated rear-wheel effective steering angle δ'r_act can be calculated approximately by the following expression (11). The processing in the above-described processing section 233-1 is the processing of approximately calculating δ'r_act by the expression (11).

$$\delta'r\_act = \cos(\theta cr) * \delta r\_act \quad (11)$$

To further improve the accuracy of δ'r_act, δ'r_act may be obtained by a mapping from δr_act. Alternatively, to still further improve the accuracy of δ'r_act, δ'r_act may be obtained by a mapping (two-dimensional mapping) or the like from the detected rear-wheel steering angle δr_act and a detected value of the actual roll angle φb_act of the vehicle body 202, which is indicated by an output from the vehicle-body inclination detector 216.

In FIG. 17, a processing section 233-2 represents a processing section which obtains a cosine value cos(δ'r_act) of the estimated rear-wheel effective steering angle δ'r_act calculated in the processing section 233-1, and a processing section 233-3 represents a processing section which multiplies an estimated rear-wheel rotational transfer velocity Vr_act at the current time by the above-described cosine value cos(δ'r_act) to thereby calculate an estimated traveling speed Vox_act.

Accordingly, the estimated traveling speed calculating section 233 is configured to calculate Vox_act by multiplying Vr_act by the cosine value cos(δ'r_act) of δ'r_act. That is, Vox_act is calculated by the following expression (12).

$$\begin{aligned}Vox\_act &= Vr\_act * \cos(\delta'r\_act) \quad (12)\\ &= Vr\_act * \cos(\delta r\_act * \cos(\theta cr))\end{aligned}$$

The estimated traveling speed Vox_act calculated in this manner corresponds to a component in the X-axis direction of the estimated rear-wheel rotational transfer velocity Vr_act.

It should be noted that in the processing in the estimated traveling speed calculating section 233, the estimated traveling speed Vox_act may be calculated by the aforesaid expression (2) explained in conjunction with the first embodiment.

Further, instead of the detected rear-wheel steering angle δr_act and the estimated rear-wheel rotational transfer velocity Vr_act at the current time, a value (last time's value) δr_cmd_p of the desired rear-wheel steering angle δr_cmd, calculated by the posture control arithmetic section 237 (described later) in the last time's control processing cycle, and a value (last time's value) Vr_cmd_p of the desired rear-wheel rotational transfer velocity Vr_cmd, calculated by the desired rear-wheel rotational transfer velocity determining section 236 (described later) in the last time's control processing cycle, respectively, may be used. More specifically, δr_cmd_p and Vr_cmd_p may be used to perform computation similar to that in the right side of the above expression (12), and the resultant value (=Vr_cmd_p*cos (δr_cmd_p*cos(θcr))) may be obtained as a pseudo estimate (alternative observed value) as an alternative to the estimated traveling speed Vox_act.

Further, in obtaining the pseudo estimate (alternative observed value) as an alternative to the estimated traveling speed Vox_act, δr_cmd_p may be used instead of the detected rear-wheel steering angle δr_act at the current time, and the estimated rear-wheel rotational transfer velocity Vr_act may be used as it is. Conversely, Vr_cmd_p may be used instead of the estimated rear-wheel rotational transfer velocity Vr_act at the current time, and the detected rear-wheel steering angle δr_act may be used as it is.

Next, the control device 215 carries out the processing in the desired rear-wheel rotational transfer velocity determining section 236.

As shown in FIG. 16, the desired rear-wheel rotational transfer velocity determining section 236 receives a detected value of the actual value of the accelerator manipulated variable, which is indicated by an output from the aforesaid accelerator manipulation detector 219.

Figure 19:
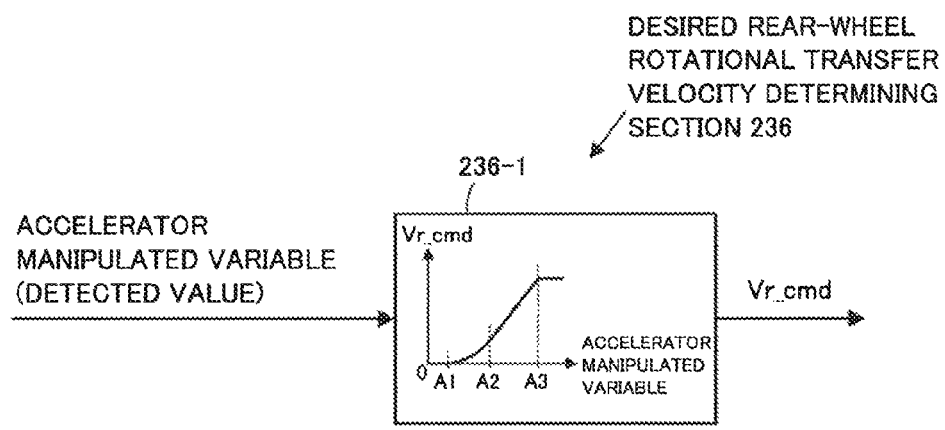
FIG. 19 is a block diagram showing the processing performed by the desired rear-wheel rotational transfer velocity determining section shown in FIG. 16.

The desired rear-wheel rotational transfer velocity determining section 236 determines a desired rear-wheel rotational transfer velocity Vr_cmd by the processing shown in the block diagram in FIG. 19, i.e. the processing in a processing section 236-1.

The processing section 236-1 determines the desired rear-wheel rotational transfer velocity Vr_cmd from a detected value of the accelerator manipulated variable at the current time, by a preset conversion function.

The conversion function is a function which is defined, for example, by a mapping or an arithmetic expression. This conversion function is basically set such that Vr_cmd determined by the conversion function increases monotonically as the accelerator manipulated variable increases.

The conversion function is set, for example, with the trend as illustrated by the graph in FIG. 19. In this case, the processing section 236-1 determines Vr_cmd to be zero when the detected value of the accelerator manipulated variable falls within the dead band range (range near zero) from zero to a prescribed first accelerator manipulated variable A1.

Further, when the detected value of the accelerator manipulated variable falls within the range from the first accelerator manipulated variable A1 to a prescribed second accelerator manipulated variable A2 (>A1), the processing section 236-1 determines Vr_cmd such that Vr_cmd increases monotonically as the accelerator manipulated variable increases and that the rate of increase of Vr_cmd (increase of Vr_cmd per unit increase of the accelerator manipulated variable) increases smoothly.

When the detected value of the accelerator manipulated variable falls within the range from the second accelerator manipulated variable A2 to a prescribed third accelerator manipulated variable A3 (>A2), the processing section 236-1 determines Vr_cmd such that Vr_cmd increases monotonically, at a constant rate of increase, as the accelerator manipulated variable increases.

Further, when the detected value of the accelerator manipulated variable exceeds the third accelerator manipulated variable A3, the processing section 236-1 determines Vr_cmd such that it remains at a constant value (at the value corresponding to A3).

Next, the control device 215 carries out the processing in the control gain determining section 235. As shown in FIG. 16, the control gain determining section 235 receives, via a delay element 238, a last time's desired rear-wheel steering angle δr_cmd_p, which is a value (last time's value) of the desired rear-wheel steering angle δr_cmd determined by the posture control arithmetic section 237 in the last time's control processing cycle of the control device 215. The control gain determining section 235 also receives an estimated traveling speed Vox_act calculated by the estimated traveling speed calculating section 233 in the current time's control processing cycle.

Figure 18:
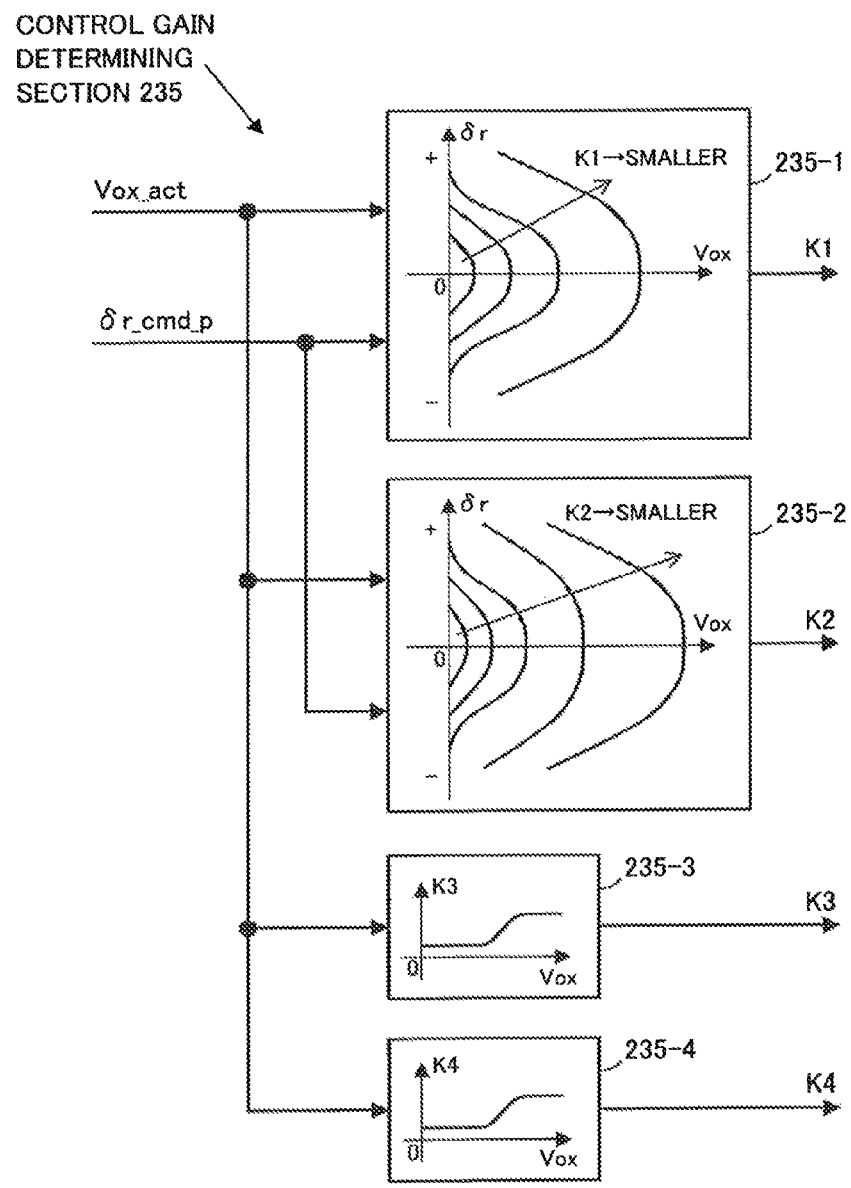
FIG. 18 is a block diagram showing the processing performed by the control gain determining section shown in FIG. 16.

The control gain determining section 235 carries out the processing shown in the block diagram in FIG. 18, for example, to determine values of a plurality of gains K1, K2, K3, and K4 for the posture control of the vehicle body 202.

The values of the gains K1, K2, K3, and K4 are each determined variably in accordance with δr_cmd_p and Vox_act, or in accordance with Vox_act, as will be described in detail later.

Next, the control device 215 carries out the processing in the desired posture state determining section 234. The desired posture state determining section 234 determines a desired roll angle φb_cmd and a desired roll angular velocity φb_dot_cmd of the vehicle body 202. In the present embodiment, the desired posture state determining section 234 sets both of the desired roll angle φb_cmd and the desired roll angular velocity φb_dot_cmd to zero, by way of example.

Next, the control device 215 carries out the processing in the posture control arithmetic section 237. As shown in FIG. 16, the posture control arithmetic section 237 receives the desired roll angle φb_cmd and the desired roll angular velocity φb_dot_cmd determined by the desired posture state determining section 234, a detected value φb_act (hereinafter, referred to as "detected roll angle φb_act") of the actual roll angle and a detected value φb_dot_act (hereinafter, referred to as "detected roll angular velocity φb_dot_act") of the actual roll angular velocity, indicated by an output from the vehicle-body inclination detector 216, and the gains K1, K2, K3, and K4 determined by the control gain determining section 235.

Figure 20:
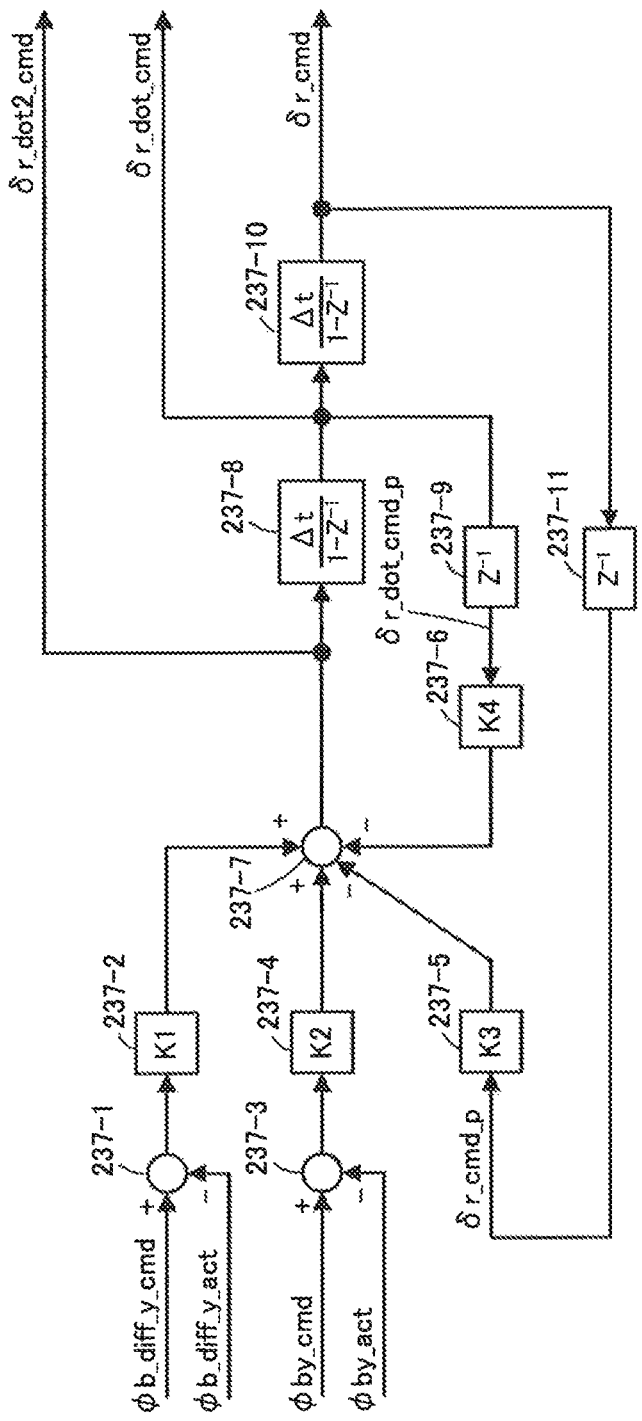
FIG. 20 is a block diagram showing an example of the processing performed by the posture control arithmetic section shown in FIG. 16.

The posture control arithmetic section 237 uses the above-described input values to carry out the processing shown in the block diagram in FIG. 20, to thereby determine a desired rear-wheel steering angle δr_cmd, a desired rear-wheel steering angular velocity δr_dot_cmd, and a desired rear-wheel steering angular acceleration δr_dot2_cmd.

In FIG. 20, a processing section 237-1 represents a processing section which obtains a deviation of a detected roll angle φb_act from a desired roll angle φb_cmd, a processing section 237-2 represents a processing section which multiplies the output of the processing section 237-1 by the gain K1, a processing section 237-3 represents a processing section which obtains a deviation of a detected roll angular velocity φb_dot_act from a desired roll angular velocity φb_dot_cmd, a processing section 237-4 represents a processing section which multiplies the output of the processing section 237-3 by the gain K2, a processing section 237-5 represents a processing section which multiplies a last time's desired rear-wheel steering angle δr_cmd_p by the gain K3, a processing section 237-6 represents a processing section which multiplies a last time's desired rear-wheel steering angular velocity δr_dot_cmd_p, which is a value of the desired rear-wheel steering angular velocity δr_dot_cmd determined by the posture control arithmetic section 237 in the last time's control processing cycle, by the gain K4, and a processing section 237-7 represents a processing section which sums up the outputs from the processing sections 237-2 and 237-4 and the values, each multiplied by −1, of the outputs from the processing sections 237-5 and 237-6, to thereby calculate a desired rear-wheel steering angular acceleration δr_dot2_cmd.

Further, a processing section 237-8 represents a processing section which integrates the output of the processing section 237-7 to obtain a desired rear-wheel steering angular velocity δr_dot_cmd, a processing section 237-9 represents a delay element which outputs the output from the processing section 237-8 in the last time's control processing cycle (i.e. last time's desired rear-wheel steering angular velocity δr_dot_cmd_p) to the processing section 237-6, a processing section 237-10 represents a processing section which integrates the output of the processing section 237-8 to obtain a desired rear-wheel steering angle δr_cmd, and a processing section 237-11 represents a delay element which outputs the output from the processing section 237-10 in the last time's control processing cycle (i.e. last time's desired rear-wheel steering angle δr_cmd_p) to the processing section 237-5.

Accordingly, the posture control arithmetic section 237 calculates the desired rear-wheel steering angular acceleration δr_dot2_cmd by the following expression (13).

$$\delta r\_dot2\_cmd = \\ K1*(\phi b\_cmd - \phi b\_act) + K2*(\phi b\_dot\_cmd - \phi b\_dot\_act) - \\ K3*\delta r\_cmd\_p - K4*\delta r\_dot\_cmd\_p \tag{13}$$

In the above expression (13), K1*(φb_cmd−φb_act) is a feedback manipulated variable having the function of making the deviation (φb_cmd−φb_act) approach "0", K2*(φb_dot_cmd−φb_dot_act) is a feedback manipulated variable having the function of making the deviation (φb_dot_cmd−φb_dot_act) approach "0", −K3*δr_cmd_p is a feedback manipulated variable having the function of making δr_cmd approach "0", and K4*δr_dot_cmd_p is a feedback manipulated variable having the function of making δr_dot_cmd approach "0".

The posture control arithmetic section 237 integrates δr_dot2_cmd determined by the above expression (13) to determine a desired rear-wheel steering angular velocity δr_dot_cmd. Further, the posture control arithmetic section 237 integrates this δr_dot_cmd to determine a desired rear-wheel steering angle δr_cmd.

It should be noted that δr_cmd_p and δr_dot_cmd_p used in the computation of the expression (13) have the meanings as pseudo estimates (alternative observed values) of the actual steering angle and steering angular velocity, respectively, of the rear wheel 203r at the current time. Therefore, instead of δr_cmd_p, a detected rear-wheel steering angle δr_act at the current time may be used. Further, instead of δr_dot_cmd_p, a detected rear-wheel steering angular velocity δr_dot_act (detected value of the actual steering angular velocity of the rear wheel 203r) based on an output from the aforesaid rear-wheel steering angle detector 217 may be used.

The above has described the processing in the posture control arithmetic section 237.

In accordance with the processing in the posture control arithmetic section 237, the desired rear-wheel steering angular acceleration δr_dot2_cmd is basically determined such that any divergence of the actual roll angle (detected roll angle φb_act) of the vehicle body 202 of the two-wheeled vehicle 201A from a desired roll angle φb_cmd, or any divergence of the actual roll angular velocity (detected roll angular velocity φb_dot_act) of the vehicle body 202 of the two-wheeled vehicle 201A from a desired roll angular velocity φb_dot_cmd, is eliminated through manipulation of the steering angle δr of the rear wheel 203r (and, hence, that the actual roll angle or roll angular velocity of the vehicle body 202 of the two-wheeled vehicle 201A is restored to the desired roll angle or desired roll angular velocity).

Further, in the present embodiment, the desired rear-wheel steering angle δr_cmd and the desired rear-wheel steering angular velocity δr_dot_cmd are both "0". Therefore, in the state where the actual roll angle of the vehicle body 202 of the two-wheeled vehicle 201A is held at a value which coincides, or almost coincides, with the desired roll angle φb_cmd, the desired rear-wheel steering angular acceleration δr_dot2_cmd is determined so as to keep the actual steering angle of the rear wheel 203r at "0" or almost "0".

Here, the gains K1 to K4 (feedback gains related to the respective feedback manipulated variables in the right side of the aforesaid expression (13)) used for calculating δr_dot2_cmd by the computation of the expression (13) are determined in the aforesaid control gain determining section 235. The processing in the control gain determining section 235 will now be described in detail.

The control gain determining section 235 determines the values of the gains K1 to K4 from the received estimated traveling speed Vox_act and last time's desired rear-wheel steering angle δr_cmd_p, by the processing shown in the block diagram in FIG. 18.

In FIG. 18, a processing section 235-1 is a processing section which determines the gain K1 in accordance with Vox_act and δr_cmd_p, and a processing section 235-2 is a processing section which determines the gain K2 in accordance with Vox_act and δr_cmd_p.

In the present embodiment, the processing section 235-1 determines the gain K1 from Vox_act and δr_cmd_p, in accordance with a preset two-dimensional mapping (conversion function of two variables). Similarly, the processing section 235-2 determines the gain K2 from Vox_act and δr_cmd_p, in accordance with a preset two-dimensional mapping (conversion function of two variables).

In these two-dimensional mappings, the trend of the change in value of the gain K1 with respect to Vox_act and δr_cmd_p and the trend of the change in value of the gain K2 with respect to Vox_act and δr_cmd_p are set substantially similar to each other.

Specifically, as illustrated by the graphs shown in the processing sections 235-1 and 235-2 in FIG. 18, the two-dimensional mappings in the processing sections 235-1 and 235-2 are each set such that the magnitude of the gain K1, K2 determined by the two-dimensional mapping has the trend of monotonically decreasing with increasing Vox_act when δr_cmd_p is fixed to a given value.

Accordingly, the gains K1 and K2 as the feedback gains related to the feedback manipulated variables having the function of stabilizing the posture in the roll direction of the vehicle body 202 of the two-wheeled vehicle 201A (making the detected roll angle φb_act and the detected roll angular velocity φb_dot_act converge respectively to φb_cmd and φb_dot_cmd) are determined such that the magnitudes of the gains K1 and K2 each become smaller as the actual traveling speed (estimated traveling speed Vox_act) of the two-wheeled vehicle 201A becomes greater.

In other words, the gains K1 and K2 are determined such that the steering force that the rear-wheel steering actuator 208 generates, in accordance with a deviation of φb_act from φb_cmd or a deviation of φb_dot_act from φb_dot_cmd, in the direction of eliminating the deviation is reduced when the actual traveling speed (estimated traveling speed Vox_act) of the two-wheeled vehicle 201A is in a high-speed range, as compared to when it is in a low-speed range.

Further, the two-dimensional mappings in the processing sections 235-1 and 235-2 are each set such that the gain K1, K2 determined by the mapping has the trend of monotonically decreasing with increasing magnitude (absolute value) of δr_cmd_p when Vox_act is fixed to a given value.

Accordingly, the gains K1 and K2 as the gains related to the feedback manipulated variables having the function of stabilizing the posture in the roll direction of the vehicle body 202 of the two-wheeled vehicle 201A are determined such that the magnitudes of the gains K1 and K2 each become smaller as the magnitude of δr_cmd_p, corresponding to the actual steering angle of the rear wheel 203r, becomes larger.

Here, in the case where the magnitude of the actual steering angle of the rear wheel 203r is large, compared to the case where it is small, the radius of curvature of the ground contact part of the steered wheel (rear wheel 203r) as seen in a cross section including the ground contact point of the steered wheel (rear wheel 203r) and having a normal in the X-axis direction (longitudinal direction of the vehicle body 202) becomes larger. Consequently, in the case where the magnitude of the actual steering angle of the rear wheel 203r is large, compared to the case where it is small, the change in movement amount of the ground contact point of the rear wheel 203r according to the change in the steering angle becomes larger.

Because of this, if the magnitudes of the gains K1 and K2 are set independently of the actual steering angle, oscillation is likely to occur in the control of the posture in the roll direction of the vehicle body 202 of the two-wheeled vehicle 201A when the actual steering angle is large.

In view of the foregoing, in the present embodiment, it has been configured such that the magnitudes of the gains K1 and K2 are changed in accordance with the magnitude of δr_cmd_p, as described above. This can prevent the above-described oscillation even in the case where the magnitude (absolute value) of the actual steering angle of the rear wheel 203r is large.

Further, in the block diagram in FIG. 18, a processing section 235-3 is a processing section which determines the gain K3 in accordance with Vox_act, and a processing section 235-4 is a processing section which determines the gain K4 in accordance with Vox_act.

In the present embodiment, the processing sections 235-3 and 235-4 determine the gains K3 and K4, respectively, from Vox_act, in accordance with conversion functions defined by preset mappings (or arithmetic expressions).

These conversion functions are set, as illustrated by the graphs shown in the processing sections 235-3 and 235-4 in FIG. 18, such that basically the gains K3 and K4 each increase monotonically, between a prescribed upper limit and a prescribed lower limit, as Vox_act increases.

In this case, in the conversion functions in the processing sections 235-3 and 235-4, in the region where Vox_act takes a value near "0", K3 and K4 are each maintained at the lower limit. In the region where Vox_act takes a sufficiently large value, K3 and K4 are each maintained at the upper limit.

As the gains K3 and K4 are determined in the above-described manner, the gains K3 and K4 as the feedback gains related to the feedback manipulated variables having the function of making the steering angle δr of the rear wheel 203r approach zero are determined such that the magnitudes of the gains K3 and K4 become relatively large in the case where the actual traveling speed (estimated traveling speed Vox_act) of the two-wheeled vehicle 201A is relatively high (in a high-speed range), compared to the case where the actual traveling speed of the two-wheeled vehicle 201A is relatively low (in a low-speed range (including "0")).

In the present embodiment, as the gains K1 and K3 are set as described above, the ratio between the gain K1, with a fixed steering angle of the rear wheel 203r, and the gain K3 (=K1/K3) is set such that the ratio becomes smaller as the traveling speed of the two-wheeled vehicle 201A becomes greater.

Similarly, as the gains K2 and K4 are set as described above, the ratio between the gain K2, with a fixed steering angle of the rear wheel 203r, and the gain K4 (=K2/K4) is set such that the ratio becomes smaller as the traveling speed of the two-wheeled vehicle 201A becomes greater.

Therefore, as the traveling speed of the two-wheeled vehicle 201A becomes greater, the gains K1 and K2 as the feedback gains related to the feedback manipulated variables having the function of controlling the posture in the roll direction of the vehicle body 202 each become relatively small compared to the gains K3 and K4 as the feedback gains related to the feedback manipulated variables having the function of making the actual steering angle of the rear wheel 203r converge to zero.

Accordingly, in the case where the actual traveling speed (estimated traveling speed Vox_act) of the two-wheeled vehicle 201A is relatively high, i.e. in the state where the stability of the posture in the roll direction of the vehicle body 202 is high, a rider of the two-wheeled vehicle 201A can readily change the posture in the roll direction (roll angle φb) of the vehicle body 202 by shifting the weight of the rider's body and so on, as in the case of a conventional two-wheeled vehicle (which is not provided with the function of controlling the posture in the roll direction of the vehicle body).

It should be noted that the two-dimensional mappings for determining the gains K1 and K2 may each be set such that the value of K1, K2 is determined to be "0" or almost "0" when the estimated traveling speed Vox_act reaches a certain level (i.e. when Vox_act is not lower than a prescribed speed).

With this configuration, the function of controlling the posture in the roll direction of the vehicle body 202 becomes substantially OFF when the actual traveling speed (estimated traveling speed Vox_act) of the two-wheeled vehicle 201A is relatively high. This can make the behavioral characteristics of the two-wheeled vehicle 201A approach the characteristics comparable to those of a conventional two-wheeled vehicle in the case where the actual traveling speed of the two-wheeled vehicle 201A is high.

The above has described the details of the processing in the control gain determining section 235 according to the present embodiment.

It should be noted that the gain K3 may be set such that, instead of increasing monotonically, it remains constant or decreases monotonically, between a prescribed upper limit and a prescribed lower limit, as Vox_act increases. In this case as well, the ratio between the gain K1, with a fixed steering angle of the rear wheel 203r, and the gain K3 (=K1/K3) is set such that the ratio becomes smaller as the traveling speed of the two-wheeled vehicle 201A becomes greater.

Similarly, the gain K4 may be set such that, instead of increasing monotonically, it remains constant or decreases monotonically, between a prescribed upper limit and a prescribed lower limit, as Vox_act increases. In this case as well, the ratio between the gain K2, with a fixed steering angle of the rear wheel 203r, and the gain K4 (=K2/K4) is set such that the ratio becomes smaller as the traveling speed of the two-wheeled vehicle 201A becomes greater.

Further, the gains K3 and K4 may be determined in accordance with Vox_act and δr_cmd_p, as with the gains K1 and K2. For example, when a pole placement method or the like is used to obtain rough approximations of appropriate values for the set of gains K1 to K4 such that the ratio between the gain K1, with a fixed steering angle of the rear wheel 203r, and the gain K3 (=K1/K3) becomes smaller as the traveling speed of the two-wheeled vehicle 201A becomes greater, the gains K3 and K4 also take values dependent on δr_cmd_p. Therefore, the gains K3 and K4 are also preferably determined in accordance with Vox_act and δr_cmd_p, as with the gains K1 and K2, so that the values approach the approximations of the appropriate values obtained from the pole placement method or the like.

Further, for the conversion functions for determining the gains K1 and K2, conversion functions in other forms may be adopted, as long as they can determine the gains with the above-described trends with respect to Vox_act and δr_cmd_p. The conversion functions may each be set in a form other than the two-dimensional mapping (for example, one-dimensional mapping and arithmetic expression may be combined). The same applies to the case where the gains K3 and K4 are each determined by a conversion function in accordance with Vox_act and δr_cmd_p, or by a conversion function in accordance with Vox_act.

The last time's desired rear-wheel steering angle δr_cmd_p has the meaning as a pseudo estimate (alternative observed value) of the actual steering angle of the rear wheel 203r at the current time.

Accordingly, for determining the respective gains K1, K2, K3, and K4, the aforesaid detected rear-wheel steering angle δr_act may be used instead of δr_cmd_p.

Further, in the case where the response of the rear-wheel driving actuator 209 is sufficiently quick, the value of the traveling speed (=Vr_cmd_p*cos(δr_cmd_p*cos(θcr)), hereinafter referred to as "last time's desired traveling speed Vox_cmd_p") calculated by the computation similar to that in the aforesaid expression (12) from the above-described last time's desired rear-wheel steering angle δr_cmd_p and a last time's desired rear-wheel rotational transfer velocity Vr_cmd_p (desired rear-wheel rotational transfer velocity Vr_cmd determined by the desired rear-wheel rotational transfer velocity determining section 236 in the last time's control processing cycle) has the meaning as a pseudo estimate (alternative observed value) of the actual traveling speed of the two-wheeled vehicle 201A at the current time.

Accordingly, for determining the respective gains K1, K2, K3, and K4, the above-described last time's desired traveling speed Vox_cmd_p may be used instead of Vox_act.

Controls of the aforesaid rear-wheel steering actuator 208 and rear-wheel driving actuator 209 will now be described.

Figure 21:
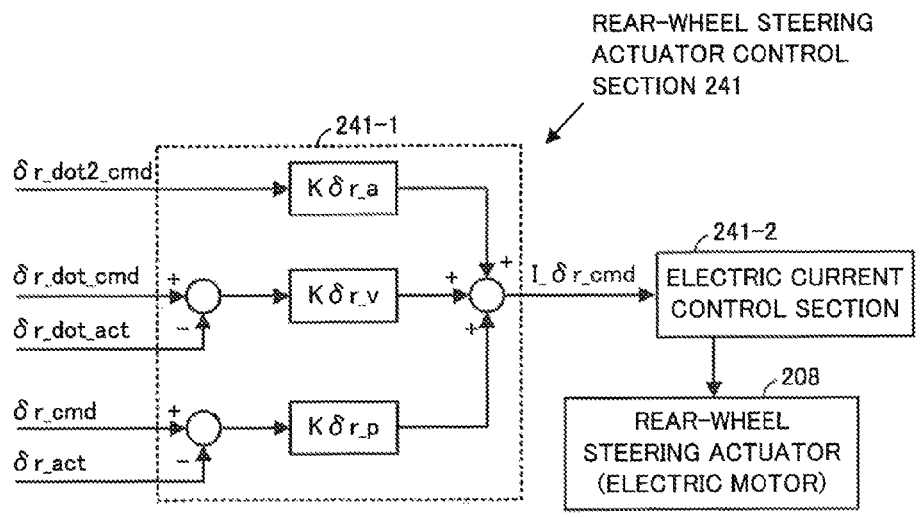
FIG. 21 is a block diagram showing the processing performed by a rear-wheel steering actuator control section included in the control device shown in FIG. 15.
Figure 22:
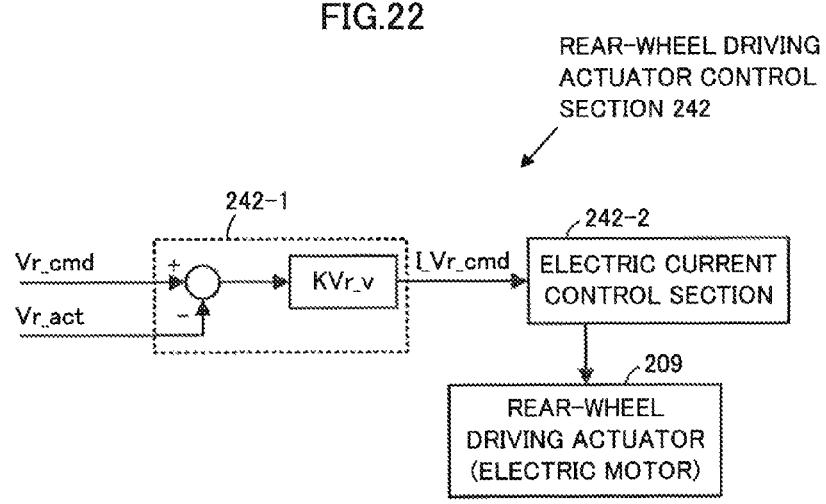
FIG. 22 is a block diagram showing the processing performed by a rear-wheel driving actuator control section included in the control device shown in FIG. 15.

The control device 215 further includes, as functions other than the functions shown in FIG. 16, a rear-wheel steering actuator control section 241 shown in FIG. 21 and a rear-wheel driving actuator control section 242 shown in FIG. 22.

The rear-wheel steering actuator control section 241 carries out drive control of the rear-wheel steering actuator 208, by the control processing shown in the block diagram in FIG. 21, for example, to cause the actual steering angle (detected rear-wheel steering angle δr_act) of the rear wheel 203r to track a desired rear-wheel steering angle δr_cmd.

In this example, the rear-wheel steering actuator control section 241 receives a desired rear-wheel steering angle δr_cmd, a desired rear-wheel steering angular velocity δr_dot_cmd, and a desired rear-wheel steering angular acceleration δr_dot2_cmd determined in the above-described manner in the posture control arithmetic section 237, a detected rear-wheel steering angle δr_act, and a detected rear-wheel steering angular velocity δr_dot_act which is a detected value of the actual steering angular velocity of the rear wheel 203r.

It should be noted that the detected rear-wheel steering angular velocity δr_dot_act is a value of the steering angular velocity which is recognized on the basis of an output from the rear-wheel steering angle detector 217, or a value obtained by calculating a temporal change rate of the detected rear-wheel steering angle δr_act.

The rear-wheel steering actuator control section 241 performs the processing in an electric current command value determining section 241-1 to determine, from the above-described input values, an electric current command value I_δr_cmd which is a desired value of the electric current passed through the rear-wheel steering actuator 208 (electric motor).

This electric current command value determining section 241-1 determines the electric current command value I_δr_cmd by summing up a feedback manipulated variable component obtained by multiplying a deviation of δr_act from δr_cmd by a gain Kδr_p of a prescribed value, a feedback manipulated variable component obtained by multiplying a deviation of δr_dot_act from δr_dot_cmd by a gain Kδr_v of a prescribed value, and a feedforward manipulated variable component obtained by multiplying δr_dot2_cmd by a gain Kδr_a of a prescribed value, as shown by the following expression (14).

$$I\_\delta r\_cmd = K\delta r\_p * (\delta r\_cmd - \delta r\_act) + \\ K\delta r\_v * (\delta r\_dot\_cmd - \delta r\_dot\_act) + K\delta r\_a * \delta r\_dot2\_cmd \quad (14)$$

The rear-wheel steering actuator control section 241 then controls the actual electric current passed through the rear-wheel steering actuator 208 (electric motor) to match the electric current command value I_δr_cmd, by an electric current control section 241-2 which is made up of a motor driver or the like.

In this manner, the control is performed such that the actual steering angle of the rear wheel 203r tracks the desired rear-wheel steering angle δr_cmd. In this case, the electric current command value I_δr_cmd includes the third term in the right side of the above expression (14), i.e. the feedforward manipulated variable component, ensuring improved tracking in the above-described control.

It should be noted that the technique of controlling the rear-wheel steering actuator 208 to cause the actual steering angle of the rear wheel 203r to track the desired rear-wheel steering angle δr_cmd is not limited to the above-described technique; other techniques may be used as well. For example, various kinds of known servo control techniques related to electric motors (feedback control techniques for causing the actual angle of rotation of the rotor of the electric motor to track a desired value) may be adopted.

The rear-wheel driving actuator control section 242 carries out drive control of the rear-wheel driving actuator 209, by the control processing shown in the block diagram in FIG. 22, for example, to cause the actual rotational transfer velocity of the rear wheel 203r to track a desired rear-wheel rotational transfer velocity Vr_cmd (or to cause the actual rotational angular velocity of the rear wheel 203r to track a desired rotational angular velocity corresponding to Vr_cmd).

In this example, the rear-wheel driving actuator control section 242 receives a desired rear-wheel rotational transfer velocity Vr_cmd determined in the above-described manner in the desired rear-wheel rotational transfer velocity determining section 236, and an estimated rear-wheel rotational transfer velocity Vr_act.

The rear-wheel driving actuator control section 242 performs the processing in an electric current command value determining section 242-1 to determine, from the above-described input values, an electric current command value I_Vr_cmd which is a desired value of the electric current passed through the rear-wheel driving actuator 209 (electric motor).

This electric current command value determining section 242-1 determines a feedback manipulated variable component obtained by multiplying a deviation of Vr_act from Vr_cmd by a gain KVr_v of a prescribed value, as the electric current command value I_Vr_cmd, as shown by the following expression (15).

$$I\_Vr\_cmd = KVr\_v * (Vr\_cmd - Vr\_act) \quad (15)$$

It should be noted that, instead of using the above expression (15), I_Vr_cmd may be determined by, for example, multiplying a deviation of the detected value of the actual rotational angular velocity of the rear wheel 203r, which is indicated by an output from the rear-wheel rotational speed detector 218, from a value obtained by dividing Vr_cmd by the effective rolling radius of the rear wheel 203r (i.e. a desired value of the rotational angular velocity of the rear wheel 203r) by a gain of a prescribed value.

The rear-wheel driving actuator control section 242 then controls the actual electric current passed through the rear-wheel driving actuator 209 (electric motor) to match the electric current command value I_Vr_cmd, by an electric current control section 242-2 which is made up of a motor driver or the like.

In this manner, the control is performed such that the actual rotational transfer velocity of the rear wheel 203r tracks the desired rear-wheel rotational transfer velocity Vr_cmd (or such that the actual rotational angular velocity tracks the desired value of the rotational angular velocity corresponding to Vr_cmd).

It should be noted that the technique of controlling the rear-wheel driving actuator 209 to cause the actual rotational transfer velocity of the rear wheel 203r to track the desired rear-wheel rotational transfer velocity Vr_cmd is not limited to the above-described technique; other techniques may be used as well. For example, various kinds of known speed control techniques related to electric motors (feedback control techniques for causing the actual rotational angular velocity of the rotor of the electric motor to track a desired value) may be adopted.

The above has described the details of the control processing in the control device 215 according the present embodiment.

Here, the correspondence between the present embodiment and the present invention will be described. In the present embodiment, the rear wheel 203r corresponds to the steered wheel in the present invention, and the rear-wheel steering actuator 208 (electric motor) corresponds to the steering actuator in the present invention.

Further, in the example of the present embodiment, the first motional state quantity in the present invention (motional state quantity of the inclination angle in the roll direction (roll angle) of the vehicle body 202) is made up of a value of the roll angle φb as it is and a roll angular velocity φb_dot which is a temporal change rate of the roll angle.

Further, in the example of the present embodiment, the second motional state quantity in the present invention (motional state quantity of the steering angle of the steered wheel (rear wheel 203r)) is made up of a value of the steering angle δr, as it is, of the rear wheel 203r and a steering angular velocity δr_dot which is a temporal change rate of the steering angle.

In the present embodiment, the desired values (φb_cmd, φb_dot_cmd) of the roll angle φb and the roll angular velocity φb_dot constituting the first motional state quantity are each set to zero, and the desired values of the steering angle δr and the steering angular velocity δr_dot constituting the second motional state quantity are each set to zero.

In the processing in the posture control arithmetic section 237, a desired rear-wheel steering angular acceleration δr_dot2_cmd as an operational target of the rear-wheel steering actuator 208 (steering actuator) is determined, by a feedback control law, so as to cause a deviation of each of the detected roll angle φb_act, the detected roll angular velocity φb_dot_act, the last time's desired rear-wheel steering angle δr_cmd_p, representing a pseudo estimate of the steering angle δr, and the last time's desired rear-wheel steering angular velocity δr_dot_cmd_p, representing a pseudo estimate of the steering angular velocity δr_dot, from the corresponding desired value to converge to zero.

Further, the steering force of the rear-wheel steering actuator 208 is controlled by the aforesaid rear-wheel steering actuator control section 241 such that the actual steering angle of the rear wheel 203r tracks a desired rear-wheel steering angle δr_cmd which has been determined by performing integration twice on the above-described δr_dot2_cmd.

In this manner, the rear-wheel steering actuator 208 is controlled so as to stabilize the first motional state quantity (motional state quantity of the inclination angle in the roll direction of the vehicle body 202) and the second motional state quantity (motional state quantity of the steering angle of the steered wheel (rear wheel 203r)) and, hence, to stabilize the posture (in the roll direction) of the vehicle body 202.

It should be noted that in the present embodiment, the desired rear-wheel steering angular acceleration δr_dot2_cmd of the steered wheel (rear wheel 203r) corresponds to the reference quantity in the present invention.

Further, in the present embodiment, the aforesaid gain K1 corresponds to the sensitivity Ra1 of the change in value of the reference quantity (δr_dot2_cmd) to the change in observed value (φb_act) of the inclination angle in the roll direction of the vehicle body 202, and the aforesaid gain K2 corresponds to the sensitivity Ra2 of the change in value of the reference quantity (δr_dot2_cmd) to the change in observed value (φb_dot_act) of the temporal change rate of the inclination angle in the roll direction of the vehicle body 202.

Furthermore, the aforesaid gain K3 corresponds to the sensitivity Rb1 of the change in value of the reference quantity (δr_dot2_cmd) to the change in observed value (δr_act) of the steering angle δr of the steered wheel (rear wheel 203r), and the aforesaid gain K4 corresponds to the sensitivity Rb2 of the change in value of the reference quantity (δr_dot2_cmd) to the change in observed value (δr_dot_act) of the temporal change rate of the steering angle δr of the steered wheel (rear wheel 203r).

In this case, as the gains K1, K2, K3, and K4 are determined with the above-described trends with respect to the observed value (Vox_act) of the actual traveling speed of the two-wheeled vehicle 201A, the steering force of the rear-wheel steering actuator 208 is controlled such that the magnitude of the ratio K1/K3 between the gains K1 and K3, corresponding to the ratio Ra1/Rb1 between the above-described sensitivities Ra1 and Rb1, becomes smaller as the magnitude of the observed value (Vox_act) of the traveling speed of the two-wheeled vehicle 201A becomes larger. Further, the steering force of the rear-wheel steering actuator 208 is controlled such that the magnitude of the ratio K2/K4 between the gains K2 and K4, corresponding to the ratio Ra2/Rb2 between the above-described sensitivities Ra2 and Rb2, becomes smaller as the magnitude of the observed value (Vox_act) of the traveling speed of the two-wheeled vehicle 201A becomes larger.

Further, as the gains K1 and K2 are determined with the above-described trends with respect to the observed value (δr_act) of the steering angle of the steered wheel (rear wheel 203r), the steering force of the rear-wheel steering actuator 208 is controlled such that the magnitudes of the gains K1 and K2 corresponding respectively to the above-described sensitivities Ra1 and Ra2 each become smaller as the magnitude of the observed value (δr_act) of the steering angle of the steered wheel (rear wheel 203r) from the non-steered state thereof becomes larger.

According to the present embodiment described above, when the two-wheeled vehicle 201A is stopped or traveling at a low speed, in the case where the actual roll angle (detected roll angle φb_act) of the vehicle body 202 deviates from the desired roll angle φb_cmd (in other words, in the case where the actual posture of the vehicle body 202 deviates from a desired posture satisfying φb_act=φb_cmd), the steering of the rear wheel 203r by the steering force of the rear-wheel steering actuator 208 can cause a moment (in the roll direction) capable of making the actual roll angle of the vehicle body 202 restored to the desired roll angle φb_cmd to act on the vehicle body 202, without the need for the rider to intentionally move the operation apparatus 207.

That is, it is possible to cause the moment in the roll direction for stabilizing the posture of the vehicle body 202 to act on the vehicle body 202. With this moment, the actual roll angle of the vehicle body 202 is restored to the desired roll angle φb_cmd.

Further, through calculation of the desired rear-wheel steering angular acceleration δr_dot2_cmd by the aforesaid expression (13), the desired rear-wheel steering angular acceleration δr_dot2_cmd (operational target of the rear-wheel steering actuator 208) is determined such that a deviation (φb_cmd−φb_act) of the detected roll angle φb_act, representing an observed value of the current actual roll angle, from the desired roll angle φb_cmd of the vehicle body 202, a deviation (φb_dot_cmd−φb_dot_act) of the detected roll angular velocity φb_dot_act, representing an observed value of the current actual roll angular velocity, from the desired roll angular velocity φb_dot_cmd of the vehicle body 202, the last time's desired rear-wheel steering angle δr_cmd_p, representing a pseudo estimate of the current actual steering angle (from the neutral steering angle) of the rear wheel 203r, and the last time's desired rear-wheel steering angular velocity δr_dot_cmd_p, representing a pseudo estimate of the angular velocity of the current actual steering angle of the rear wheel 203r, each approach "0".

Therefore, the steering angle of the rear wheel 203r is controlled so as to cause the actual roll angle and roll angular velocity of the vehicle body 202 to converge to the respective desired values (zero in the present embodiment), while preventing the actual steering angle of the rear wheel 203r from diverging from the neutral steering angle (while causing the actual steering angle to ultimately converge to the neutral steering angle).

Accordingly, the posture of the vehicle body 202 can be stabilized smoothly, particularly when the two-wheeled vehicle 201A is stopped or traveling at a low speed. Further, the two-wheeled vehicle 201A can be started smoothly with the vehicle body 202 in a stable posture.

Further, the gains K1 and K2, which are the feedback gains related to the posture control in the roll direction of the vehicle body 202, and the gains K3 and K4, which are the feedback gains related to the control of the steering angle of the rear wheel 203r, are variably determined, as described above, in accordance with the estimated traveling speed Vox_act, which is an observed value of the current actual traveling speed (transfer velocity in the X-axis direction) of the two-wheeled vehicle 201A.

Accordingly, when the two-wheeled vehicle 201A is stopped or traveling at a low speed, it is possible to perform the steering of the rear wheel 203r to cause the actual roll angle of the vehicle body 202 to quickly approach the desired roll angle φb_cmd.

In the state where the two-wheeled vehicle 201A is traveling at a high speed, even if the vehicle body 202 is leaned, the steering control of the rear wheel 203r for causing the actual roll angle of the vehicle body 202 to approach the desired roll angle φb_cmd is not performed, or such steering control is restricted. Consequently, a rider can readily turn the two-wheeled vehicle 201A by banking the vehicle body 202 by shifting the weight of the rider's body, as with a conventional two-wheeled vehicle.

Furthermore, the gains K1 and K2 are not only determined variably in accordance with the estimated traveling speed Vox_act, but also determined variably in accordance with the last time's desired rear-wheel steering angle δr_cmd_p, representing a pseudo estimate of the current actual steering angle of the rear wheel 203r, as described above. Accordingly, good posture control of the vehicle body 202 can be achieved with high robustness over a wide steering range of the rear wheel 203r, without causing oscillation in the posture control of the vehicle body 202.

[Modifications]

Several modifications each related to the aforesaid first or second embodiment will be described below.

In each of the aforesaid embodiments, in the posture control arithmetic section 37 or 237, desired values of the steering angle, steering angular velocity, and steering angular acceleration of the steered wheel may be determined by performing, for example, the following processing.

Figure 23:
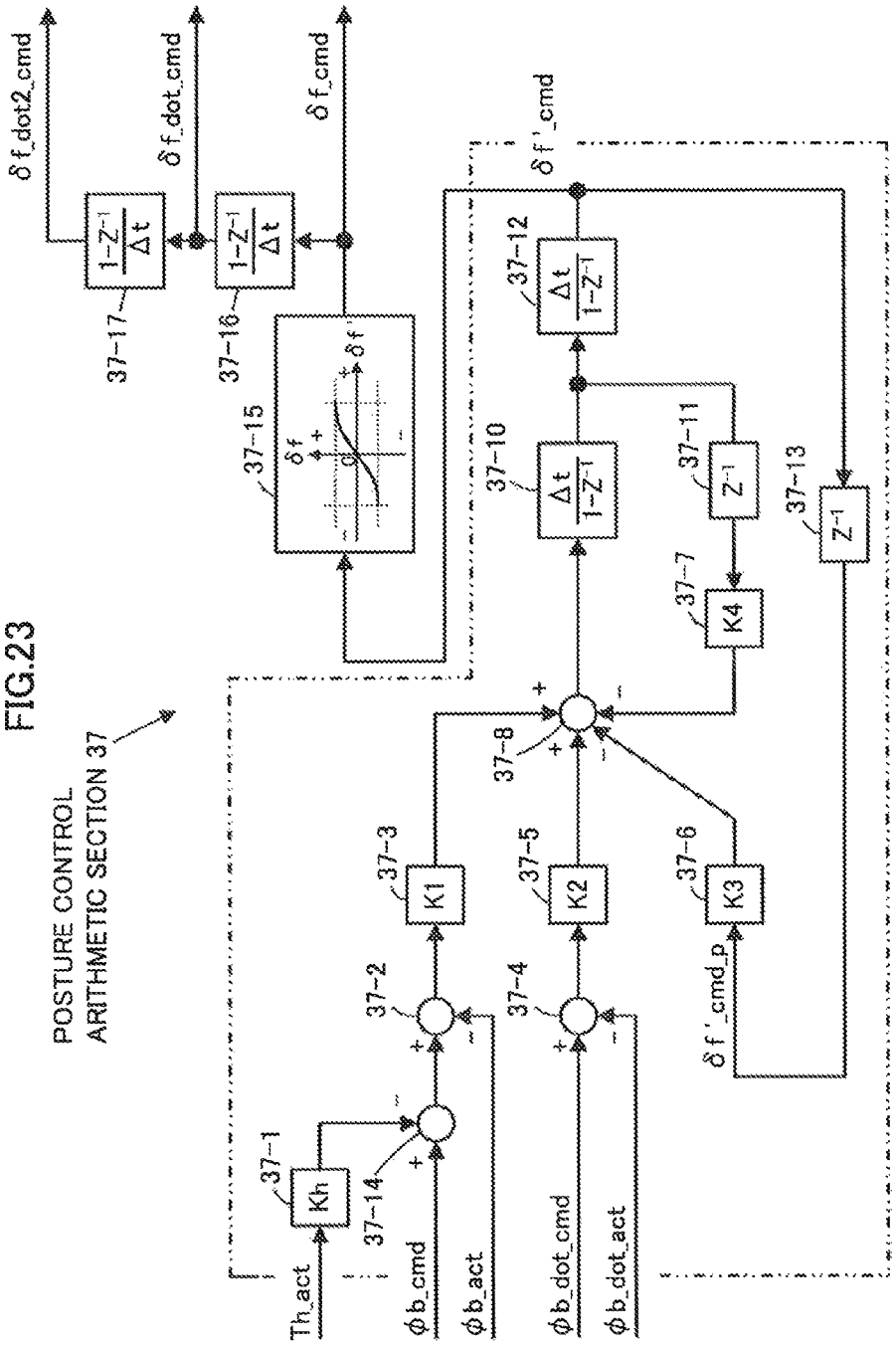
FIG. 23 is a block diagram showing a third example of the processing performed by the posture control arithmetic section shown in FIG. 3.

In the processing in the posture control arithmetic section 37 in the case of steering the front wheel 3f, first, the value output from the aforesaid processing section 37-12 as a result of the processing identical to that in the block diagram in FIG. 7 or 8 is obtained as a provisional value δf'_cmd of the desired front-wheel steering angle, as shown in FIG. 23.

It should be noted that, in FIG. 23, the processing shown within the two-dot chain line frame (processing for calculating the provisional value δf'_cmd) is identical to the processing in the block diagram in FIG. 8, although it may be identical to the processing in the block diagram in FIG. 7.

From this provisional value δf'_cmd, a desired front-wheel steering angle δf_cmd is determined by the processing in a processing section 37-15. In the processing in this processing section 37-15, the provisional value δf'_cmd as an input value is converted into a desired front-wheel steering angle δf_cmd as an output value, by a conversion function having saturation characteristics (characteristics that the output value is saturated with respect to the input value) as illustrated by the graph in the figure. The conversion function is defined by a mapping or an arithmetic expression.

The desired front-wheel steering angle δf_cmd determined in the processing section 37-15 is differentiated in a processing section 37-16, whereby a desired front-wheel steering angular velocity δf_dot_cmd is determined. Further, the desired front-wheel steering angular velocity δf_dot_cmd is differentiated in a processing section 37-17, whereby a desired front-wheel steering angular acceleration δf_dot2_cmd is determined.

The same applies to the processing in the posture control arithmetic section 237 in the case of steering the rear wheel 203r. In this case, a provisional value δr'_cmd of the desired rear-wheel steering angle may be calculated by the processing which corresponds to the processing shown within the two-dot chain line frame in FIG. 23 replaced with the processing in the block diagram in FIG. 20. Further, from this provisional value δr'_cmd, a desired rear-wheel steering angle δr_cmd, a desired rear-wheel steering angular velocity δr_dot_cmd, and a desired rear-wheel steering angular acceleration δr_dot2_cmd may be determined by the processes similar to those in the respective processing sections 37-15, 37-16, and 37-17 in FIG. 23.

In the case where desired values of the steering angle, steering angular velocity, and steering angular acceleration of the steered wheel (front wheel 3f or rear wheel 203r) are determined by the processing in the posture control arithmetic section 37 or 237 in the above-described manner, in the processing in the control gain determining section 35 or 235, the aforesaid gains K1 and K2 may be set independently of the steering angle of the steered wheel.

In this manner as well, it is possible to control the steering actuator 8 or 208 such that the sensitivity (the aforesaid sensitivity Ra1) of the change in value of the steering angular acceleration (δf_dot2_cmd or δr_dot2_cmd) to the change in observed value (φb_act) of the inclination angle in the roll direction of the vehicle body 2 or 202 and the sensitivity (the aforesaid sensitivity Ra2) of the change in value of the steering angular acceleration Of dot2_cmd or δr_dot2_cmd) to the change in observed value (φb_dot_act) of the temporal change rate of the inclination angle in the roll direction of the vehicle body 2 or 202 both become smaller as the observed value of the steering angle of the steered wheel becomes larger.

It should be noted that in each of the case of determining the desired front-wheel steering angle δf_cmd, the desired front-wheel steering angular velocity δf_dot_cmd, and the desired front-wheel steering angular acceleration δf_dot2_cmd in the posture control arithmetic section 37 by the processing including the processes in the above-described processing sections 37-15, 37-16, and 37-17 shown in the block diagram in FIG. 23, and the case of determining the desired rear-wheel steering angle δr_cmd, the desired rear-wheel steering angular velocity δr_dot_cmd, and the desired rear-wheel steering angular acceleration δrdot2_cmd in the posture control arithmetic section 237 by the processing including the processes similar to those in the above-described processing sections 37-15, 37-16, and 37-17, the gains K1 and K2 may be set such that they change with the trends similar to those in each of the aforesaid embodiments in accordance with the steering angle of the steered wheel (front wheel 3f or rear wheel 203r).

In the first embodiment, the rear wheel 3r is a non-steered wheel.

Alternatively, the rear wheel 3r may be configured to be passively steered by, for example, the reaction force from the ground surface 110.

Further, in each of the aforesaid embodiments, as the motional state quantity of the inclination angle in the roll direction (roll angle) of the vehicle body 2, 202, which is a constituent element of the controlled state quantities, a value of roll angle φb and a roll angular velocity φb_dot were used. Alternatively, the steering actuator (front-wheel steering actuator 8 or rear-wheel steering actuator 208) may be controlled, using the roll angle φb alone as the controlled state quantity related to the roll angle, to cause the state quantity to approach a desired value.

Furthermore, as the motional state quantity of the steering angle of the steered wheel, which is another constituent element of the controlled state quantities, a value of the steering angle (δf or δr) and its angular velocity Of dot or δr_dot) were used. Alternatively, the steering actuator (front-wheel steering actuator 8 or rear-wheel steering actuator 208) may be controlled, using the value of the steering angle alone as the controlled state quantity related to the steering angle of the steered wheel, to cause the state quantity to approach a desired value.

The desired value of the motional state quantity of the inclination angle in the roll direction (roll angle φb, roll angular velocity φb_dot) of the vehicle body 2, 202 may be set to a value other than zero.

Further, the desired value of the motional state quantity of the steering angle (steering angle δf or δr, steering angular velocity δf_dot or δr_dot) of the steered wheel may be set to a value other than zero, as long as the value can stabilize the posture of the vehicle body 2, 202.

The desired value of the motional state quantity of the inclination angle in the roll direction (roll angle φb, roll angular velocity φb_dot) of the vehicle body 2, 202, or the desired value of the motional state quantity of the steering angle (steering angle δf or δr, steering angular velocity δf_dot or δr_dot) of the steered wheel may be set to a value that is determined in accordance with, for example, the force applied to the operation apparatus 7 (or 207) by the rider, or the manipulated variable of the operation apparatus 7 (or 207).

Further, in determining the desired value of the roll angle φb, the centrifugal force during turning of the two-wheeled vehicle 1A or 201A may be taken into account. That is, the desired value of the roll angle φb may be determined such that a moment generated about the origin of the XYZ coordinate system in the direction about the X axis (roll direction) due to the gravitational force acting on the overall center of gravity G of the two-wheeled vehicle 1A or 201A and a moment generated about the origin of the XYZ coordinate system in the direction about the X axis (roll direction) due to the centrifugal force acting on the overall center of gravity G are balanced (so that the sum of the moments becomes "0").

In this case, the desired value of the roll angle φb (hereinafter, referred to as "desired roll angle φb_cmd") can be determined, for example, in the following manner. Hereinafter, the roll angle φb in the state where the moments generated about the origin of the XYZ coordinate system due to the gravitational force and the centrifugal force acting on the overall center of gravity G are balanced with each other will be called a "balanced roll angle φb_lean".

This balanced roll angle φb_lean is obtained approximately by the following expression (21).

$$\phi b\_lean = -Vox\_act * \omega z\_act/g \quad (21)$$

Here, ωz_act represents a turning angular velocity about the vertical axis (yaw rate) of the vehicle body 2 or 202. For this value, for example, a detected value of the yaw rate, which is indicated by an output from the aforesaid vehicle-body inclination detector 16 or 216 including the angular velocity sensor, may be used.

Alternatively, ωz_act may be obtained from, for example, an actual value of the aforesaid front-wheel effective steering angle δ'f (estimated front-wheel effective steering angle δ'f_act), an actual value of the rear-wheel effective steering angle δ'r (estimated rear-wheel effective steering angle δ'r_act), and an actual value of the traveling speed Vox (estimated traveling speed Vox_act) of the two-wheeled vehicle 1A or 201A, by the following expression (22).

$$\omega z\_act = Vox\_act * ((1/L)*\tan(\delta'f\_act) - (1/L)*\tan(\delta'r\_act)) \quad (22)$$

In the case where the rear wheel 203r is a non-steered wheel, as in the aforesaid first embodiment, the computation of the expression (22) can be performed by setting: δ'r_act=0.

The balanced roll angle φb_lean calculated in the above-described manner may be determined as the desired roll angle φb_cmd. Alternatively, a value obtained by multiplying φb_lean by a positive constant of 1 or less may be determined as the desired roll angle φb_cmd.

The desired roll angle φb_cmd may be "0" when the two-wheeled vehicle 1A or 201A is stopped before it starts moving, or when the traveling speed Vox of the vehicle is sufficiently low.

Further, the desired value of the roll angular velocity φb_dot may be set to zero, although it may be set to a value other than zero as long as the value can stabilize the posture of the vehicle body 2, 202.

For example, the desired value of the roll angular velocity φb_dot may be determined in accordance with the force applied to the operation apparatus 7 (or 207) by the rider or the manipulated variable of the operation apparatus 7 (or 207).

In each of the aforesaid embodiments, in the processing in the posture control arithmetic section 37 or 237, the desired front-wheel steering angular acceleration δf_dot2_cmd or desired rear-wheel steering angular acceleration δr_dot2_cmd was determined as an operational target of the steering actuator (front-wheel steering actuator 8 or rear-wheel steering actuator 208).

In the processing in the posture control arithmetic section 37 in the first embodiment, however, a desired value of the torque about the steering axis Csf of the steered wheel (front wheel 3f) may be determined in place of, or in addition to, the desired front-wheel steering angular acceleration δf_dot2_cmd. Then, in the aforesaid front-wheel steering actuator control section 41, the steering force (torque) of the front-wheel steering actuator 8 may be controlled to cause the actual torque about the steering axis Csf to match the desired value.

Similarly, in the processing in the posture control arithmetic section 237 in the second embodiment, a desired value of the torque about the steering axis Csr of the steered wheel (rear wheel 203r) may be determined in place of, or in addition to, the desired rear-wheel steering angular acceleration δr_dot2_cmd. Then, in the aforesaid rear-wheel steering actuator control section 241, the steering force (torque) of the rear-wheel steering actuator 208 may be controlled to cause the actual torque about the steering axis Csr to match the desired value.

Furthermore, those equivalently transformed from the techniques, means, and algorithms shown in the above-described embodiments to produce the same result can be regarded as being identical thereto.

What is claimed is:

1. A mobile vehicle having a vehicle body and only one front wheel and only one rear wheel arranged spaced apart from each other in a longitudinal direction of the vehicle body,
    one of the front wheel and the rear wheel being a steered wheel which can be steered about a steering axis tilted backward,
    the mobile vehicle comprising:
    a steering actuator which generates a steering force for steering the steered wheel; and
    a control device which controls the steering actuator, wherein
    the control device is configured to control the steering actuator so as to stabilize controlled state quantities including a first motional state quantity and a second motional state quantity, the first motional state quantity being a motional state quantity of an inclination angle in a roll direction of the vehicle body and including at least a value of the inclination angle, the second motional state quantity being a motional state quantity of a steering angle of the steered wheel and including at least a value of the steering angle, and, when a steering angular acceleration of the steered wheel steered by the steering actuator or a torque about the steering axis applied to the steered wheel from the steering actuator is defined as a reference quantity, the control device is configured to control the steering actuator such that a magnitude of a ratio Ra1/Rb1 becomes smaller as a magnitude of an observed value of a traveling speed of the mobile vehicle becomes larger, wherein Ra1 is a function of a change in value of the reference quantity to a change in observed value of the inclination angle in the roll direction of the vehicle body and Rb1 is a function of a change in value of the reference quantity to a change in observed value of the steering angle of the steered wheel.

2. The mobile vehicle according to claim 1, wherein
the first motional state quantity included in the controlled state quantities is made up of a value of the inclination angle in the roll direction of the vehicle body and a temporal change rate of the inclination angle,
the second motional state quantity included in the controlled state quantities is made up of a value of the steering angle of the steered wheel and a temporal change rate of the steering angle, and
the control device is configured to control the steering actuator such that the magnitude of the ratio Ra1/Rb1 becomes smaller as the magnitude of the observed value of the traveling speed of the mobile vehicle becomes larger, and also such that the magnitude of a ratio Ra2/Rb2 becomes smaller as the magnitude of the observed value of the traveling speed of the mobile vehicle becomes larger, wherein Ra2 is a function of the change in value of the reference quantity to the change in observed value of the temporal change rate of the inclination angle in the roll direction of the vehicle body and Rb2 is a function of the change in value of the reference quantity to the change in observed value of the temporal change rate of the steering angle of the steered wheel.

3. The mobile vehicle according to claim 1, wherein the control device is further configured to control the steering actuator such that the magnitude of Ra1 becomes smaller as the magnitude of the observed value of the steering angle of the steered wheel from a non-steered state thereof becomes larger.

4. The mobile vehicle according to claim 2, wherein the control device is further configured to control the steering actuator such that the magnitude of Ra1 and the magnitude of Ra2 each become smaller as the magnitude of the observed value of the steering angle of the steered wheel from a non-steered state thereof becomes larger.

5. The mobile vehicle according to claim 1, further comprising an operation apparatus for a rider riding on the mobile vehicle to hold for performing steering of the steered wheel, the operation apparatus being arranged to be rotatively driven by a handlebar actuator for rotatively driving the operation apparatus in conjunction with the change of the steering angle of the steered wheel from a non-steered state thereof during the steering of the steered wheel by the steering actuator, wherein
the control device is further configured to control the handlebar actuator such that a rotational amount of the operation apparatus has saturation characteristics with respect to the steering angle of the steered wheel from the non-steered state thereof.

* * * * *